United States Patent
Omori et al.

(10) Patent No.: US 7,487,520 B2
(45) Date of Patent: Feb. 3, 2009

(54) DISC DRIVE APPARATUS WITH DISC CHUCKING ARRANGEMENT

(75) Inventors: Kiyoshi Omori, Tokyo (JP); Manabu Yoshii, Kanagawa (JP)

(73) Assignee: Sony Corporation, Tokyo (JP)

( * ) Notice: Subject to any disclaimer, the term of this patent is extended or adjusted under 35 U.S.C. 154(b) by 432 days.

(21) Appl. No.: 11/068,227

(22) Filed: Mar. 1, 2005

(65) Prior Publication Data
US 2005/0229193 A1    Oct. 13, 2005

(30) Foreign Application Priority Data
Mar. 8, 2004    (JP)    ............... P2004-064713

(51) Int. Cl.
*G11B 17/04*    (2006.01)
*G11B 33/02*    (2006.01)
(52) U.S. Cl. ............... 720/706; 720/713; 720/620
(58) Field of Classification Search ............... 720/619, 720/690, 706, 713, 620–623
See application file for complete search history.

(56) References Cited

U.S. PATENT DOCUMENTS

| | | | | |
|---|---|---|---|---|
| 4,486,873 | A * | 12/1984 | Takahashi et al. | 720/619 |
| 4,847,826 | A * | 7/1989 | Sakaguchi et al. | 720/723 |
| 5,050,159 | A * | 9/1991 | Kenmotsu | 720/704 |
| 5,970,044 | A * | 10/1999 | Kambayashi et al. | 720/713 |
| 6,438,095 | B1 * | 8/2002 | Haga et al. | 720/707 |
| 6,799,324 | B1 * | 9/2004 | Takagi et al. | 720/712 |
| 2002/0015374 | A1 * | 2/2002 | Abe | 369/77.1 |
| 2002/0044522 | A1 * | 4/2002 | Inata et al. | 369/271 |
| 2002/0150027 | A1 * | 10/2002 | Kato | 369/270 |
| 2005/0060734 | A1 * | 3/2005 | Aoyama et al. | 720/706 |
| 2005/0193404 | A1 | 9/2005 | Omori et al. | |
| 2005/0210492 | A1 | 9/2005 | Omori et al. | |
| 2006/0085808 | A1 * | 4/2006 | Fujimura | 720/706 |
| 2006/0277562 | A1 * | 12/2006 | Wada | 720/713 |
| 2007/0011697 | A1 * | 1/2007 | Kido | 720/713 |
| 2007/0162919 | A1 | 7/2007 | Omori et al. | |
| 2007/0234376 | A1 * | 10/2007 | Makino | 720/712 |

FOREIGN PATENT DOCUMENTS

JP    2002-352497    12/2002

* cited by examiner

*Primary Examiner*—Brian E Miller
(74) *Attorney, Agent, or Firm*—Oblon, Spivak, McClelland, Maier & Neustadt, P.C.

(57) ABSTRACT

The ceiling board of the cabinet of a disc drive apparatus has an abutment projection arranged at a position located vis-à-vis and projecting toward the turntable. The main surface of the abutment projection opposite to the main surface located vis-à-vis the turntable is supported by a top surface supporting section formed on the frame. With this arrangement, when the turntable is raised to the chucking position, the optical disc is pressed by the abutment projection of the ceiling board supported by the protruding section of the top surface supporting section at a part thereof surrounding the center hole of the optical disc so that the engaging projection is engaged with the center hole of the optical disc and the optical disc is held on the turntable in a state where the optical disc is anchored by a plurality of anchoring sections at a part thereof surrounding the center hole of the optical disc.

8 Claims, 34 Drawing Sheets

(1) POWER ON (2) LOAD

DISC DRIVE APPARATUS WITH DISC CHUCKING ARRANGEMENT

BACKGROUND OF THE INVENTION

1. Field of the Invention

This invention relates to a disc drive apparatus for recording information signals on and/or reproducing information signals from an optical disc, a frame for holding such a disc drive apparatus, a disc drive apparatus set comprising such a disc drive apparatus and a frame and an electronic appliance mounted by such a disc drive apparatus.

This application claims priority of Japanese Patent Application No. 2004-064713, filed on Mar. 8, 2004, the entirety of which is incorporated by reference herein.

2. Description of Related Art

Optical discs including CDs (compact discs) and DVDs (digital versatile discs) and magneto-optical discs are known. Various disc drive apparatus corresponding to such optical discs are also known.

Meanwhile, there is a strong demand for downsized, thin and lightweight electronic appliances mounted by such disc drive apparatus such as note-type personal computers. Accordingly, disc drive apparatus of the type under consideration are also required to be downsized, thin and lightweight than ever.

To meet the demand, there have been proposed a disc drive apparatus adapted to fasten an optical disc to a turntable by means of a chucking action of raising the turntable so as to press an optical disc against and hold it to the ceiling board of a cabinet in place of conventional disc drive apparatus adapted to hold an optical disc by means of a clamp member (see, inter alia, Patent Document 1: Jpn. Pat. Appln. Laid-Open Publication No. 2002-352497).

Such a disc drive apparatus can reduce its thickness by that of the clamp member because it does not comprise a clamp member. However, for such a disc drive apparatus to be reliably fastened to a turntable, the ceiling board of the cabinet is required to be sufficiently rigid. Then, the ceiling board needs to be made thick and heavy to meet the requirement of rigidity.

Thus, it is difficult to make disc drive apparatus of the type under consideration further downsized, thin and lightweight if the ceiling board needs to be provided with a sufficiently high rigidity. Particularly, a problem of tradeoff arises when such a disc drive apparatus has to be made to show a thickness of about 9.5 mm, or equal to that of a hard disc drive (HDD) unit, because there is not any member that can take part in reducing the thickness of the apparatus and the thickness of the ceiling board of the cabinet has to be raised if the ceiling board satisfies the requirement of rigidity. If the thickness of the ceiling board is reduced, the rigidity of the ceiling board falls to make it difficult to reliably fasten the optical disc to the turntable by means of a chucking action.

SUMMARY OF THE INVENTION

In view of the above identified circumstances, it is therefore the object of the present invention to provide a disc drive apparatus that is made further downsized, thin and lightweight and an optical disc can be reliably fastened to the disc receiving section of the apparatus by means of a chucking action if the rigidity of the ceiling board of the cabinet is not satisfactorily high due to the downsized and lightweight structure thereof.

In an aspect of the invention, there is provided a disc drive apparatus comprising: a base unit having a disc receiving section for receiving an optical disc, a disc rotary drive mechanism for driving the optical disc loaded in the disc receiving section to rotate, an optical pickup for writing signals on and/or reading signals from the optical disc being driven to rotate by the disc rotary drive mechanism and a pickup feed mechanism for feeding the optical pickup in a radial direction of the optical disc, the disc receiving section, the disc rotary drive mechanism, the optical pickup and the pickup feed mechanism being integrally arranged on a base in the inside of a cabinet; and a base hoisting/lowering mechanism for raising and lowering the base between a chucking position for loading and fastening the optical disc in the disc receiving section by raising the base and an unchucking position for releasing the optical disc from the disc receiving section by lowering the base; the disc receiving section including a turntable to be driven to rotate by the disc rotary drive mechanism, an engaging projection arranged at a central part of the turntable so as to be engaged with the center hole of the optical disc and a plurality of anchoring sections for anchoring the optical disc at a part thereof surrounding the center hole engaged with the engaging projection; the cabinet including a lower cabinet member having a substantially flat box-like profile and a ceiling board for closing the top aperture of the lower cabinet member; an abutment projection being arranged on the ceiling board at a position located vis-à-vis the turntable so as to project toward the turntable, the main surface of the abutment projection opposite to the main surface located vis-à-vis the turntable being supported by a supporting section arranged on an external member.

In another aspect of the invention, there is provided a disc drive apparatus comprising: a base unit having a disc receiving section for receiving an optical disc, a disc rotary drive mechanism for driving the optical disc loaded in the disc receiving section to rotate, an optical pickup for writing signals on and/or reading signals from the optical disc being driven to rotate by the disc rotary drive mechanism and a pickup feed mechanism for feeding the optical pickup in a radial direction of the optical disc, the disc receiving section, the disc rotary drive mechanism, the optical pickup and the pickup feed mechanism being integrally arranged on a base in the inside of a cabinet; and a base hoisting/lowering mechanism for raising and lowering the base between a chucking position for loading and fastening the optical disc in the disc receiving section by raising the base and an unchucking position for releasing the optical disc from the disc receiving section by lowering the base; the disc receiving section including a turntable to be driven to rotate by the disc rotary drive mechanism, an engaging projection arranged at a central part of the turntable so as to be engaged with the center hole of the optical disc and a plurality of anchoring sections for anchoring the optical disc at a part thereof surrounding the center hole engaged with the engaging projection; the cabinet including a lower cabinet member having a substantially flat box-like profile and a ceiling board for closing the top aperture of the lower cabinet member; an aperture section being formed through the ceiling board at a position thereof located vis-à-vis the turntable so as to allow the abutment projection arranged on the external member to enter.

In still another aspect of the invention, there is provided a frame for holding a disc drive apparatus; the disc drive apparatus comprising: a base unit having a disc receiving section for receiving an optical disc, a disc rotary drive mechanism for driving the optical disc loaded in the disc receiving section to rotate, an optical pickup for writing signals on and/or reading signals from the optical disc being driven to rotate by the disc rotary drive mechanism and a pickup feed mechanism for feeding the optical pickup in a radial direction of the optical disc, the disc receiving section, the disc rotary drive mechanism, the optical pickup and the pickup feed mechanism being integrally arranged on a base in the inside of a cabinet; and a base hoisting/lowering mechanism for raising and lowering the base between a chucking position for loading and fastening the optical disc in the disc receiving section by raising the base and an unchucking position for releasing the optical disc from the disc receiving section by lowering the base; the disc receiving section including a turntable to be driven to rotate by the disc rotary drive mechanism, an engaging projection arranged at a central part of the turntable so as to be engaged with the center hole of the optical disc and a plurality of anchoring sections for anchoring the optical disc at a part thereof surrounding the center hole engaged with the engaging projection; the cabinet including a lower cabinet member having a substantially flat box-like profile and a ceiling board for closing the top aperture of the lower cabinet member; an abutment projection being arranged on the ceiling board at a position located vis-à-vis the turntable so as to project toward the turntable, the main surface of the abutment projection opposite to the main surface located vis-à-vis the turntable being supported by a supporting section.

In still another aspect of the invention, there is provided a frame for holding a disc drive apparatus; the disc drive apparatus comprising: a base unit having a disc receiving section for receiving an optical disc, a disc rotary drive mechanism for driving the optical disc loaded in the disc receiving section to rotate, an optical pickup for writing signals on and/or reading signals from the optical disc being driven to rotate by the disc rotary drive mechanism and a pickup feed mechanism for feeding the optical pickup in a radial direction of the optical disc, the disc receiving section, the disc rotary drive mechanism, the optical pickup and the pickup feed mechanism being integrally arranged on a base in the inside of a cabinet; and a base hoisting/lowering mechanism for raising and lowering the base between a chucking position for loading and fastening the optical disc in the disc receiving section by raising the base and an unchucking position for releasing the optical disc from the disc receiving section by lowering the base; the disc receiving section including a turntable to be driven to rotate by the disc rotary drive mechanism, an engaging projection arranged at a central part of the turntable so as to be engaged with the center hole of the optical disc and a plurality of anchoring sections for anchoring the optical disc at a part thereof surrounding the center hole engaged with the engaging projection; the cabinet including a lower cabinet member having a substantially flat box-like profile and a ceiling board for closing the top aperture of the lower cabinet member; an aperture section being formed through the ceiling board at a position thereof located vis-à-vis the turntable so as to allow the abutment projection to enter.

In still another aspect of the invention, there is provided a disc drive apparatus set of a disc drive apparatus and a frame for holding the disc drive apparatus; the disc drive apparatus comprising: a base unit having a disc receiving section for receiving an optical disc, a disc rotary drive mechanism for driving the optical disc loaded in the disc receiving section to rotate, an optical pickup for writing signals on and/or reading signals from the optical disc being driven to rotate by the disc rotary drive mechanism and a pickup feed mechanism for feeding the optical pickup in a radial direction of the optical disc, the disc receiving section, the disc rotary drive mechanism, the optical pickup and the pickup feed mechanism being integrally arranged on a base in the inside of a cabinet; and a base hoisting/lowering mechanism for raising and lowering the base between a chucking position for loading and fastening the optical disc in the disc receiving section by raising the base and an unchucking position for releasing the optical disc from the disc receiving section by lowering the base; the disc receiving section including a turntable to be driven to rotate by the disc rotary drive mechanism, an engaging projection arranged at a central part of the turntable so as to be engaged with the center hole of the optical disc and a plurality of anchoring sections for anchoring the optical disc at a part thereof surrounding the center hole engaged with the engaging projection; the cabinet including a lower cabinet member having a substantially flat box-like profile and a ceiling board for closing the top aperture of the lower cabinet member; an abutment projection being arranged on the ceiling board at a position located vis-à-vis the turntable so as to project toward the turntable, the main surface of the abutment projection opposite to the main surface located vis-à-vis the turntable being supported by a supporting section arranged on the frame.

In still another aspect of the invention, there is provide a disc drive apparatus set of a disc drive apparatus and a frame for holding the disc drive apparatus; the disc drive apparatus comprising: a base unit having a disc receiving section for receiving an optical disc, a disc rotary drive mechanism for driving the optical disc loaded in the disc receiving section to rotate, an optical pickup for writing signals on and/or reading signals from the optical disc being driven to rotate by the disc rotary drive mechanism and a pickup feed mechanism for feeding the optical pickup in a radial direction of the optical disc, the disc receiving section, the disc rotary drive mechanism, the optical pickup and the pickup feed mechanism being integrally arranged on a base in the inside of a cabinet; and a base hoisting/lowering mechanism for raising and lowering the base between a chucking position for loading and fastening the optical disc in the disc receiving section by raising the base and an unchucking position for releasing the optical disc from the disc receiving section by lowering the base; the disc receiving section including a turntable to be driven to rotate by the disc rotary drive mechanism, an engaging projection arranged at a central part of the turntable so as to be engaged with the center hole of the optical disc and a plurality of anchoring sections for anchoring the optical disc at a part thereof surrounding the center hole engaged with the engaging projection; the cabinet including a lower cabinet member having a substantially flat box-like profile and a ceiling board for closing the top aperture of the lower cabinet member; an aperture section being formed through the ceiling board at a position thereof located vis-à-vis the turntable so as to allow the abutment projection arranged on the frame to enter.

In still another aspect of the invention, there is provided an electronic appliance comprising a disc drive apparatus mounted in the main body of the appliance and a frame for holding the disc drive apparatus; the disc drive apparatus comprising: a base unit having a disc receiving section for receiving an optical disc, a disc rotary drive mechanism for driving the optical disc loaded in the disc receiving section to rotate, an optical pickup for writing signals on and/or reading signals from the optical disc being driven to rotate by the disc rotary drive mechanism and a pickup feed mechanism for feeding the optical pickup in a radial direction of the optical disc, the disc receiving section, the disc rotary drive mechanism, the optical pickup and the pickup feed mechanism being integrally arranged on a base in the inside of a cabinet; and a base hoisting/lowering mechanism for raising and lowering the base between a chucking position for loading and fastening the optical disc in the disc receiving section by raising the base and an unchucking position for releasing the optical disc from the disc receiving section by lowering the base; the disc receiving section including a turntable to be driven to rotate by the disc rotary drive mechanism, an engaging projection arranged at a central part of the turntable so as to be engaged with the center hole of the optical disc and a plurality of anchoring sections for anchoring the optical disc at a part thereof surrounding the center hole engaged with the engaging projection; the cabinet including a lower cabinet member having a substantially flat box-like profile and a ceiling board for closing the top aperture of the lower cabinet member; an abutment projection being arranged on the ceiling board at a position located vis-à-vis the turntable so as to project toward the turntable, the main surface of the abutment projection opposite to the main surface located vis-à-vis the turntable being supported by a supporting section arranged on the frame.

In still another aspect of the invention, there is provided an electronic appliance comprising a disc drive apparatus mounted in the main body of the appliance and a frame for holding the disc drive apparatus; the disc drive apparatus comprising: a base unit having a disc receiving section for receiving an optical disc, a disc rotary drive mechanism for driving the optical disc loaded in the disc receiving section to rotate, an optical pickup for writing signals on and/or reading signals from the optical disc being driven to rotate by the disc rotary drive mechanism and a pickup feed mechanism for feeding the optical pickup in a radial direction of the optical disc, the disc receiving section, the disc rotary drive mechanism, the optical pickup and the pickup feed mechanism being integrally arranged on a base in the inside of a cabinet; and a base hoisting/lowering mechanism for raising and lowering the base between a chucking position for loading and fastening the optical disc in the disc receiving section by raising the base and an unchucking position for releasing the optical disc from the disc receiving section by lowering the base; the disc receiving section including a turntable to be driven to rotate by the disc rotary drive mechanism, an engaging projection arranged at a central part of the turntable so as to be engaged with the center hole of the optical disc and a plurality of anchoring sections for anchoring the optical disc at a part thereof surrounding the center hole engaged with the engaging projection; the cabinet including a lower cabinet member having a substantially flat box-like profile and a ceiling board for closing the top aperture of the lower cabinet member; an aperture section being formed through the ceiling board at a position thereof located vis-à-vis the turntable so as to allow the abutment projection arranged on the frame to enter.

In still another aspect of the invention, there is provided an electronic appliance comprising a disc drive apparatus mounted in the main body of the appliance; the disc drive apparatus having: a base unit having a disc receiving section for receiving an optical disc, a disc rotary drive mechanism for driving the optical disc loaded in the disc receiving section to rotate, an optical pickup for writing signals on and/or reading signals from the optical disc being driven to rotate by the disc rotary drive mechanism and a pickup feed mechanism for feeding the optical pickup in a radial direction of the optical disc, the disc receiving section, the disc rotary drive mechanism, the optical pickup and the pickup feed mechanism being integrally arranged on a base in the inside of a cabinet; and a base hoisting/lowering mechanism for raising and lowering the base between a chucking position for loading and fastening the optical disc in the disc receiving section by raising the base and an unchucking position for releasing the optical disc from the disc receiving section by lowering the base; the disc receiving section including a turntable to be driven to rotate by the disc rotary drive mechanism, an engaging projection arranged at a central part of the turntable so as to be engaged with the center hole of the optical disc and a plurality of anchoring sections for anchoring the optical disc at a part thereof surrounding the center hole engaged with the engaging projection; the cabinet including a lower cabinet member having a substantially flat box-like profile and a ceiling board for closing the top aperture of the lower cabinet member; an abutment projection being arranged on the ceiling board at a position located vis-à-vis the turntable so as to project toward the turntable, the main surface of the abutment projection opposite to the main surface located vis-à-vis the turntable being supported by a supporting section arranged on the main body of the appliance.

In a further aspect of the invention, there is provided an electronic appliance comprising a disc drive apparatus mounted in the main body of the appliance; the disc drive apparatus having: a base unit having a disc receiving section for receiving an optical disc, a disc rotary drive mechanism for driving the optical disc loaded in the disc receiving section to rotate, an optical pickup for writing signals on and/or reading signals from the optical disc being driven to rotate by the disc rotary drive mechanism and a pickup feed mechanism for feeding the optical pickup in a radial direction of the optical disc, the disc receiving section, the disc rotary drive mechanism, the optical pickup and the pickup feed mechanism being integrally arranged on a base in the inside of a cabinet; and a base hoisting/lowering mechanism for raising and lowering the base between a chucking position for loading and fastening the optical disc in the disc receiving section by raising the base and an unchucking position for releasing the optical disc from the disc receiving section by lowering the base; the disc receiving section including a turntable to be driven to rotate by the disc rotary drive mechanism, an engaging projection arranged at a central part of the turntable so as to be engaged with the center hole of the optical disc and a plurality of anchoring sections for anchoring the optical disc at a part thereof surrounding the center hole engaged with the engaging projection; the cabinet including a lower cabinet member having a substantially flat box-like profile and a ceiling board for closing the top aperture of the lower cabinet member; an aperture section being formed through the ceiling board at a position thereof located vis-à-vis the turntable so as to allow the abutment projection arranged on the main body of the appliance to enter.

As described above, the main surface of the ceiling board of a disc drive apparatus according to the invention is supported by a supporting section arranged on a frame for holding the disc drive apparatus or the supporting section arranged on the main body of an electronic appliance in which the disc drive apparatus is mounted at the main surface thereof opposite to the main surface located vis-à-vis the turntable. As the base hoisting/lowering mechanism of the disc drive apparatus raises the base to the chucking position, the optical disc is pressed by the abutment projection of the ceiling board that is supported by the supporting section at a part thereof surrounding the center hole so that the engaging projection is engaged with the center hole of the optical disc and, at the same time, the optical disc is held on the turntable in a state where the plurality of anchoring sections anchors the optical disc at a part thereof surrounding the center hole.

In a disc drive apparatus according to the invention, the ceiling board is provided at a position located vis-à-vis the turntable with an aperture section for allowing the abutment projection that is arranged on the frame for holding the disc drive apparatus or the abutment projection that is arranged on the main body of the electronic appliance in which the disc drive apparatus is mounted to enter. Then, as the base hoisting/lowering mechanism of the disc drive apparatus raises the base to the chucking position, the optical disc is pressed by the abutment projection that enters the aperture section at a part thereof surrounding the center hole so that the engaging projection is engaged with the center hole of the optical disc and, at the same time, the optical disc is held on the turntable in a state where the plurality of anchoring sections anchors the optical disc at a part thereof surrounding the center hole.

Thus, the optical disc can be reliably loaded in the disc receiving section if the ceiling board of the cabinet of the disc drive apparatus is not made to show a sufficiently enhanced level of rigidity.

In other words, a disc drive apparatus according to the present invention can be made further thin and lightweight by using a thin and/or lightweight ceiling board. Additionally, the optical disc can be reliably chucked to the disc receiving section if the ceiling board does not show a sufficiently enhanced level of rigidity because it is made thin and lightweight.

BRIEF DESCRIPTION OF THE DRAWINGS

FIG. 24A is a schematic plan view of the disc drive apparatus in a state where the base unit of the disc drive apparatus is in the unchucking position, FIG. 24B is a schematic lateral view of the disc drive apparatus, illustrating the positional relationship between the first spindle of the base and the first cam slit of the drive lever in the unchucking position of the base unit, and FIG. 24C is a schematic lateral view of the disc drive apparatus, illustrating the positional relationship of the second spindle of the base relative to the second cam slit of the cam piece and relative to the vertical slit of the bent piece when the base unit is in the unchucking position;

FIG. 26A is a schematic plan view of the disc drive apparatus in a state where the base unit of the disc drive apparatus is in the chucking position, FIG. 26B is a schematic lateral view of the disc drive apparatus, illustrating the positional relationship between the first spindle of the base and the first cam slit of the drive lever in the chucking position of the base unit, and FIG. 26C is a schematic lateral view of the disc drive apparatus, illustrating the positional relationship between the second spindle of the base and the second cam slit of the cam piece and the vertical slit of the bent piece in the chucked state of the base unit;

FIG. 28A is a schematic plan view of the base unit of the disc drive apparatus in the recording/reproduction position, FIG. 28B is a schematic lateral view of the base unit, illustrating the positional relationship between the first spindle of the base and the first cam slit of the slide lever in the recording/reproduction position, and FIG. 28C is a schematic lateral view of the base unit, illustrating the positional relationship between the second spindle of the base and the second cam slit of the cam piece and the vertical slit of the bent piece in the recording/reproduction position;

DETAILED DESCRIPTION OF THE PREFERRED EMBODIMENTS

Now, a disc drive apparatus, a frame, a disc drive apparatus set and an electronic appliance according to the invention will be described in greater detail by referring to the accompanying drawings that illustrate preferred embodiments thereof.

Figure 1:
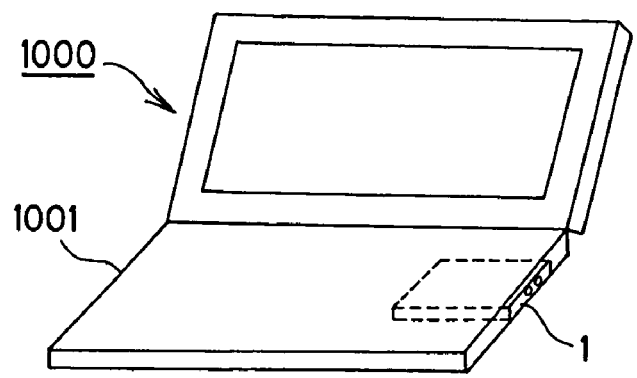
FIG. 1 is a schematic perspective view if a note-type personal computer mounted by a disc drive apparatus according to the invention.
Figure 2:
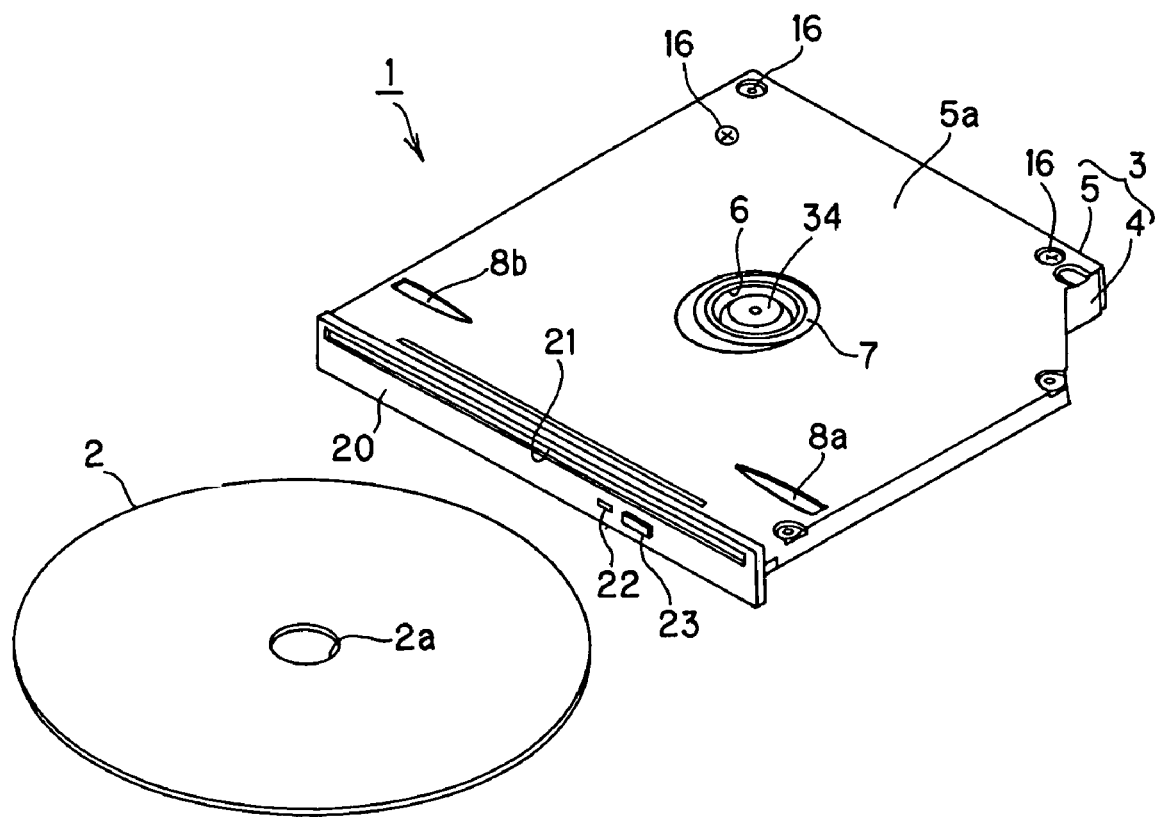
FIG. 2 is a schematic perspective view of a disc drive apparatus according to the invention, showing its external appearance.

A disc drive apparatus according to the invention is a slot-in type disc drive apparatus 1 adapted to be mounted in the main body 1001 of a note-type personal computer 1000 as shown in FIG. 1. As shown in FIG. 2, the disc drive apparatus 1 shows a very thin profile having a thickness as small as about 12.7 mm and is adapted to record information signals on and reproduce information signals from an optical disc 2 which may be a CD (compact disc) or a DVD (digital versatile disc).

(1) Configuration of Disc Drive Apparatus

Firstly, the configuration of the disc drive apparatus 1 will be specifically described below.

(1-1) Configuration of Cabinet

Figure 3:
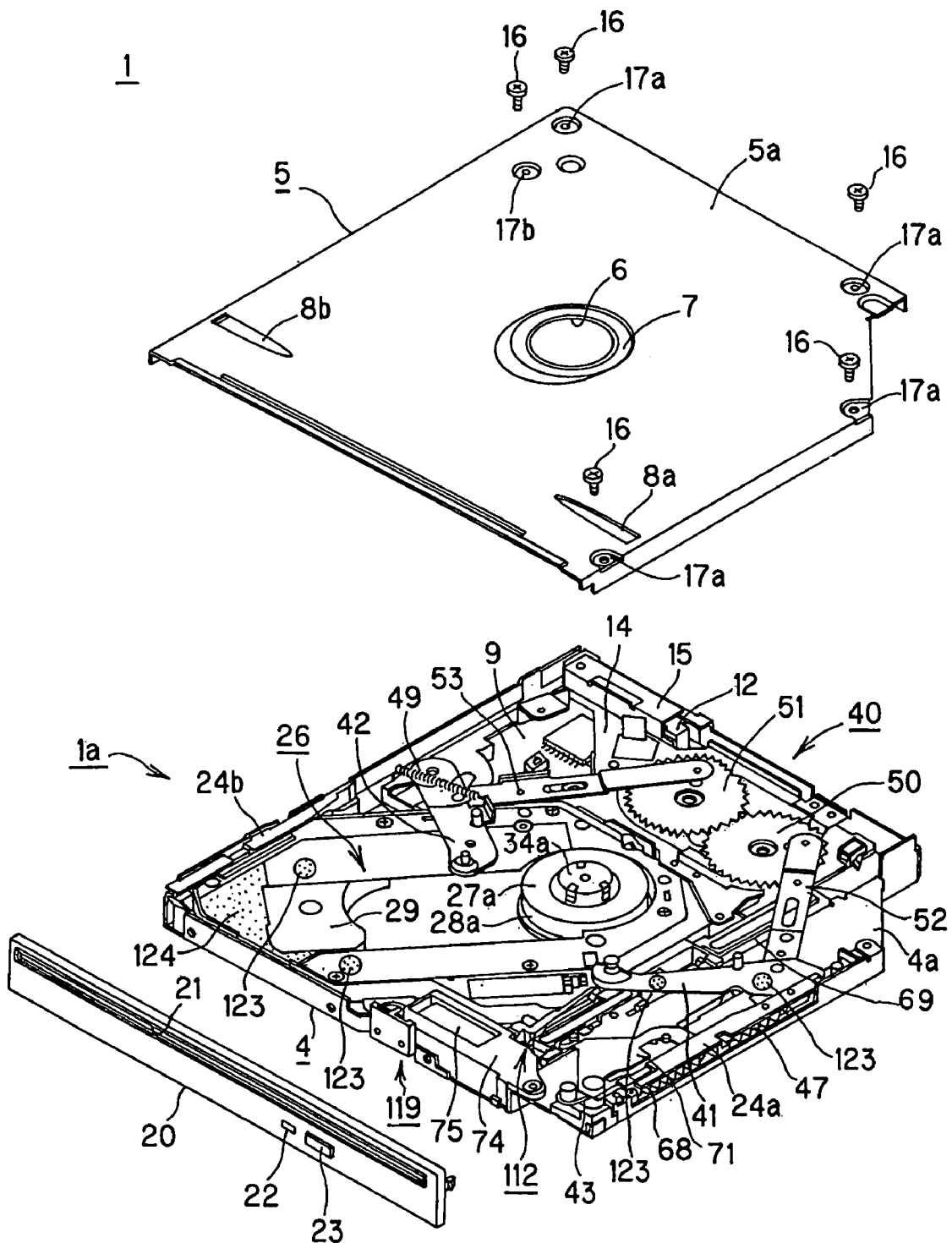
FIG. 3 is an exploded schematic perspective view of a disc drive apparatus according to the invention, showing the apparatus main body, the top cover and the front panel thereof.

As shown in FIGS. 2 and 3, the disc drive apparatus 1 comprises an apparatus main body 1a and a cabinet 3 for encasing the apparatus main body 1a. The cabinet 3 includes a bottom case 4 that is a lower cabinet member in which the apparatus main body 1a is mounted and a top cover 5 that is a ceiling board for covering the top surface of the apparatus main body 1a.

Figure 4:
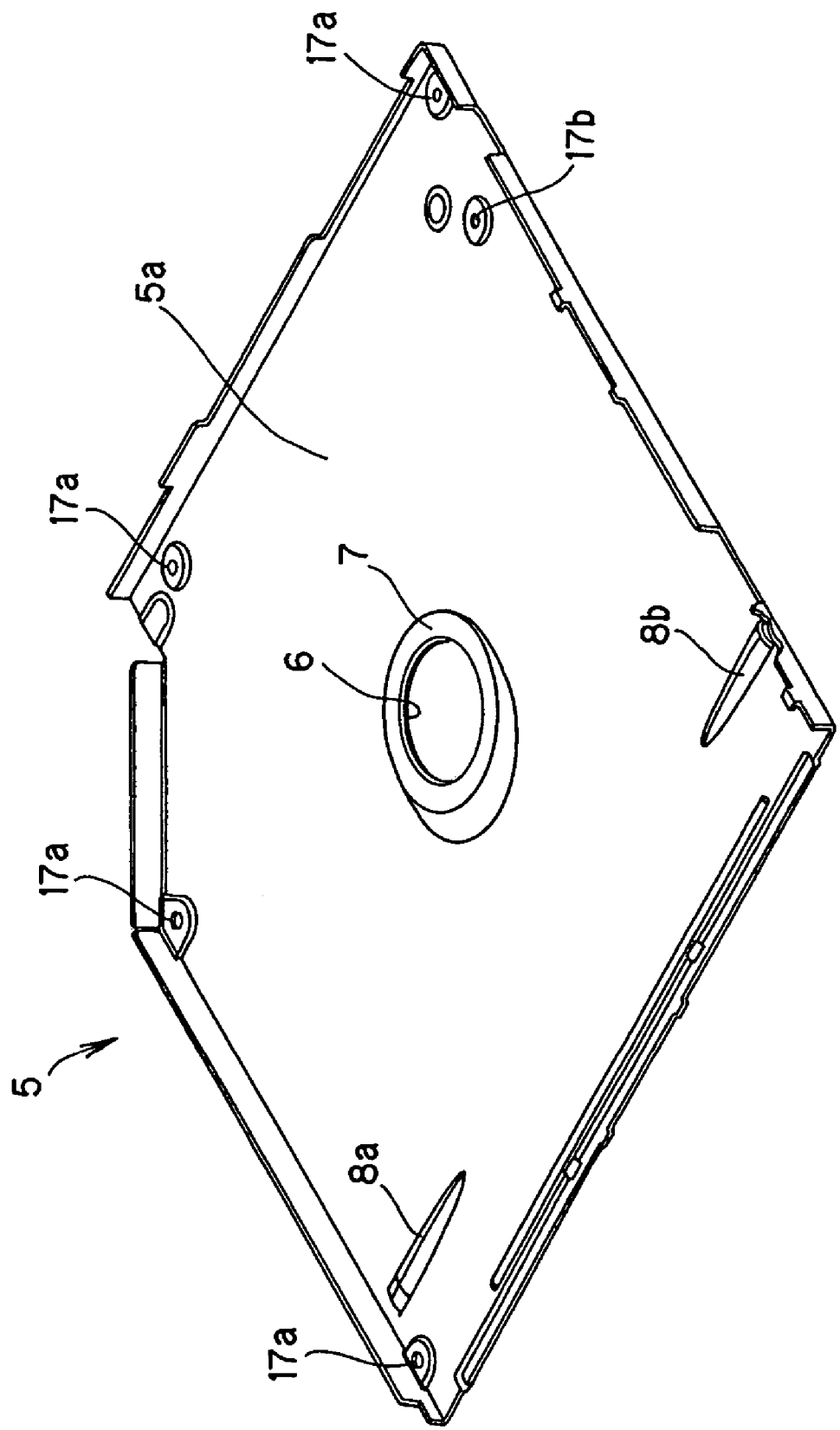
FIG. 4 is a schematic perspective view of the top cover of FIG. 2 as viewed from the inside.

As shown in FIGS. 3 and 4, the top cover 5 is made of a relatively thin metal plate and includes a top plate section 5a for closing the open top of the bottom case 4 and peripheral wall sections formed by bending the metal plate along the two opposite lateral surfaces and the rear surface of the bottom case from the outside of the latter. A substantially circular aperture 6 is formed substantially at the center of the top plate section 5a. The aperture 6 is arranged to expose the engaging projection 34a of the turntable 27a of the disc drive apparatus 1 that is to be engaged with the center hole 2a of an optical disc 2 in a chucking operation, which will be described in greater detail hereinafter. The top plate section 5a is provided with an abutment projection 7 that surrounds the aperture 6 and is slightly projecting toward the turntable 27a so as to abut a part of the optical disc 2 surrounding the center hole 2a thereof.

The top plate section 5a is provided near the front end thereof with a pair of guide projections 8a, 8b for guiding the optical disc 2 being inserted through a disc insertion/release port 21, which will be described in greater detail hereinafter, restricting the movement of the optical disc 2 in the vertical direction. The paired guide projections 8a, 8b are arranged at positions symmetrical relative to the center line of the optical disc 2 that runs through the aperture 6 in the direction in which the optical disc 2 is inserted and raised toward the inside of the cabinet 3 so as to show a profile of a part of a cone that draws an arc in that direction with the diameter continuously diminishing from the outside toward the inside. In other words, the paired guide projections 8a, 8b have a profile produced by dividing a cone into a pair of halves along the axial line thereof and arranged on the top plate section 5a with their vertexes directed to the inside. Thus, they are tapered from the outside toward the inside in terms of both height and width.

Since the paired guide projections 8a, 8b have such a profile, the optical disc 2 inserted into the cabinet 3 through the disc insertion/release port 21 is guided smoothly toward the inside of the cabinet 3, correcting the transversal positional error, if any. Additionally, the guide projections 8a, 8b having such a profile and arranged on the top cover 5 can increase the rigidity of the top plate section 5a. The inner main surface of the top plate section 5a is processed to reduce its frictional resistance against the optical disc 2.

Figure 5:
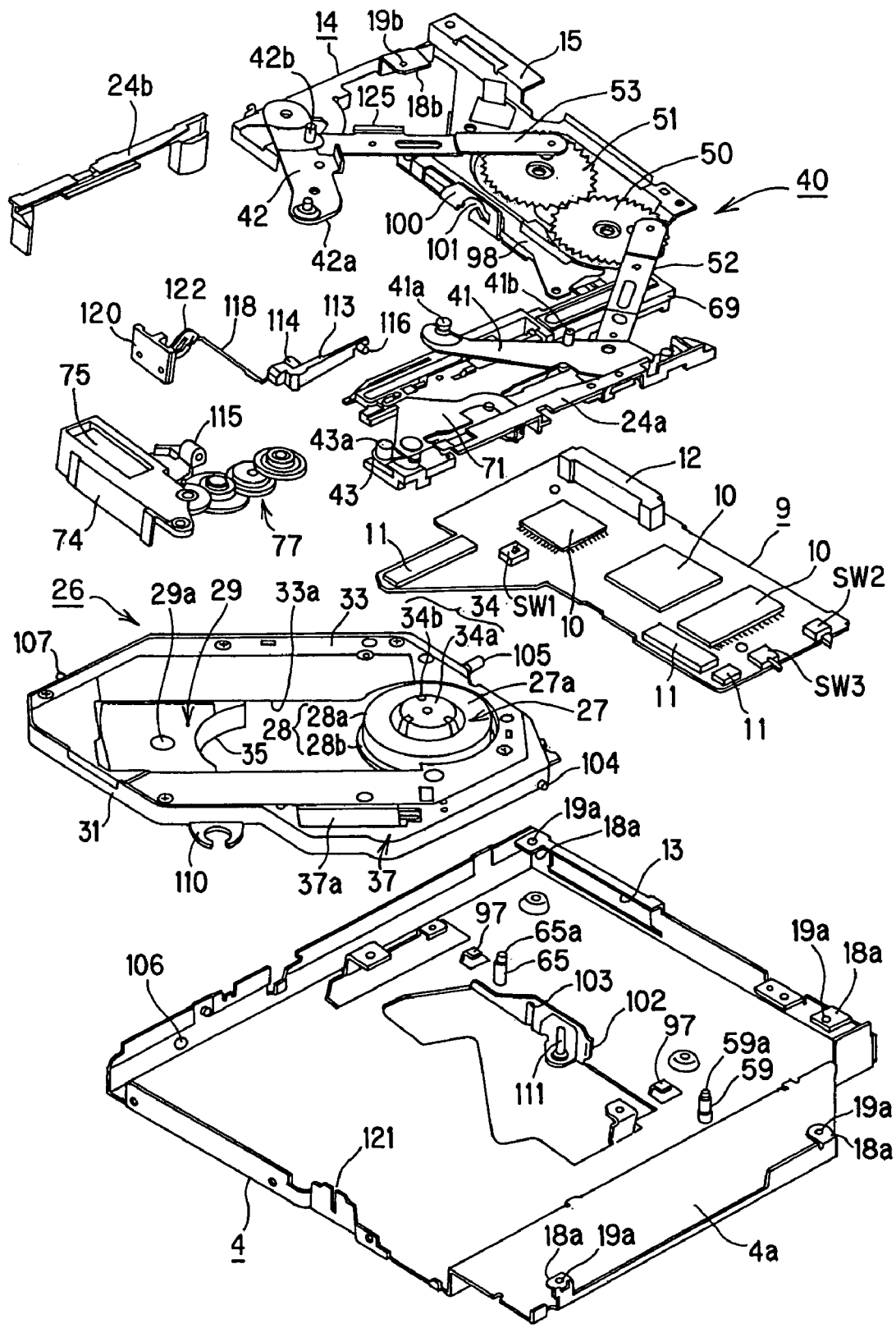
FIG. 5 is an exploded schematic perspective view of the apparatus main body of FIG. 2, showing the configuration thereof.
Figure 6:
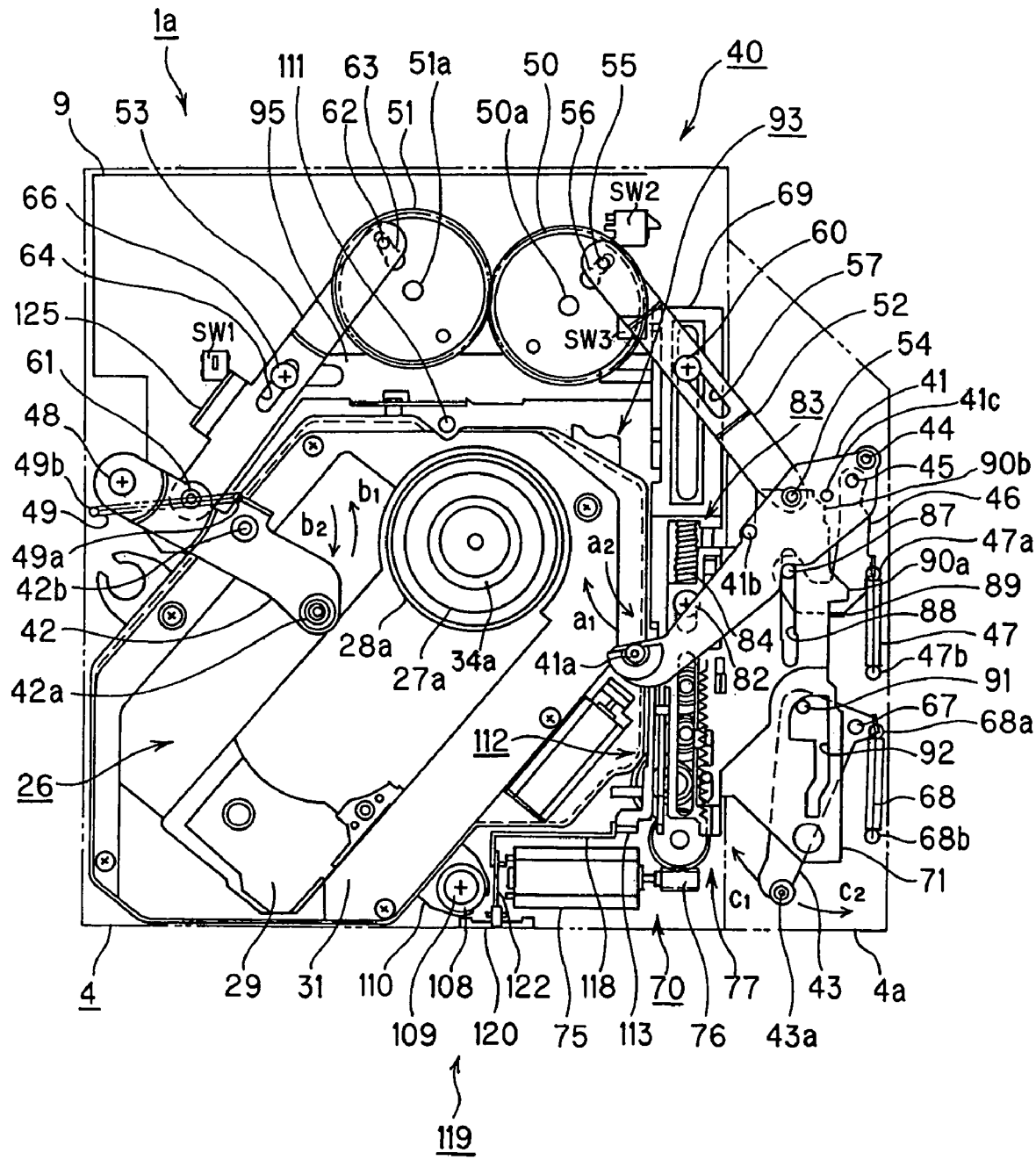
FIG. 6 is a schematic plan view of the apparatus main body of FIG. 2, showing the configuration thereof.
Figure 7:
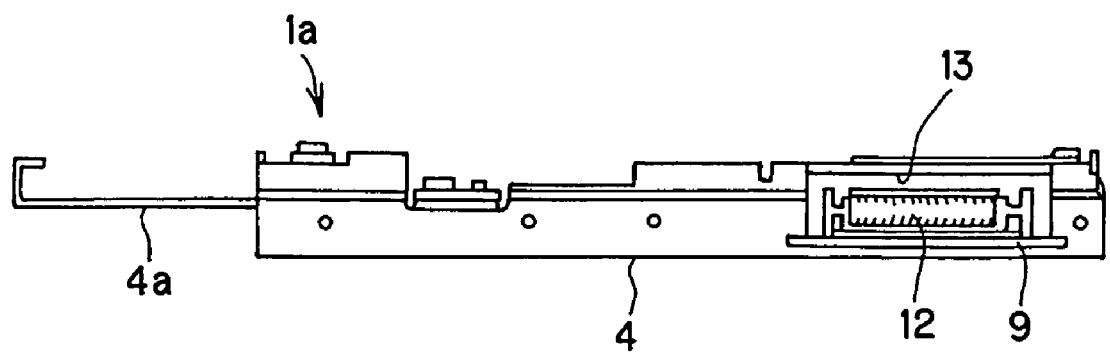
FIG. 7 is a schematic rear view of the apparatus main body of FIG. 2.

As shown in FIGS. 3, 5 and 6, the bottom case 4 is made of a metal plate and shows a substantially flat box-like profile. It has a substantially rectangular bottom surface and is provided at a lateral side thereof with a deck section 4a that outwardly extends and has a bottom surface raised from the remaining bottom surface of the bottom case 4.

A circuit substrate 9 is arranged on the bottom surface of the bottom case 4. It carries thereon a drive control circuit for driving/controlling the components of the apparatus main body 1a. The circuit substrate 9 is fitted to the bottom case 4 at a position near the rear end of the latter by means of screws that are driven into the bottom surface. The drive control circuit arranged on the circuit substrate 9 includes electronic parts 10 such as IC chips, connectors 11 for electrically connecting the components of the drive control circuit and detection switches SW1, SW2, SW3 for detecting the operations of the components as well as an external connector 12 for connecting the drive control circuit and the main body 1001 of the personal computer 1000, which external connector 12 is fitted onto the circuit substrate 9 so as to be exposed to the outside through aperture 13 formed at the rear side of the bottom case 4.

A chassis 14 is rigidly fitted to the bottom surface of the bottom case 4 by means of screws. The chassis 14 is arranged above the circuit substrate 9 so as to divide the inside of the bottom case 4 at a level substantially flush with the deck section 4a. Additionally, the chassis 14 has an enclosing section 15 for enclosing the external connector 12. The enclosing section 15 is formed by bending the chassis 14 along the outer periphery of the external connector 12. With this arrangement, the enclosing section 15 prevents the dust from entering into the inside of the cabinet 3 and raises the strength of the external connector 12 relative to the circuit substrate 9 as it securely holds the external connector 12.

The top cover 4 is fitted to the bottom case 5 and the chassis 14 by means of screws. More specifically, as shown in FIGS. 3 and 4, the top plate section 5a is provided along the outer periphery thereof with a plurality of first through holes 17a that allow so many screws 16 to pass and a second through hole 17b arranged inside relative to the first through holes 17a that also allows a screw 16 to pass. On the other hand, as shown in FIGS. 3 and 5, the bottom case 4 is provided along the outer periphery thereof with a plurality of anchoring pieces 18a having respective first screw holes 19a that correspond to the first through holes 17a of the top cover 5. Additionally, the chassis 14 is provided with a second anchoring piece 18b that is formed by bending a part of the chassis 14 upward and the front end section of the bent part of the chassis 14 is then bent horizontally at a level that is flush with the level of the first anchoring pieces 18a. The second anchoring piece 18b is located inside relative to the outer periphery of the bottom case 4 and outside relative to the outer periphery of the optical disc 2 when it is placed in the disc receiving position. A second screw hole 19b is formed in the above described front end section to correspond to the second threshold hole 17b of the top cover 5.

The cabinet 3 of the disc drive apparatus 1 is formed by closing the top aperture of the bottom case 4 by means of the top plate section 5a of the top cover 5 and driving the screws 16 into the first screw holes 19a of the bottom case 4 and the second screw hole 19b of the chassis 14 respectively through the first through holes 17a and the second threshold hole 17b of the top cover 5.

As a result, the cabinet 3 prevents the dust from entering the inside of the apparatus main body 1a. Additionally, as the top cover 5 is rigidly secured to the second anchoring piece 18b of the chassis 14 that is arranged inside relative to the plurality of first anchoring pieces 18a besides that it is rigidly secured to the first anchoring pieces 18a arranged along the outer periphery of the bottom case 4, it is possible to make the cabinet 3 show an enhanced rigidity without interfering the optical disc 2 inserted into the inside of the cabinet 3. As a result, the disc drive apparatus 1 performs the operation of chucking an optical disc 2, which will be described in greater detail hereinafter, with an enhanced level of operational reliability.

As shown in FIGS. 2 and 3, a substantially rectangular flat front panel 20 is fitted to the front side of the cabinet 3. The front panel 20 is provided with a disc insertion/release port 21 through which an optical disc 2 is inserted and released in a horizontal direction. More specifically, it is possible to insert an optical disc 2 into the inside of the cabinet 3 by way of the disc insertion/release port 21 or take it out to the outside of the cabinet 3 by way of the insertion/release port 21. The front panel 20 is also provided at the outer front surface thereof with an indicator light section 22 that is turned on or off depending on the accessed state of the optical disc 2 and an eject button 23 that is to be depressed when releasing the optical disc 2.

The bottom case 4 is at the opposite lateral sides thereof respectively with a pair of guide members 24a, 24b that are located near the front end of the bottom case 4 to guide the optical disc 2, while restricting the outer periphery of the optical disc 2 both in the vertical direction and in the transversal direction.

As shown in FIGS. 3, 5 and 9A through 9C, one of the paired guide members 24a, 24b, or the guide member 24a, is oblong and made of resin that is little frictional relative to the optical disc 2. It is fitted onto the deck section 4a along the external lateral edge thereof. A guide groove 25a is formed at the lateral side of the guide member 24a opposite to the external lateral edge of the deck section 4a so as to run along the inserting direction of the optical disc 2. The inner surface of the guide groove 25a is curved so as to contact the outer periphery of the optical disc 2 by spot contact.

As shown in FIGS. 3, 5 and 10A through 10C, the other guide member 24b is also oblong and made of resin that is little frictional relative to the optical disc 2 like the guide member 24a. It is fitted to the bottom case 4 along the external lateral edge thereof located opposite to the deck section 4a. A guide groove 25b is formed at the lateral side of the guide member 24b opposite to the external lateral edge of the bottom case 4 so as to run along the inserting direction of the optical disc 2. The inner surface of the guide groove 25b is curved so as to contact the outer periphery of the optical disc 2 by spot contact.

As the inner surfaces of the guide grooves 25a, 25b of the paired guide members 24a, 24b that are to be brought into contact with the outer periphery of the optical disc 2 are curved so as to contact the outer periphery of the optical disc 2 by spot contact, the contact area of the guide members 24a, 24b and the optical disc 2 is minimized so that the optical disc 2 inserted into the cabinet 3 by way of the disc insertion/release port 21 is smoothly guided, while its outer periphery is restricted both in the vertical direction and in the transversal direction.

Particularly, if the optical disc 2, which may be a DVD formed by bonding two disc substrates together with adhesive agent, is inserted through the disc insertion/release port 21, the disc drive apparatus 1 is not influenced by the adhesive agent coming out to the outer periphery of the optical disc 2, if any, so that both the loading operation of drawing the optical disc 2 inserted through the disc insertion/release port 21 into the inside of the cabinet 3 and the eject operation of delivering the optical disc 2 to the outside of the cabinet 3 by way of the disc insertion/release port 21 proceed smoothly.

Note that it is not necessary for the inner surfaces of the above described guide grooves 25a, 25b of the paired guide members 24a, 24b to show an inwardly curve profile as described above. Alternatively, they may show an outwardly curved profile or a polygonal cross section with inwardly inclined slopes so long as they are adapted to contact the outer periphery of the optical disc 2 by spot contact.

(1-2) Configuration of Base Unit

As shown in FIGS. 3, 5, 6 and 11, the apparatus main body 1a includes a base unit 26 that is arranged on the bottom surface of the bottom case 4 to operate as drive main body.

The base unit 26 by turn includes a disc receiving section 27 for receiving the optical disc 2 inserted into the inside of the cabinet 3 through the disc insertion/release port 21, a disc rotary drive mechanism 28 for driving the optical disc 2 loaded in the disc receiving section 27 to rotate, an optical pickup 29 for writing signals on and reading signals from the optical disc 2 as the latter is driven to rotate by the disc rotary drive mechanism 28 and a pickup feed mechanism 30 for moving the optical pickup 29 between the inner and outer peripheries of the optical disc 2, all of which are integrally arranged on the base 31 to realize a very thin structure.

The base unit 26 is arranged on the bottom surface of the bottom case 4 so as to be found closer to the front edge of the bottom case 4 than the circuit substrate 9 and the chassis 14 in such a way that the disc receiving section 27 is located substantially at the center of the bottom surface of the bottom case 4. Additionally, the base unit 26 is adapted to be brought up and down by the base hoisting/lowering mechanism 93, which will be described in greater detail hereinafter. In the initial state, it is placed at a position lower than the optical disc 2 inserted into the inside of the cabinet 3 through the disc insertion/release port 21.

The base 31 is formed by punching a metal plate to produce a predetermined profile and bending a small peripheral part thereof downward. A substantially semicircular table-exposing opening 32a for upwardly exposing the turntable 27a of the disc receiving section 27, which will be described in greater detail hereinafter and a substantially rectangular pickup-exposing opening 32b for upwardly exposing the objective lens 29a of the optical pickup 29, which will also be described in greater detail hereinafter, are formed through the main surface of the base 31. The openings 32a, 32b are continuously formed. A faced plate 33 having an opening 33a that corresponds to the openings 32a, 32b is fitted to the top surface of the base 31.

The disc receiving section 27 has a turntable 27a that is driven to rotate by the disc rotary drive mechanism 28 and a chucking mechanism 34 is arranged at a central part of the turntable 27a to receive an optical disc 2 and hold it in place. The chucking mechanism 34 by turn has an engaging projection 34a to be engaged with the center hole 2a of the optical disc 2 and a plurality of anchoring sections 34b for anchoring the optical disc 2 along the periphery of the center hole 2a that is engaged with the engaging projection 34a so as to hold the optical disc 2 on the turntable 27a.

The disc rotary drive mechanism 28 includes a flat spindle motor 28a for driving the optical disc 2 to rotate integrally with the turntable 27a. The spindle motor 28a is fitted to the lower surface of the base 31 by way of a support plate 28b in such a way that the turntable 27a slightly projects from the table-exposing opening 32a of the base 31.

The optical pickup 29 has an optical block for converging the light beam emitted from a semiconductor laser that operates as light source to the objective lens 29a and irradiating the converged light beam onto the signal recording surface of the optical disc 2 in order to detect the return light reflected from the signal recording surface of the optical disc 2 by means of its photo-detector, which is a light receiving element. It is adapted to write signals on or read signals from the optical disc 2. The optical pickup 29 has a biaxial actuator for driving the objective lens 29a so as to be displaced in the focusing direction that runs in parallel with the optical axis of the objective lens 29a and in the tracking direction that is perpendicular to the optical axis of the objective lens 29a for the purpose of focusing control and tracking control of the objective lens 29a relative to the optical disc 2 according to the detection signal from the optical disc 2 as detected by the above described photo-detector.

The pickup feed mechanism 30 includes a pickup base 35 carrying the optical pickup 29 thereon, a pair of guide shafts 36a, 36b for supporting the pickup base 35 in such a way that the latter can slide in a radial direction of the optical disc 2 and a displacement/drive mechanism 37 for displacing the pickup base 35, which is supported by the pair of guide shafts 36a, 36b, in a radial direction of the optical disc 2.

The pickup base 35 by turn includes a pair of guide pieces 38a, 38b having respective guide holes for allowing one of the pair of guide shafts 36a, 36b, or the guide shaft 36a, to run through them and another guide piece 39 having a guide groove for pinching the other guide shaft 36b in it, the guide pieces 38a, 38b and the guide piece 39 being projecting from the pickup base 35 in opposite directions. Thus, with this arrangement, the pickup base 35 is supported by the pair of guide shafts 36a, 36b so as to be able to slide in a radial direction of the optical disc 2.

The paired guide shafts 36a, 36b are arranged in parallel with each other below the lower surface of the base 31 so as to run in a radial direction of the optical disc 2 and adapted to guide the pickup base 35, which is exposed to the objective lens 29a through the pickup-exposing opening 32b of the base 31, between the inner and outer peripheries of the optical disc 2.

The displacement/drive mechanism 37 is adapted to convert the rotary drive motion of the drive motor 37a fitted to the base 31 into a linear drive motion by way of a gear and a rack (not shown) and drives the pickup base 35 so as to be displaced in a direction running along the pair of guide shafts 36a, 36b, or in a radial direction of the optical disc 2. Note that the optical pickup 29 of this base unit 26 is located at the side of the outer periphery of the optical disc 2 in a radial direction of the optical disc 2 in the initial state.

(1-3) Configuration of Disc Transfer Mechanism

As shown in FIGS. 3, 5 and 6, the apparatus main body 1a has a disc transfer mechanism 40 for transferring the optical disc 2 from a disc insertion/release position where the optical disc 2 is inserted into or discharged from the disc insertion/release port 21 to a disc receiving position where the optical disc 2 is loaded on the turntable 27a of the disc receiving section 27 and vice versa.

The disc transfer mechanism 40 includes a first swing arm 41, a second swing arm 42 and a third swing arm 43 that are located below the optical disc 2 inserted into the cabinet 3 from the disc insertion/release port 21 and adapted to swing in a plane running in parallel with the optical disc 2.

The first swing arm 41 is an oblong and flat plate-like member. It is arranged at one of the opposite sides (e.g., right side in the plan view in FIG. 6) of the turntable 27a of the disc recording section 27 with its base section supported by a spindle 44 projecting upward from the deck section 4a so as to be able to swing around the spindle 44 both in the direction of arrow a1 and in the direction of arrow a2. A first abutment pin 41a is projecting upward from a front end part of the first swing arm 41 so as to abut an outer peripheral part of the optical disc 2 inserted into the cabinet 3 from the disc insertion/release port 21 from the rear surface side of the optical disc 2. A positioning pin 41b is projecting upward from a middle part of the first swing arm 41 so as to abut an outer peripheral part of the optical disc 2 from the rear surface side of the latter with the first abutment pin 41a when positioning the optical disc 2 to the disc receiving position.

Figure 8:
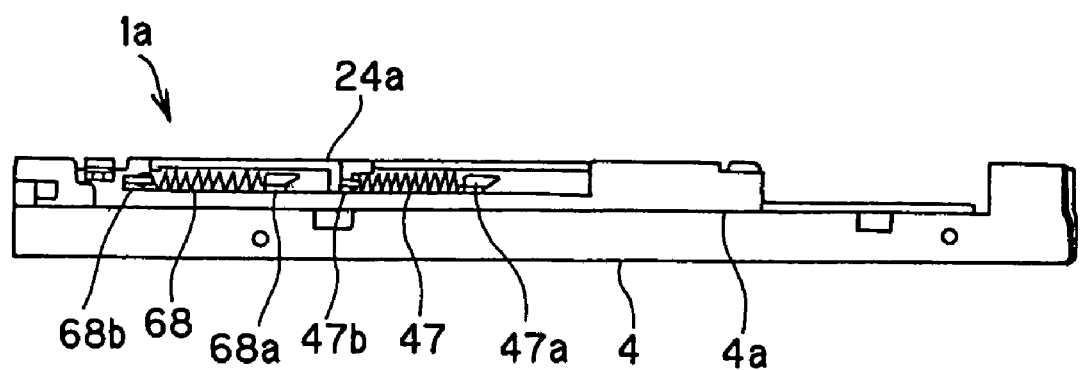
FIG. 8 is a schematic lateral view of the apparatus main body of FIG. 2.
Figure 9A:
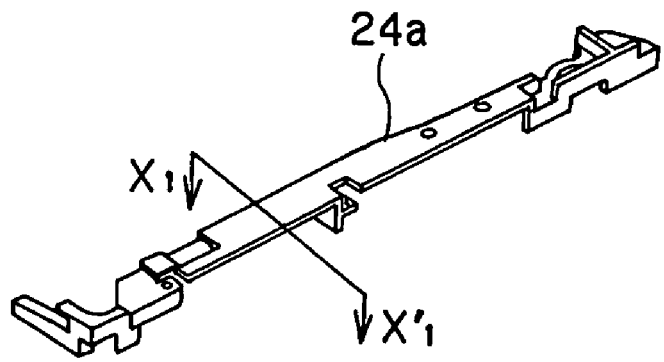
FIG. 9A is schematic perspective view of one of the guide members of the disc drive apparatus of FIG. 2 as viewed from above.
Figure 9B:
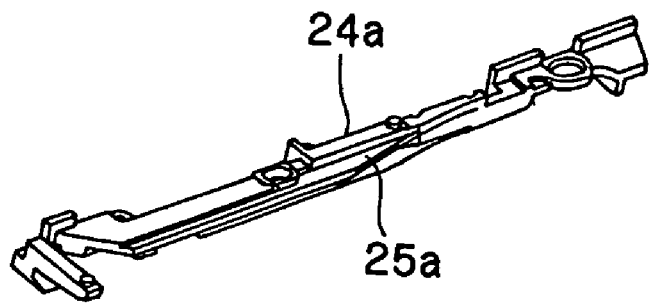
FIG. 9B is a schematic perspective view of the guide member as viewed from below.
Figure 9C:
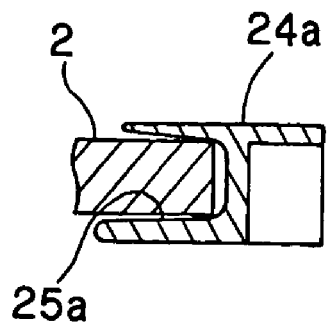
FIG. 9C is a schematic cross sectional view taken along line $X_1$-$X_1'$ in FIG. 9A.
Figure 10A:
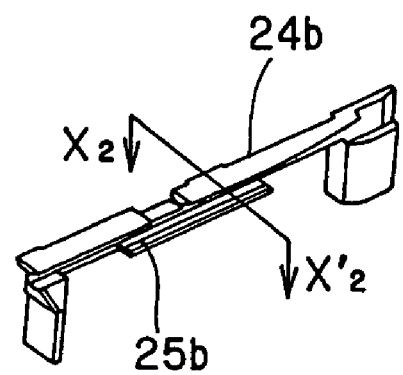
FIG. 10A is a schematic perspective view of the other guide member of the disc drive apparatus of FIG. 2 as viewed from above.
Figure 10B:
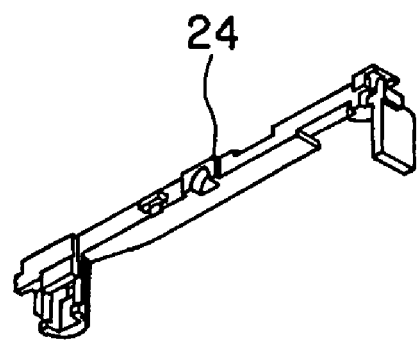
FIG. 10B is a schematic perspective view of the guide member as viewed from below.
Figure 10C:
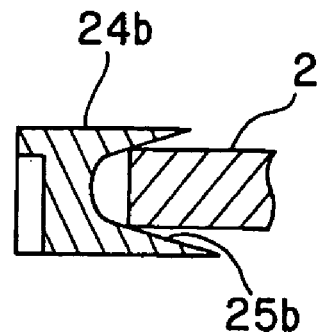
FIG. 10C is a schematic cross sectional view taken along line $X_2$-$X_2'$ in FIG. 10A.

An intermediate arm 46 is fitted to a base end part of the first swing arm 41 by way of a spindle 45 so as to be able to swing around the spindle 45. The intermediate arm 46 has a substantially J-shaped profile and is made of a flat plate. A first tensile coil spring 47 is hooked to a middle part of the intermediate arm 46 at an end 47a thereof. As shown in FIGS. 6 and 8, the other end 47b of the first tensile coil spring 47 is held to the corresponding lateral side of the deck section 4a. Thus, the first swing arm 41 is urged to swing toward the front side of the cabinet 3 or in the direction of arrow a2 by the first tensile coil spring 47 by way of the intermediate arm 46.

As shown in FIGS. 3, 5 and 6, the second swing arm 42 is also an oblong and flat plate-like member. It is arranged at the other side (e.g., left side in the plan view in FIG. 6) of the turntable 27a of the disc receiving section 27 with its base section supported by a spindle (screw) 48 projecting upward from chassis 14 so as to be able to swing around the spindle 48 both in the direction of arrow b1 and in the direction of arrow b2. A second abutment pin 42a is projecting upward from a front end part of the second swing arm 42 so as to abut an outer peripheral part of the optical disc 2 inserted into the cabinet 3 from the disc insertion/release port 21 from the rear surface side of the optical disc 2. A second positioning pin 42b is projecting upward from a middle part of the second swing arm 42 so as to abut an outer peripheral part of the optical disc 2 from the rear surface side of the latter with the second abutment pin 42a when positioning the optical disc 2 to the disc receiving position.

A second tensile coil spring 49 is hooked to a middle part of the second swing arm 42 at an end 49a thereof. The other end 49b of the second tensile coil spring 49 is hooked to the chassis 14. Thus, the second swing arm 42 is urged to swing toward the front side of the cabinet 3 or in the direction of arrow b2 by the second tensile coil spring 49. As the second swing arm 42 is urged to turn from the front side toward the rear side of the cabinet 3, the second tensile coil spring 49 switches its urging direction from the direction of urging the second swing arm 42 toward the front side to the direction of urging it toward the rear side, or from the direction of arrow b2 to the direction of arrow b1. Inversely, as the second swing arm 42 is urged to turn from the rear side toward the front side of the cabinet 3, the second tensile coil spring 49 switches its urging direction from the direction of urging the second swing arm toward the rear side to the direction of urging it toward the front side, or from the direction of arrow b1 to the direction of arrow b2.

The first swing arm 41 and the second swing arm 42 are arranged substantially symmetrically relative to the turntable 27a of the disc receiving section 27 and, in the initial state, their front ends are located inside relative to their base ends and their front ends are located near the front side of the cabinet 3 relative to their base ends. In other words, the first swing arm 41 and the second swing arm 42 become more remote from each other at their base ends than at their front ends.

The disc transfer mechanism 40 includes a link mechanism for interlocking the first swing arm 41 and the second swing arm 42 each other, which link mechanism has a first gear 50 and a second gear 51 engaging each other, a first link arm 52 for linking the first gear 50 to the first swing arm 41 and a second link arm 53 for linking the second gear 51 to the second swing arm 42.

The first gear 50 and the second gear 51 are rotatably fitted to respective positions that are substantially symmetrical relative the center line running through the turntable 27a of the chassis 14 in the inserting direction of the optical disc 2 by way of spindles 50a, 51b.

The first link arm 52 is oblong and made of a flat plate. One of the opposite ends of the first link arm 52 is fitted to the first swing arm 41 by way of spindle 54 so as to be able to swing around the spindle 54 and the other end thereof is provided with an engaging pin 55 projecting downward to engage with engaging hole 56 formed through the main surface of the first gear 50. Thus, the first link arm 52 links the first swing arm 41 and the first gear 50. Additionally, the first link arm 52 is provided at a middle part thereof with a guide slit 57 running in the longitudinal direction thereof. On the other hand, as shown in FIG. 5, the bottom case 4 is provided on the bottom surface thereof with a guide shaft 59 that is standing from the bottom surface into the guide slit 57 and equipped at the front end thereof with a screw hole 59a. As shown in FIG. 6, as screw 60 is driven into the screw hole 59a that is arranged at the front end of the guide shaft 59 in a state where the guide shaft 59 is brought into the guide slit 57 that is arranged at a middle part of the first link arm 52, the first link arm 52 is supported by the guide shaft 59 within a range where the guide shaft 59 can slide in the guide slit 57. As a result, the first link arm 52 can rotate the first gear 50 as the first swing arm 41 turns (in other words, the first swing arm 41 is turned as the first gear 50 rotates).

Similarly, the second link arm 53 is oblong and made of a flat plate. One of the opposite ends of the second link arm 53 is fitted to the second swing arm 42 by way of spindle 61 so as to be able to swing around the spindle 54 and the other end thereof is provided with an engaging pin 62 projecting downward to engage with engaging hole 63 formed through the main surface of the second gear 51. Thus, the second link arm 53 links the second swing arm 42 and the second gear 51. Additionally, the second link arm 53 is provided at a middle part thereof with a guide slit 64 running in the longitudinal direction thereof. On the other hand, as shown in FIG. 5, the bottom case 4 is provided on the bottom surface thereof with a guide shaft 65 that is standing from the bottom surface into the guide slit 64 and equipped at the front end thereof with a screw hole 65a. As shown in FIG. 6, as screw 66 is driven into the screw hole 65a that is arranged at the front end of the guide shaft 65 in a state where the guide shaft 65 is brought into the guide slit 64 that is arranged at a middle part of the second link arm 53, the second link arm 53 is supported by the guide shaft 65 within a range where the guide shaft 65 can slide in the guide slit 64. As a result, the second link arm 53 can rotate the second gear 51 as the second swing arm 42 turns (in other words, the second swing arm 42 is turned as the second gear 51 rotates).

Since the first gear 50 and the second gear 51 are engaged with each other as described above, as one of the gears rotate in a direction, the other gear is forced to rotate in the opposite direction. In other words, the first gear 50 and the second gear 51 are interlocked and turn in opposite directions. Thus, the first swing arm 41 and the second swing arm 42 are interlocked with each other and adapted to swing in opposite directions due to the link mechanism.

As shown in FIGS. 3, 5 and 6, the third swing arm 43 is an oblong and flat plate-like member. It is arranged close to the front end of the cabinet 3 relative to the first swing arm 41, which is one of the swing arms (e.g., right side arm) arranged substantially symmetrically relative to the turntable 27a of the disc receiving section 27, and its base end is supported by a spindle 67 arranged on the deck section 4a so as to be able to swing both in the direction of arrow c1 and in the direction of arrow c2. The third swing arm 43 is provided at the front end thereof with a third abutment pin 43a that is projecting upward so as to abut an outer peripheral part of the optical disc 2 inserted into the cabinet 3 from the disc insertion/release port 21.

As shown in FIGS. 6 and 8, a third tensile coil spring 68 is hooked to the base end side of the third swing arm 43 at an end 68a thereof. The other end 68b of the third tensile coil spring 68 is hooked to the corresponding lateral side of the deck section 4a. Thus, the third swing arm 43 is urged by the third tensile coil spring 68 to turn toward the rear side of the cabinet 3, or in the direction of arrow c1. In the initial state, the front end of the third swing arm 43 is located inside front side relative to the base end thereof.

Thus, the disc transfer mechanism 40 realizes a loading operation of drawing the optical disc 2 inserted through the disc insertion/release port 21 of the cabinet 3 to the disc receiving position of the disc receiving section 27, a centering operation of accurately placing the optical disc 2 to the disc receiving position and an ejecting operation of delivering the optical disc 2 from the insertion/release port 21 to the outside of the cabinet 3 as a result of cooperation of the first swing arm 41, the second swing arm 42 and the third swing arm 43.

The disc transfer mechanism 40 comprises a drive lever 69, which is a first slide member adapted to slide back and forth, a displacement drive mechanism 70 for driving the drive lever 69 so as to displace it back and forth and a movable plate 71, which is a second slide member interlocked with the drive lever 69 and adapted to slide back and forth for the purpose of realizing the loading operation, the centering operation and the ejecting operation of the optical disc 2 by means of the first swing arm 41, the second swing arm 42 and the third swing arm 43.

As shown in FIGS. 6, 12A, 12B and 13A through 13D, the drive lever 69 has a substantially cubic profile and is made of resin. It is arranged along one of the lateral sides of the bottom case 4 and between the bottom case and the circuit substrate 9 and the base unit 26. The drive lever 69 is located below the optical disc 2 inserted from the disc insertion/release port 21 into the inside of the cabinet 3 and its top surface is substantially flush with the bottom surface of the deck section 4a.

The drive lever 69 has a pair of longitudinal guide slits 72a, 72b that are formed by vertically cutting through the drive lever 69 and arranged respectively at the front side and at the rear side of the drive lever 69. The spindles of a gear group 77, which will be described in greater detail hereinafter, are inserted into the front guide slit 72a of the drive lever 69, while the above described guide shaft 59 standing from the bottom surface of the bottom case 4 is inserted into the rear guide slit 72b so that the drive lever 69 may slide back and forth.

A rack gear 73 is formed on the bottom surface of the drive lever 69 and extends longitudinally from the front end to a middle part thereof. On the other hand, as shown in FIGS. 3, 5 and 6, the displacement drive mechanism 70 has a drive motor 75 held in the motor case 74 arranged at the front side of the bottom surface of the bottom case 4, a worm gear 76 fitted to the rotary shaft of the drive motor 75 and a gear group 77 arranged between the worm gear 76 and the rack gear 73 of the drive lever 69. The spindles of the gears of the gear group 77 are supported on the bottom case 4. As the drive motor 75 of the displacement drive mechanism 70 is driven to rotate in one direction (forwardly), the drive lever 69 is driven and displaced toward the rear side of the cabinet 3 by way of the worm gear 76, the gear group 77 and the rack gear 73. On the other hand, as the drive motor 75 is driven to rotate in the opposite direction (backwardly), the drive lever 69 is driven and displaced toward the front side of the cabinet 3 by way of the worm gear 76, the gear group 77 and the rack gear 73.

Figure 14A:
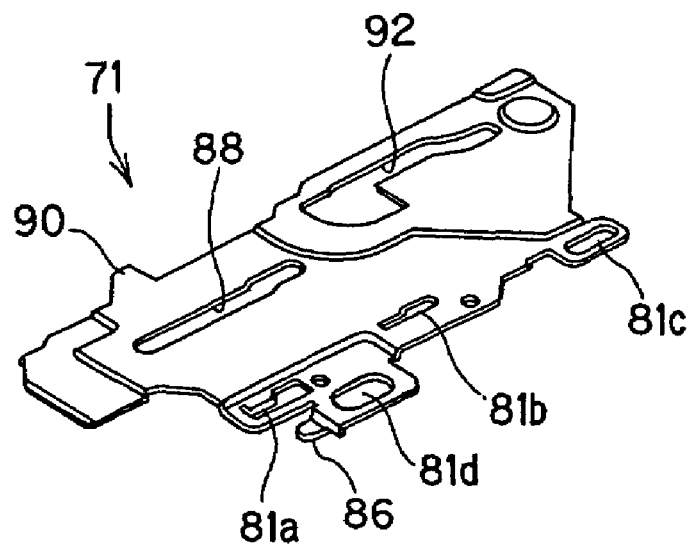
FIG. 14A is a schematic perspective view of the movable plate of the disc drive apparatus of FIG. 2.
Figure 14B:
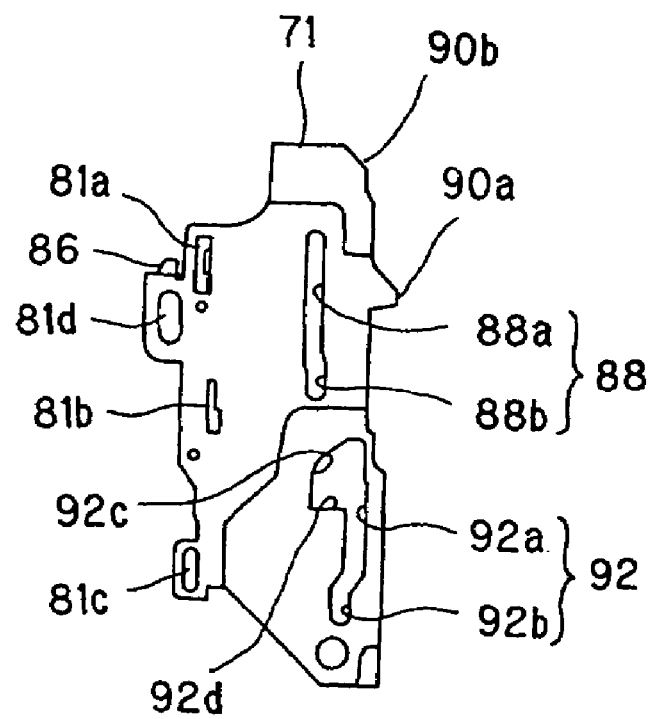
FIG. 14B is a schematic plan view of the movable plate, showing the configuration thereof.

As shown in FIGS. 12A, 12B and 13A through 13D, three guide pieces 78a, 78b, 78c, a guide pin 79 and a screw hole 80 are arranged on the top surface of the drive lever 69. On the other hand, as shown in FIG. 14, the movable plate 71 is formed by punching a metal plate to show a predetermined profile and arranged on the deck section 4a. The movable plate 71 is provided with three guide slits 81a, 81b, 81c and a guide slit 81d through which screw 82 is inserted. The guide slits are arranged in the longitudinal direction of the movable plate 71. As shown in FIG. 6, the drive lever 69 and the movable plate 71 become engaged with each other along a plane that runs in parallel with the optical disc 2 so as to be able to slide together in a same direction as the two guide pieces 78a, 78b of the drive lever 69 are engaged respectively with the two guide slits 81a, 81b of the movable plate 71 and the guide piece 81c of the drive lever 69 is engaged with an edge section of the movable plate 71, while the guide pin 79 of the drive lever 69 is engaged with the guide slit 81c of the movable plate 71 and a screw 82 is driven into the screw hole 80 of the drive lever 69 by way of the guide slit 81d of the movable plate 71.

A buffer mechanism 83 is arranged between the drive lever 69 and the movable plate 71 to absorb the difference between the extent of displacement of the drive lever 69 and that of the movable plate 71 that can be produced when the drive lever 69 is driven and displaced in the direction of releasing the optical disc 2 by the displacement drive mechanism 70 and the optical disc 2 is subjected to a force directed opposite to the direction of releasing the optical disc 2 that is being delivered from the disc insertion/release port 21 to the outside of the cabinet 3.

The buffer mechanism 83 has a compression coil spring 84, which is a buffer member. The compression coil spring 84 is held in a holding hole 85 arranged between the pair of guide slits 72a, 72b of the drive lever 69 as shown in FIGS. 12 and 13. The rear end of the compression coil spring 84 is held by a protruding section 85a projecting from the rear end of the holding hole 85. On the other hand, the front end of the compression coil spring 84 is held by a protruding section 86 projecting from near the guide slit 81*d* of movable plate 71 as shown in FIG. 14.

As shown in FIGS. 6 and 14, the movable plate 71 has a first cam slit 88 that is engaged with a first cam pin 87 arranged on the intermediate arm 46, a pressure-applying piece 90*a* for pressing pressure-receiving piece 89 arranged on the intermediate arm 46 from the rear side and a pressure-applying section 90*b* for pressing pressure-receiving projection 41*c* arranged on the first swing arm 41 from the front side in order to operate the first swing arm 41 and the second swing arm 42 to turn.

The first cam slit 88 includes a first slit section 88*a* and a second slit section 88*b* that extend linearly and longitudinally. The second slit section 88*b* that is formed linearly so as to extend backwardly from the front end of the cam slit 88 is outwardly slightly diverted from the first slit section 88*a* that is formed linearly so as to extend forwardly from the rear end of the cam slit 88.

The pressure-applying piece 90*a* projects outwardly from a lateral edge of the movable plate 71 and is adapted to abut the pressure-receiving piece 89 formed by upwardly bending a middle part of the intermediate arm 46 from the rear side.

The pressure-applying section 90*b* is formed by partly cutting off the movable plate 71 from the rear edge thereof and is adapted to abut the pressure-receiving projection 41*c* projecting downward from a middle part of the first swing arm 41 from the front side.

On the other hand, the movable plate 71 has a second cam slit 92 to be engaged with a second cam pin 91 arranged on the third swing arm 43 for the purpose of operating the third swing arm 43 to turn. The second cam slit 92 includes a first slit section 92*a* and a second slit section 92*b* that extend linearly and longitudinally. The second slit section 92*b* that is formed linearly so as to extend backwardly from the front end of the cam slit 92 is inwardly slightly diverted from the first cam slit section 92*a* that is formed linearly so as to extend forwardly from the rear end of the cam slit 92. Additionally, the second cam slit 92 includes a third slit section 92*c* showing an inwardly curved arc extending from the rear end of the first slit section 92*a* to a middle part thereof and a linear fourth slit section 92*d* extending from the front end of the third slit section 92*c* to a middle part of the first slit section 92*a*. An opening where the second cam pin 91 can freely move is defined by the third slit section 92*c*, the fourth slit section 92*d* and a middle part of the first slit section 92*a*.

(1-4) Configuration of Base Hoisting/Lowering Mechanism

As shown in FIGS. 3, 5 and 6, the apparatus main body 1*a* has a base hoisting/lowering mechanism 93 that is adapted to elevate and lower the base 31 of the base unit 26 as a motion interlocked with the above described sliding motion of the drive lever 69.

The base hoisting/lowering mechanism 93 operates to elevate and lower the base 31 between a chucking position which is an elevated position of the base 31 and also a position for holding the optical disc 2 that is placed on the disc receiving position on the turntable 27*a* of the disc receiving section 27, an unchucking position, which is a lowered position of the base 31 and also a position for releasing the optical disc 2 from the turntable 27*a* of the disc receiving section 27 by way of an intermediate position which is a position of the base 31 located between the chucking position and the unchucking position and also a position for recording signals on or reproducing signals from the optical disc 2.

As shown in FIGS. 12A, 12B and 13A through 13D, the above described drive lever 69 is provided with a longitudinally extending first cam slit 94 on the lateral side thereof facing the base 31 for the purpose of hoisting/lowering the base 31. The first cam slit 94 has a first horizontal surface section 94*a* for placing the base 31 at the above described unchucking position, a top surface section 94*b* for placing the base 31 at the above described chucking position and a second horizontal surface section 94*c* for placing the base 31 at the above described intermediate position.

As shown in FIG. 6 and 15A through 15C, a cam lever 95, which is a third slide member, is arranged along the rear lateral side of the base 31 on the bottom surface of the bottom case 4. The cam lever 95 is an oblong and flat plate-like member. A pair of front and rear guide slits 96*a*, 96*b* and a guide slit 96*c*, which is located between the paired guide slits 96*a*, 96*b* and adapted to allow the above described guide shaft 65 to run through it, are formed by cutting through the main surface thereof. On the other hand, as shown in FIG. 5, a pair of guide pieces 97*a*, 97*b* that are to be engaged respectively with the paired guide slits 96*a*, 96 are formed by cutting and bending the bottom case 4. With this arrangement, the cam lever 95 is supported so as to be able to slide along the rear lateral side of the base 31 in a direction substantially perpendicular to the sliding direction of the drive lever 69.

Figure 15A:
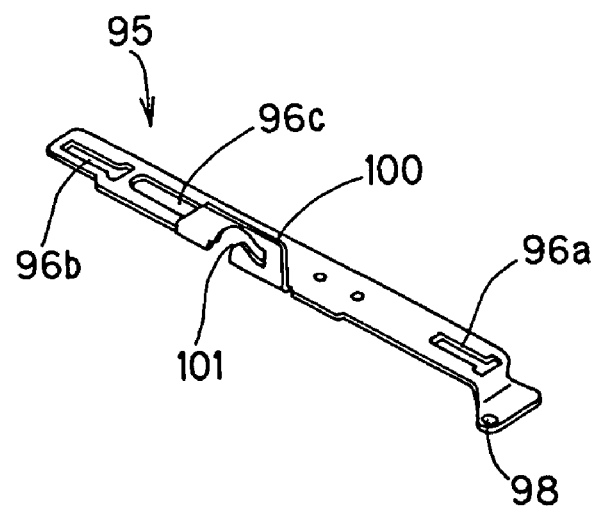
FIG. 15A is a schematic perspective view of the cam lever of the disc drive apparatus of FIG. 2, showing the configuration thereof.
Figure 15B:
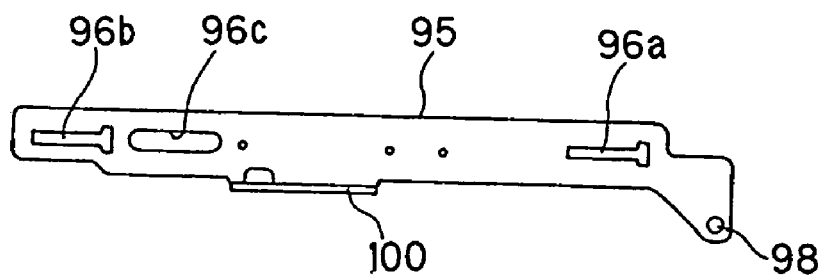
FIG. 15B is a schematic plan view of the cam lever, showing the configuration thereof.
Figure 15C:
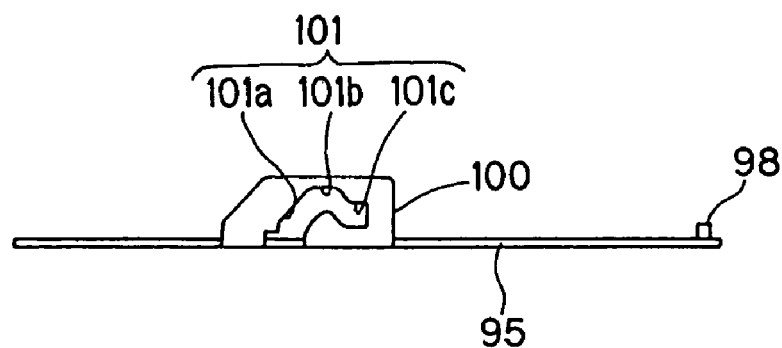
FIG. 15C is a schematic lateral view of the cam lever, showing the configuration thereof.

Additionally, as shown in FIGS. 15A through 15C, the cam lever 95 is provided at a position intersecting the drive lever 69 with an upwardly projecting guide pin 98. On the other hand, as shown in FIGS. 12A, 12B and 13A through 13D, the drive lever 69 is provided on the bottom thereof with a guide slit 99 to be engaged with the guide pin 98. Thus, the motion of the cam lever 95 is interlocked with the back and forth sliding motion of the drive lever 69 so that the guide pin 98 slides in the guide slit 99 to allow the cam lever 95 to slide in a direction perpendicular to the sliding direction of the drive lever 69.

As shown in FIGS. 15A through 15C, a cam piece 100 is formed by upwardly bending a middle part of the edge of the cam lever 95 that is located vis-à-vis the base 31 for the operation of hoisting and lowering the base 31. The cam piece 100 is provided with a second cam slit 101, which second cam slit 101 by turn has a first horizontal surface section 101*a* for placing the base 31 at the above described unchucking position, a top surface section 101*b* for placing the base 31 at the above described chucking position and a second horizontal surface section 101*c* for placing the base 31 to the above described intermediate position. As shown in FIG. 5, a bent piece 102 is formed on the bottom surface the bottom case 4 by cutting and bending the bottom case 4 along the rear lateral side of the base 31. The bent piece 102 is provided with a vertical slit 103 to be used to elevate and lower the base 31.

Figure 11:
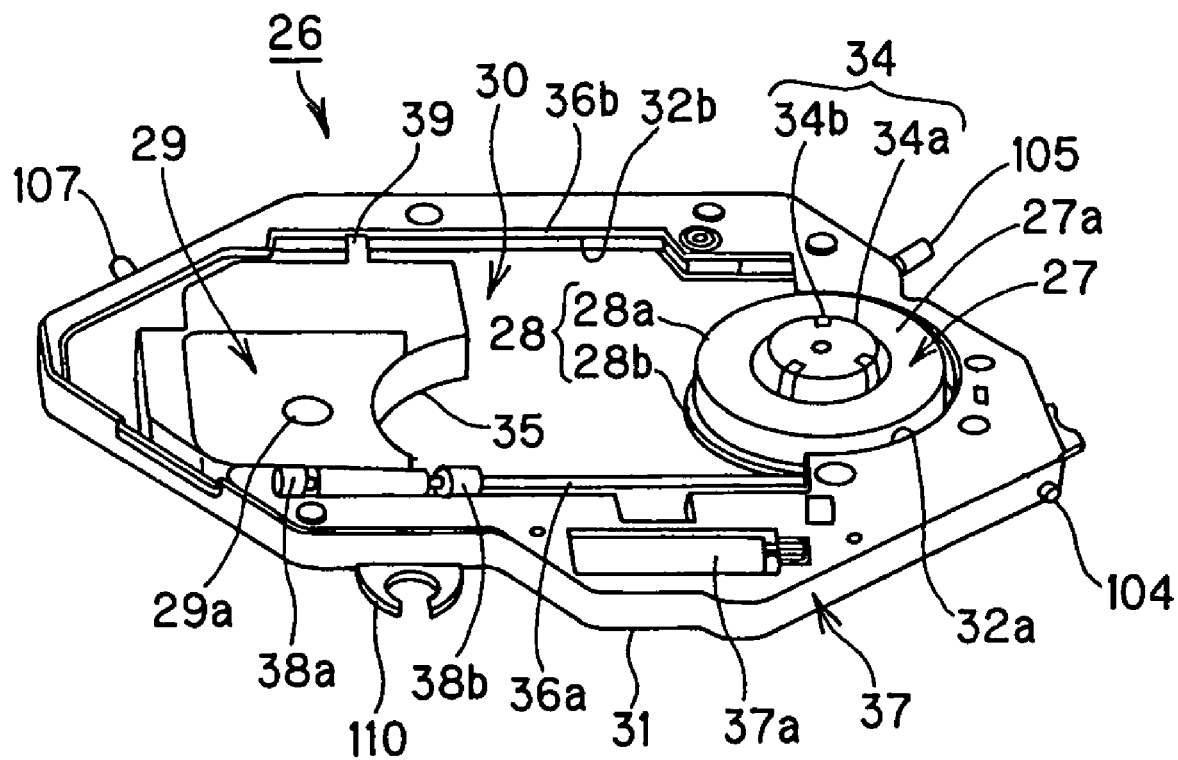
FIG. 11 is a schematic perspective view of the base unit of the disc drive apparatus of FIG. 2.
Figure 12A:
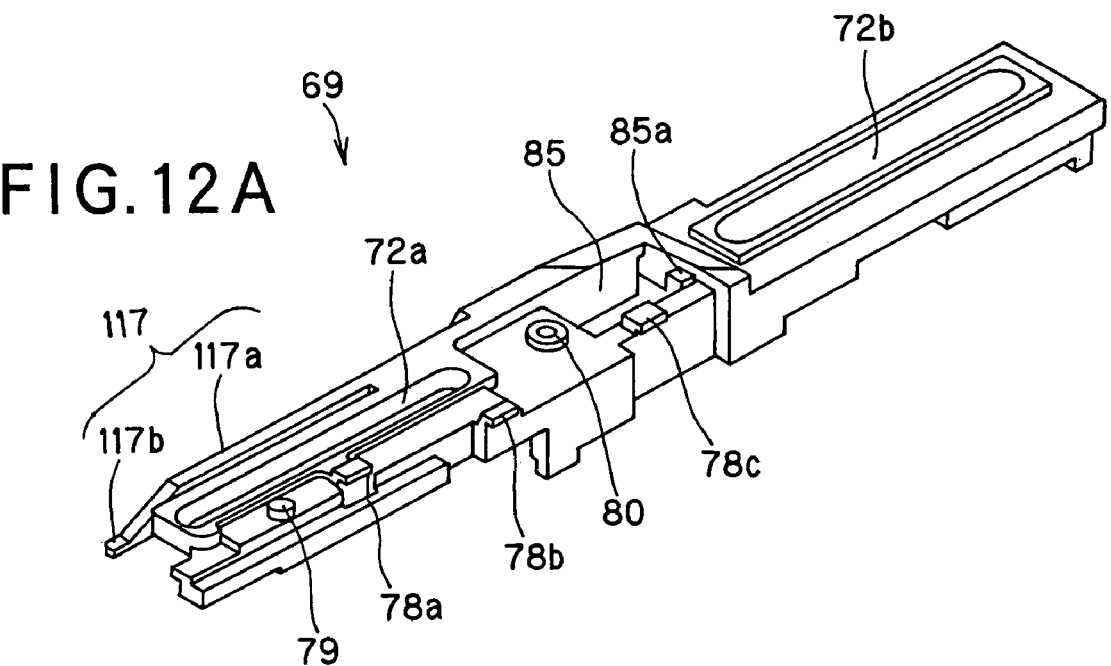
FIG. 12A is a schematic perspective view of the drive lever of the disc drive apparatus of FIG. 2, as viewed from above.
Figure 12B:
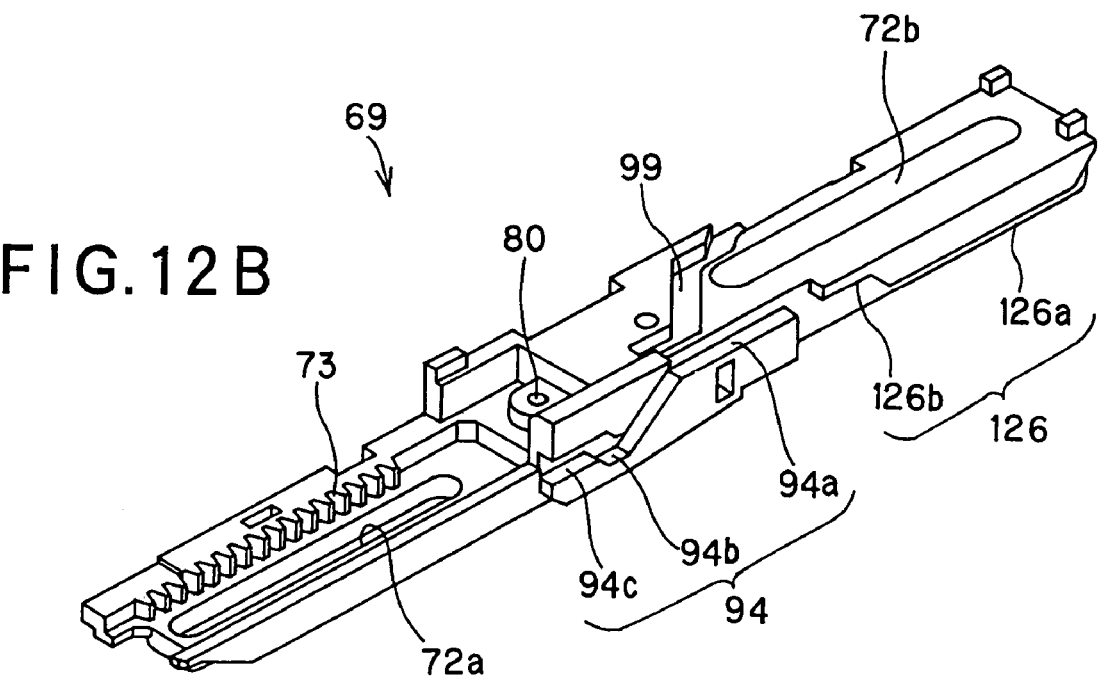
FIG. 12B is a schematic perspective view of the drive lever as viewed from below.
Figure 13A:
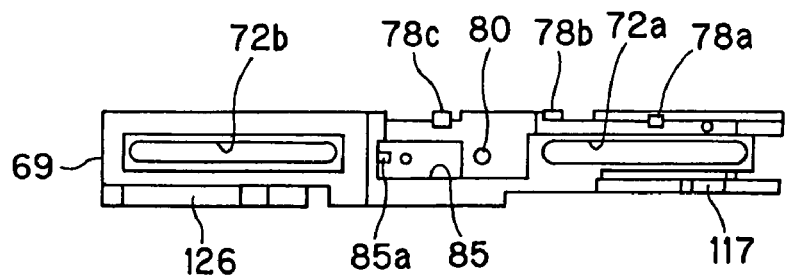
FIG. 13A is a schematic plan view of the drive lever as viewed from above.
Figure 13B:
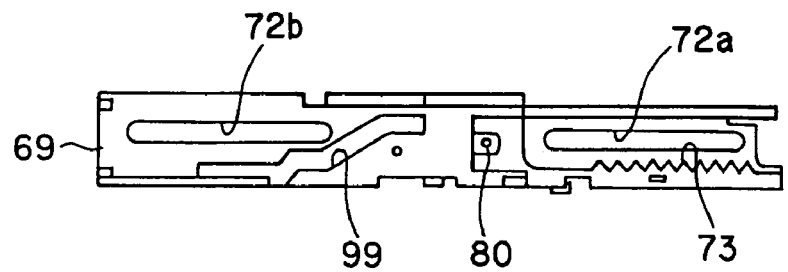
FIG. 13B is a schematic bottom view of the drive lever as viewed from below.
Figure 13C:
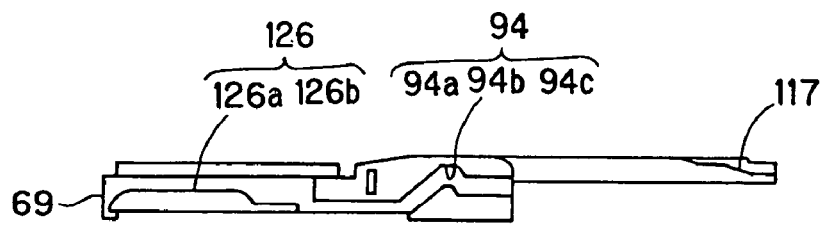
FIG. 13C is a schematic lateral view of the drive lever as viewed from a lateral side thereof.
Figure 13D:
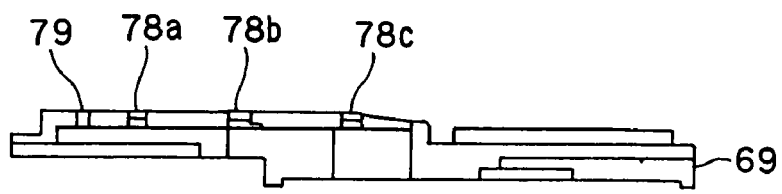
FIG. 13D is a schematic lateral view of the drive lever as viewed from the other lateral side thereof.

On the other hand, as shown in FIGS. 5, 6 and 11, the base 31 has a first spindle 104 arranged at the lateral side thereof located close to the disc receiving section 27 and vis-à-vis the drive lever 69 so as to be engaged with and supported by the first cam slit 94 of the drive lever 69, a second spindle 105 arranged at the lateral side thereof located close to the disc receiving section 27 and vis-à-vis the cam lever 95 so as to be engaged with and supported by the second cam slit 101 of the cam piece 100 and the vertical slit 103 of the bent piece 102, a third spindle 107 arranged at the front lateral side thereof located opposite to the lateral side facing the drive lever 69 and rotatably supported in the spindle hole 106 formed at the above described other lateral surface of the bottom case 4 and an fixed section 110 arranged at the front lateral side thereof located opposite to the lateral side facing the cam lever 95 and rigidly fitted to the bottom surface of the bottom case 4 by a screw 109 by way of an insulator 108 made of a resilient material such as rubber.

With this arrangement, the motion of the base 31 is interlocked with the sliding motion of the drive lever 69 and that of the cam lever 95 so that the first spindle 104 of the base 31 slides in the first cam slit 94 and the second spindle 105 slides in the second cam slit 101 and the vertical slit 103 so that the side of the base 31 located at the side of the disc receiving section 27 can be elevated and lowered relative to the front side thereof.

As shown in FIGS. 5 and 6, the bottom case 4 is provided on the bottom surface thereof with a pushing up pin 111, which is an unchucking means for releasing the optical disc 2 loaded on the turntable 27a of the disc receiving section 27 from the turntable 27a when the base 31 is lowered by the base hoisting/lowering mechanism 93. The pushing up pin 111 is located at the rear side of the base 31 at a position near the disc receiving section 27 of the base unit 26, or at the position closest to the disc receiving section 27 to be more accurate, and projects upward from the bottom surface of the bottom case 4.

(1-5) Configuration of Disc Guide Mechanism

As shown in FIGS. 3, 5 and 6, the apparatus main body 1a has a disc guide mechanism 112 that is arranged near the front end thereof for restricting the insertion angle of the optical disc 2 inserted from the disc insertion/release port 21 and guiding the latter.

The disc guide mechanism 112 includes an insertion guide lever 113 that is operated to rise and fall in synchronism with the rising and falling motion of the base 31 produced by the base hoisting/lowering mechanism 93. The insertion guide lever 113 is an oblong and flat plate-like member made of resin that is little frictional relative to the optical disc 2. It is arranged along the inserting direction of the optical disc 2 and, at the same time, rotatably supported as the spindle 114 arranged at the base end thereof is engaged with the bearing section 115 arranged at the rear side of the motor case 74. Additionally, a guide pin 116 is formed at the front end of the insertion guide lever 113 to project toward the drive lever 69. On the other hand, as shown in FIGS. 12A, 12B and 13A through 13D, the drive lever 69 is provided with a first cam section 117 which the guide pin 116 contacts and on which the latter slides. The first cam section 117 has a first horizontal surface section 117a that is substantially flush with the top surface of the drive lever 69 and a second horizontal surface section 117b lower than the first horizontal surface section 117a by a step.

As shown in FIGS. 5 and 6, an end of a torsion spring 118 that is supported by the rear surface of the motor case 74 is fitted to the base end of the insertion guide lever 113. The base end of the insertion guide lever 113 is urged upward by the resilient force of the torsion spring 118. On the other hand, the front end of the insertion guide lever 113 is urged downward so that the guide pin 116 is constantly pressed against the top surface of the first cam section 117.

Therefore, as the drive lever 69 is driven to slide back and forth, the guide pin 116 slides on the top surface of the first cam section 117 so that the insertion guide lever 113 is driven to rise and fall between a guide position for restricting the insertion angle of the optical disc 2 that is inserted from the disc insertion/release port 21 and a retreat position where it is separated from the lower surface of the optical disc 2 loaded on the turntable 27a of the disc receiving section 27.

(1-6) Configuration of Shutter Opening/Closing Mechanism

As shown in FIGS. 3, 5 and 6, the apparatus main body 1a has a shutter opening/closing mechanism 119 for preventing a second optical disc 2 from entering from the disc insertion/release port 21 into the inside of the cabinet 3 in a state where the optical disc 2 is loaded on the turntable 27a of the disc receiving section 27.

The shutter opening/closing mechanism 119 includes a shutter member 120 that is raised and lowered in synchronism with the operation by the disc guide mechanism 112 of raising and lowering the insertion guide lever 113. The shutter member 120 is an oblong and flat plate-like member. It is supported by the bottom case 4 and can slide up and down as its rear side is engaged with the vertical slit 121 arranged at the front surface of the bottom case 4. The rear surface of the shutter member 120 is supported by an end of the swing arm 122 that is supported by the lateral surface of the motor case 74 so as to be able to swing. The other end of the torsion spring 118 is fitted to the other end of the swing arm 122. The swing arm 122 is urged upward at the other end by the resilient force of the torsion spring 118. On the other hand, the swing arm 122 is urged downward at the one end so that the shutter member 120 is held low.

With regard to the shutter opening/closing mechanism 119, as the insertion guide lever 113 is driven to show a rising and falling motion that is interlocked with the back and forth sliding motion of the drive lever 69, the torsion spring 188 that is supported by the motor case 74 is turned around its axis to reverse the direction of the urging force of the torsion spring 118. In other words, the other end of the swing arm 122 is urged downward by the urging force of the torsion spring 118, while the one end of the swing arm 122 is urged upward. As a result, the shutter member 120 is held high.

Thus, as the drive lever 69 is driven to slide back and forth, the shutter member 120 is driven to move between a closed position for closing the moving path of the optical disc 2 inserted from the disc insertion/release port 21 and an open position for opening the moving path of the optical disc 2 inserted from the disc insertion/release port 21 in synchronism with the rising and falling motion of the insertion guide lever 113 produced by the disc guide mechanism 112.

Meanwhile, as shown in FIG. 3, protection film 123 is formed on the second swing arm 42 and the base 31, which are described in detail above, in order to prevent them from contacting the signal recording surface of the optical disc 2. The protection film 123 is made of a material that is little frictional relative to the optical disc 2 and a plurality of pieces of protection film 123 are formed at positions that correspond to the outer periphery of the optical disc 2 placed on the disc receiving position. A protection sheet 124 is applied to the base 31 at a front side thereof in order to prevent the base 31 from contacting the signal recording surface of the optical disc 2 that is inserted from the disc insertion/release port 21.

As shown in FIG. 6, of the plurality of detection switches SW1, SW2, SW3 arranged on the circuit substrate 9 as described earlier, the first detection switch SW1 is adapted to detect the presence or absence of the optical disc 2 inserted from the disc insertion/release port 21 and give a command for starting a driving operation of the drive lever 69. The first detection switch SW1 is arranged near the second link arm 53. On the other hand, a pressure-applying piece 125 is formed by bending a middle part of the second link arm 53 to press the detector of the first detection switch SW1.

As the first swing arm 41 and the second swing arm 42 are turned to the rear side of the cabinet 3 as an optical disc 2 is inserted into the cabinet 3, the detector of the first detection switch SW1 is pressed by the pressure-applying piece 125 of the second link arm 53 and turned on. As long as the first swing arm 41 and the second swing arm 42 are located closer to the rear side of the cabinet 3 than the detecting position of the detector, or as long as the optical disc 2 is in the cabinet 3 in other words, the detector keeps on being pressed by the pressure-applying piece 125 and the first detection switch SW1 is held to the ON state.

The second detection switch SW2 and the third detection switch SW3 are adapted to detect the position of the drive lever 69 and control the driving operation of the drive lever 69. They are arranged along the edge of the circuit substrate 9 that is located vis-à-vis the drive lever 69 and separated from each other by a predetermined distance.

Of the second and third detection switches SW2, SW3, the second detection switch SW2 is arranged closer to the rear side of the cabinet 3 than the third detection switch SW3. It is turned on as the drive lever 69 slides toward the rear side of the cabinet 3 and the detector thereof is pressed by the corresponding lateral side of the drive lever 69. As long as the drive lever 69 is located closer to the rear side of the cabinet 3 than the detecting position of the detector, the detector keeps on being pressed by the lateral side of the drive lever 69 and the second detection switch SW2 is held to the ON state.

On the other hand, the third detection switch SW3 is arranged closer to the front side of the cabinet 3 than the second detection switch SW2. It is turned on as its detector is pushed up by the second cam section 126 arranged at the corresponding lateral side of the drive lever 69. As shown in FIGS. 12A and 12B and 13A through 13D, the second cam section 126 arranged at the drive lever 69 has a first horizontal surface section 126a that is adapted to push up the detector of the third detection switch SW3 to turn on the third switch SW3 and a second horizontal surface section 126b that is arranged closer to front side of the cabinet 3 and lower than the first horizontal surface section 126a to turn off the third switch SW3. In the initial state, the third detection switch SW3 is pushed up by the first horizontal surface section 126a and held in the ON state.

(2) Configuration of Frame

Figure 16:
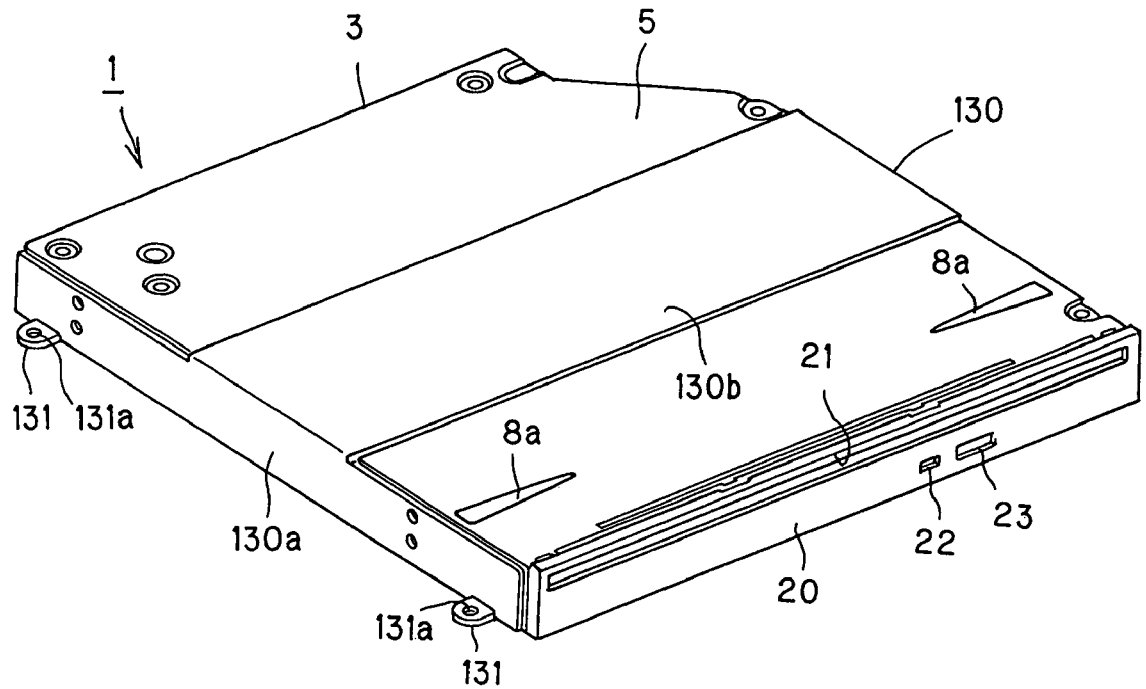
FIG. 16 is a schematic perspective view of the disc drive apparatus of FIG. 2 in a state where it is held in a frame.

The disc drive apparatus 1 having the above described configuration is then held by a frame 130 as shown in FIG. 16 and mounted in the main body 1001 of the personal computer 1000.

The frame 130 is made of a metal plate that shows a level of rigidity sufficient to meet the requirement of fitting the disc drive apparatus 1 to the main body 1001 of the personal computer. It has a pair of lateral surface supporting sections 130a for supporting the opposite lateral surfaces of the cabinet 3 and a top surface supporting section 130b that links the paired lateral surface supporting sections 130a and is adapted to support the top surface of the cabinet 3.

The paired lateral surface supporting sections 130a have a profile substantially same as the lateral surfaces of the cabinet 3 and are fitted to the lateral surfaces of the cabinet 3 by means of screws. The lateral surface supporting sections 130a are provided at the lower ends thereof to be located close to the bottom case 4 with a plurality of anchoring pieces 131 formed by bending and extending outwardly from the lower ends. The anchoring pieces 131 are provided by turn with respective through holes 131a for allowing screws to run through them when the frame is anchored to the main body 1001 of the personal computer. Thus, the frame 130 is fitted to the bottom surface of the main body 1001 by means of screws while it holds the disc drive apparatus 1.

Figure 17:
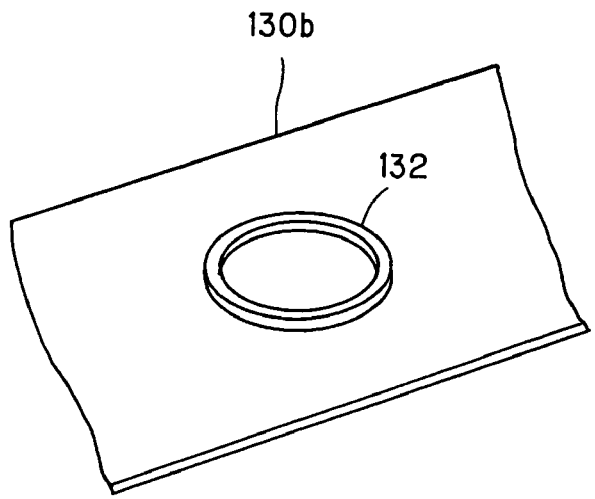
FIG. 17 is a schematic perspective view of a principal part of the frame of FIG. 16, showing the projection arranged at the support section of the top surface of the frame.

The top surface supporting section 130b links upper ends of the paired lateral surface supporting sections 130a, which are located close to the top cover 5, at middle parts of the sections 130a so as to abut the main surface of the top cover 5 opposite to the main surface thereof that is located vis-à-vis the turntable 27a. As shown in FIG. 17, the main surface of the top surface supporting section 130b that is located vis-à-vis the top cover 5 is provided with a substantially annular protruding section 132. The protruding section 132 is adapted to abut the recessed part of the main surface of the top plate section 5a that corresponds to the abutment projection 7 formed on the other main surface of the top plate section 5a located vis-à-vis the turntable 27a. With this arrangement, the top cover 5 is supported by the top surface supporting section 130a of the frame 130 at the main surface of the abutment projection 7 that is the surface thereof opposite to the main surface located vis-à-vis the turntable 27a.

(3) Operations of Disc Drive Apparatus

Now, the operation of the disc drive apparatus 1 will be described specifically below.

(3-1) Initial Operation

Figure 31:
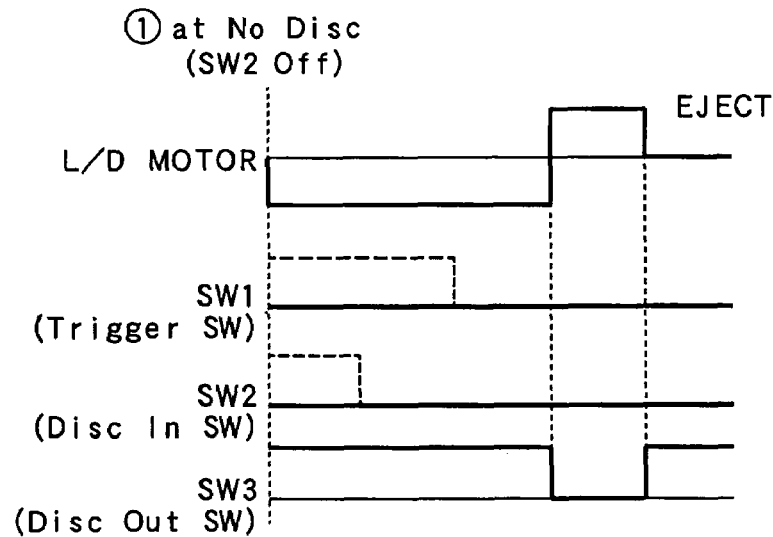
FIG. 31 is a timing chart of the starting operation of the disc drive apparatus of FIG. 2, illustrating how the first switch, the second switch and the third switch are turned on/off for the operation.

The disc drive apparatus 1 carries out an initial operation according to the timing chart illustrated in FIG. 31 before an optical disc 2 is loaded in it.

Figure 18:
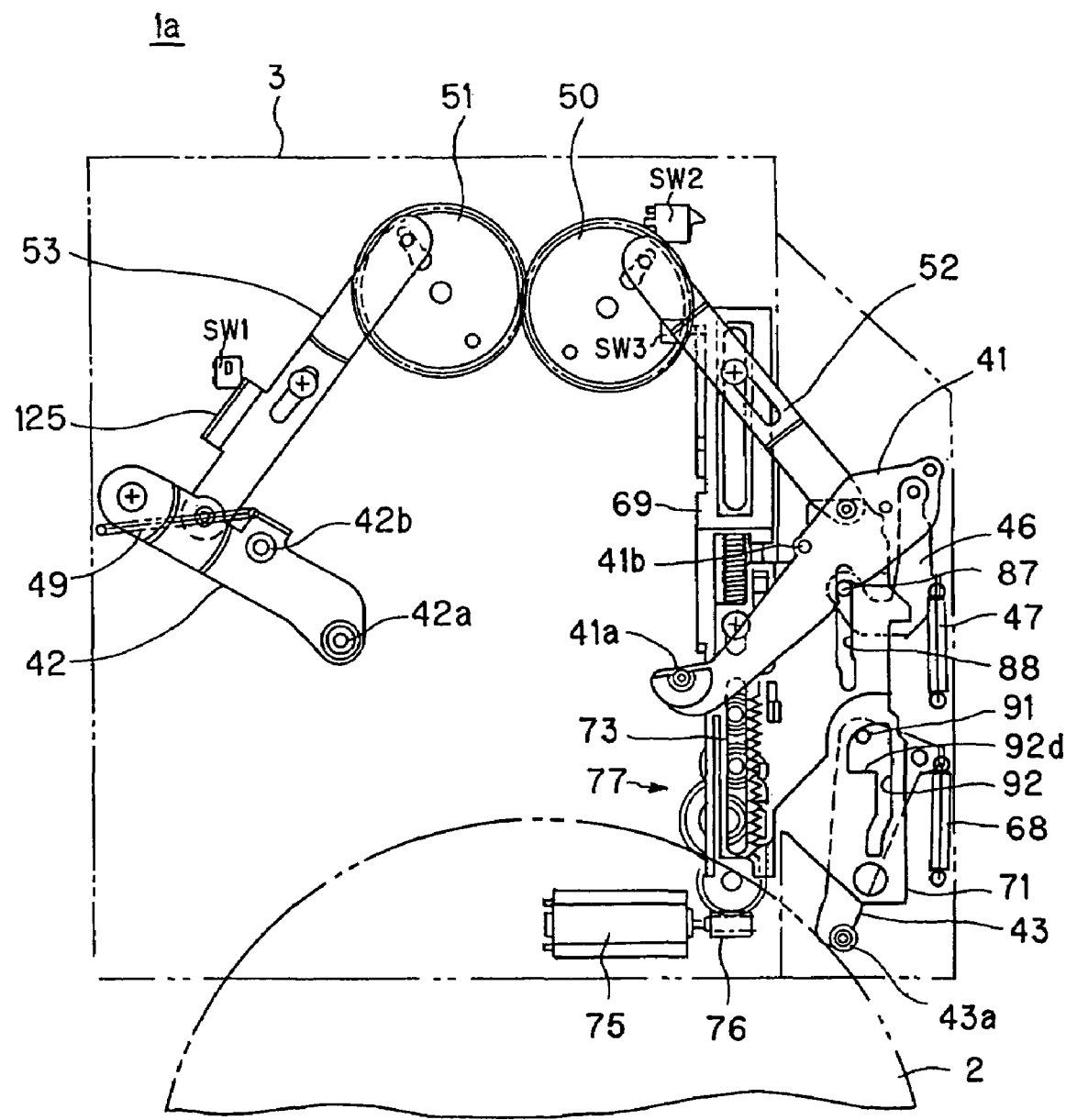
FIG. 18 is a schematic plan view of the disc drive apparatus of FIG. 2 in a state where a disc is inserted to the disc insertion/release position thereof, illustrating the operation of the disc insertion/release mechanism thereof.

Specifically, firstly as the power source of the personal computer 1000 is turned on to start supplying power from the main body 1001 to the apparatus main body 1a by way of the external connector 12 and the ON state of the third detection switch SW3 is detected, the displacement drive mechanism 70 forces the drive lever 69 to slide to the front extreme position thereof, driving the drive motor 75 to turn backwardly as shown in FIG. 18. At this time, the third detection switch SW3 is switched from the ON state to the OFF state as its detector that is adapted to slide on the first horizontal surface section 126a of the second cam section 126 comes down along the slope located at the back side of the first horizontal surface section 126a.

Then, as the OFF state of the third detection switch SW3 is detected, the displacement drive mechanism 70 forces the drive lever 69 to slide toward the rear side of the cabinet 3, driving the drive motor 75 to turn forwardly. The displacement drive mechanism 70 stops driving the drive motor 75 when the third detection switch SW3 is brought back to the ON state from the OFF state.

Figure 34:
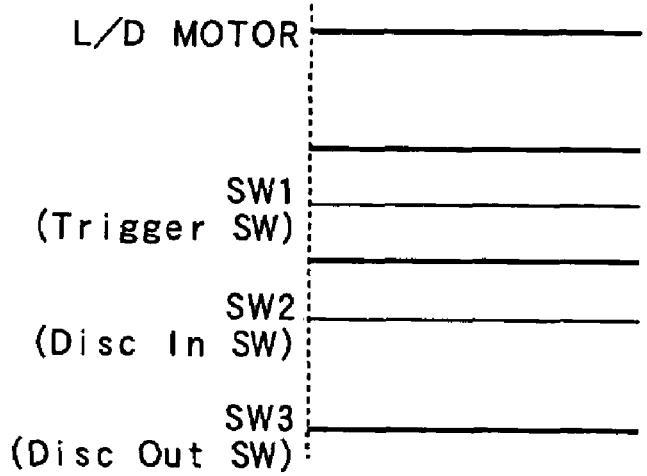
FIG. 34 is a timing chart of the recording/reproduction operation of the disc drive apparatus of FIG. 2, illustrating how the first switch, the second switch and the third switch are turned on/off for the operation.

Referring to FIG. 34, when the ON state of the first detection switch SW1 and that of the second detection switch SW2 are detected and simultaneously the ON state of the third detection switch SW3 is detected at the time of starting the power supply to the apparatus main body 1a, the displacement drive mechanism 70 judges that there is an optical disc 2 loaded in the disc receiving section 27 and hence does not start driving the drive motor 75 but brings the apparatus 1 into a state ready for a recording/reproduction operation, which will be described in greater detail hereinafter.

Thus, the initial operation of the disc drive apparatus 1 is completed.

(3-2) Loading Operation

Figure 32:
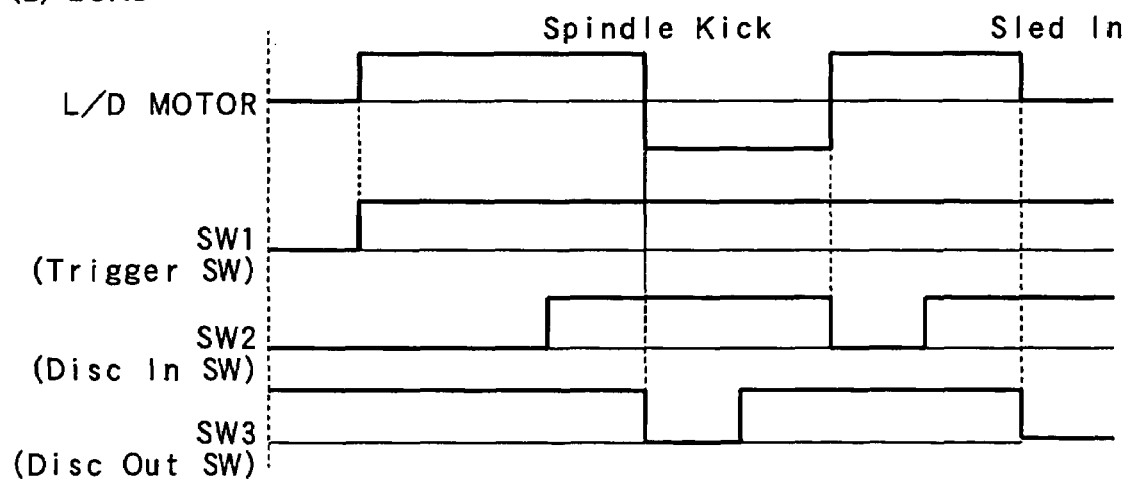
FIG. 32 is a timing chart of the loading operation of the disc drive apparatus of FIG. 2, illustrating how the first switch, the second switch and the third switch are turned on/off for the operation.

When an optical disc 2 is inserted into the disc insertion/release port 21 of the cabinet 3, the disc drive apparatus 1 performs an loading operation of drawing the optical disc 2 inserted into the inside of the cabinet 3 from the disc insertion/release port 21 further into the disc receiving position according to the timing chart of FIG. 32.

More specifically, as an optical disc 2 is inserted from the disc insertion/release port 21 into the inside of the cabinet 3 in the state illustrated in FIG. 18, the optical disc 2 is guided into the inside of the cabinet 3 while it is being restricted in the vertical direction by the paired guide projections 8a, 8b and its outer periphery is being restricted both in the vertical direction and the transversal direction by the paired guide members 24a, 24b.

Figure 24A:
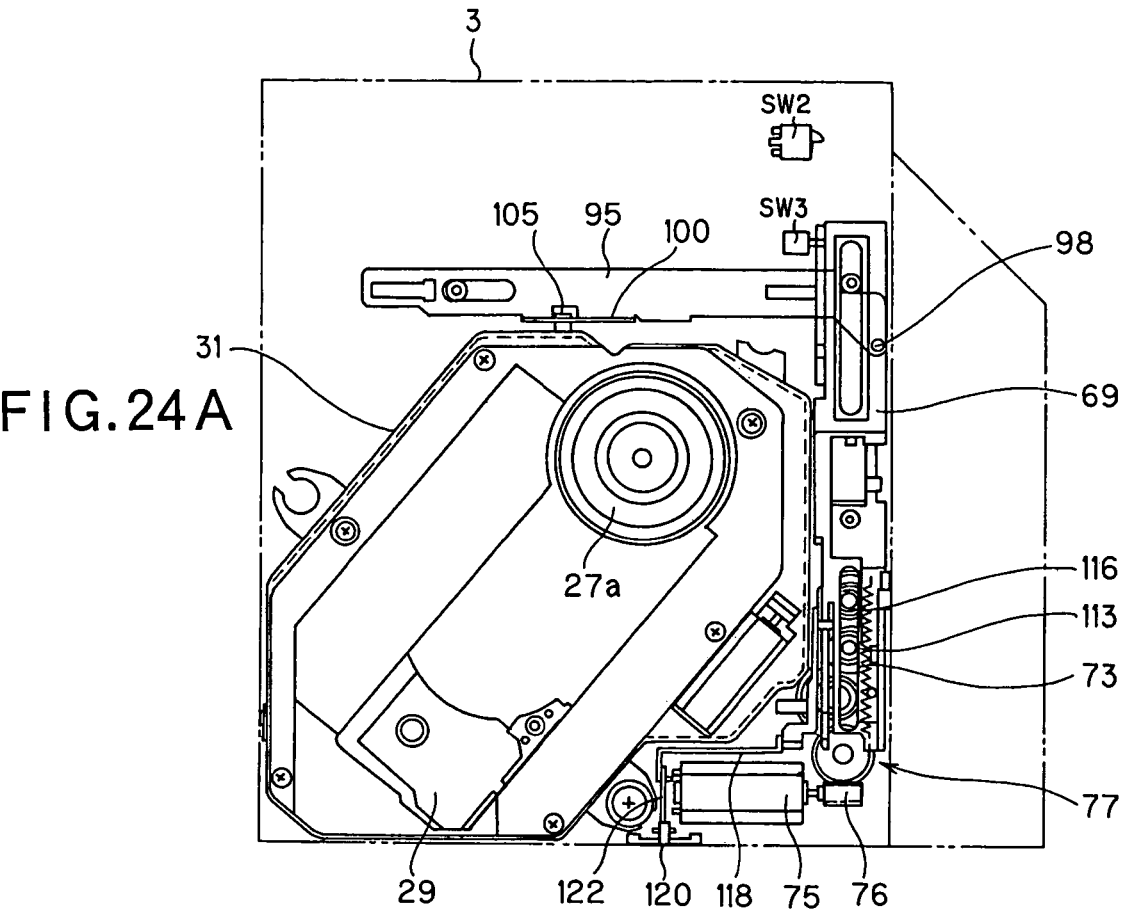
FIGS. 24A, 24B and 24C schematically illustrate the operation of the base hoisting/lowering mechanism, that of the guide hoisting/lowering mechanism and that of the shutter opening/closing mechanism of the disc drive apparatus of FIG. 2.
Figure 24B:
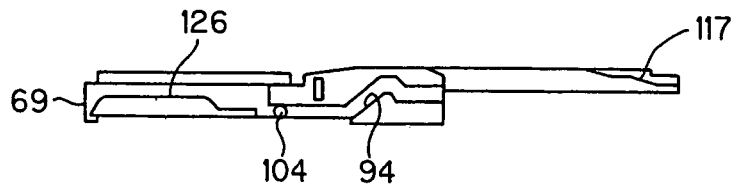
Figure 24C:
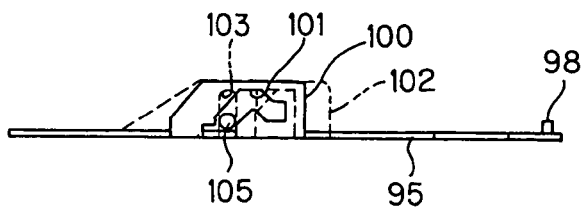
Figure 25:
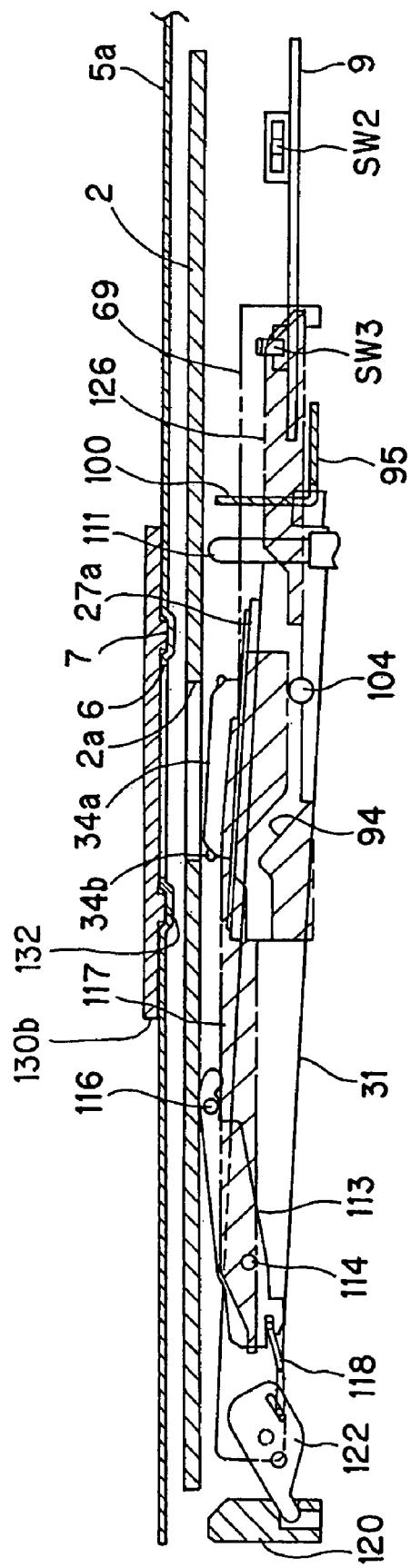
FIG. 25 is a schematic cross sectional view of the base unit of the disc drive apparatus of FIG. 2 in the unchucking position, illustrating the operation of the base hoisting/lowering mechanism, that of the guide hoisting/lowering mechanism and that of the shutter opening/closing mechanism.
Figure 26A:
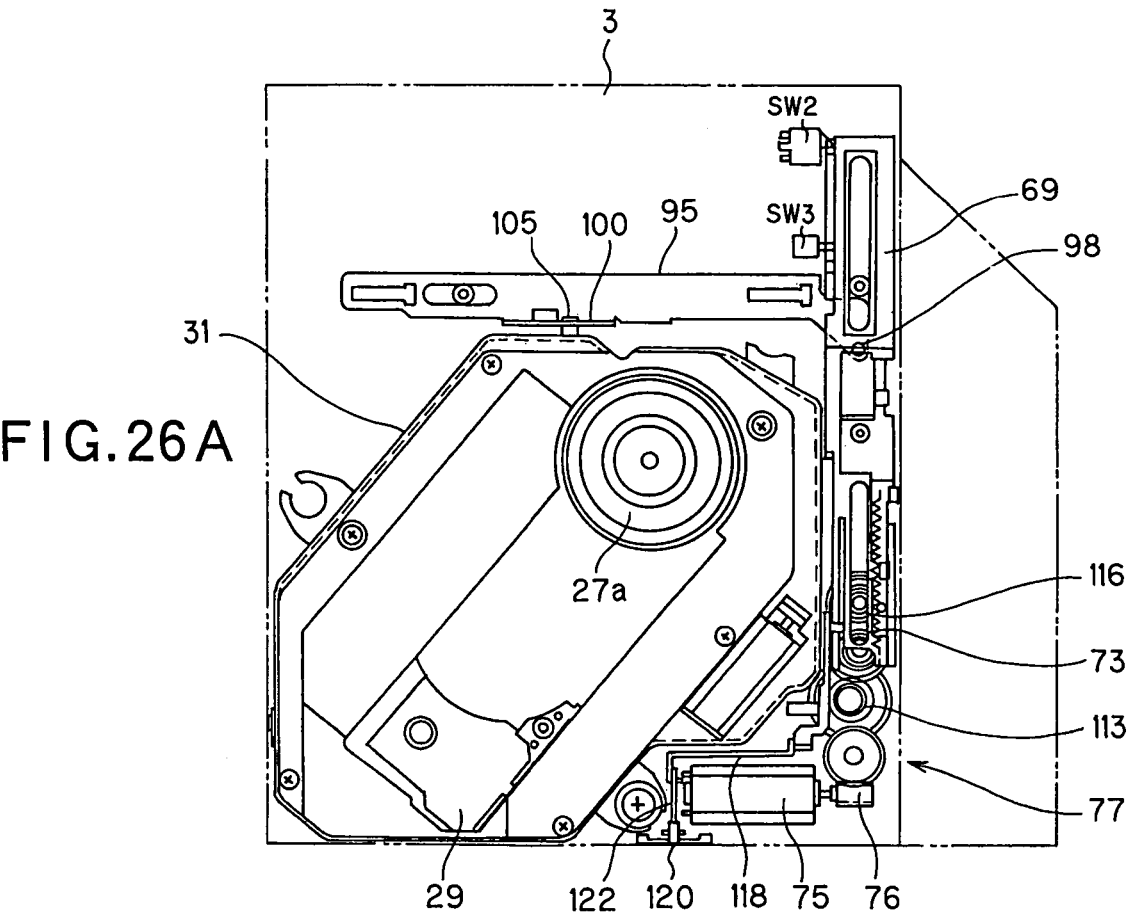
FIGS. 26A, 26B and 26C schematically illustrate the operation of the base hoisting/lowering mechanism, that of the guide hoisting/lowering mechanism and that of the shutter opening/closing mechanism of the disc drive apparatus of FIG. 2.
Figure 26B:
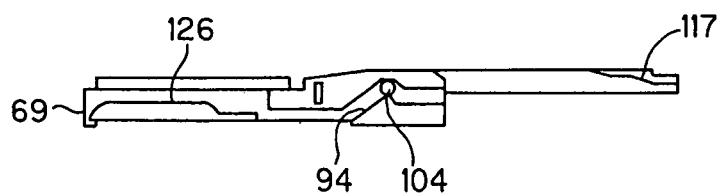
Figure 26C:
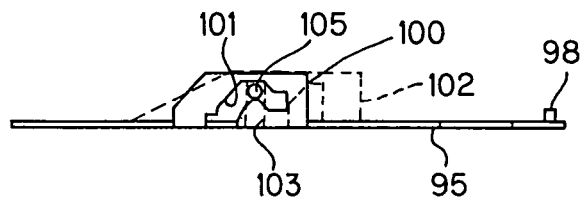
Figure 27:
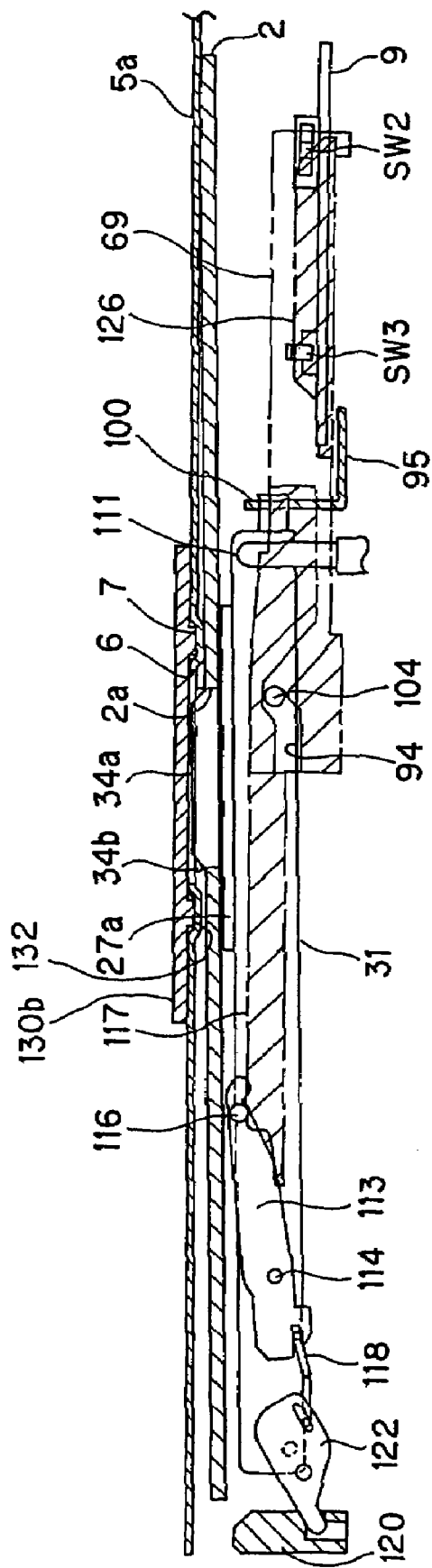
FIG. 27 is a schematic cross sectional view of the disc drive apparatus of FIG. 2 in a state where the base unit is in the chucking position, illustrating the operation of the base hoisting/lowering mechanism, that of the guide hoisting/lowering mechanism and that of the shutter opening/closing mechanism of the disc drive apparatus.
Figure 28A:
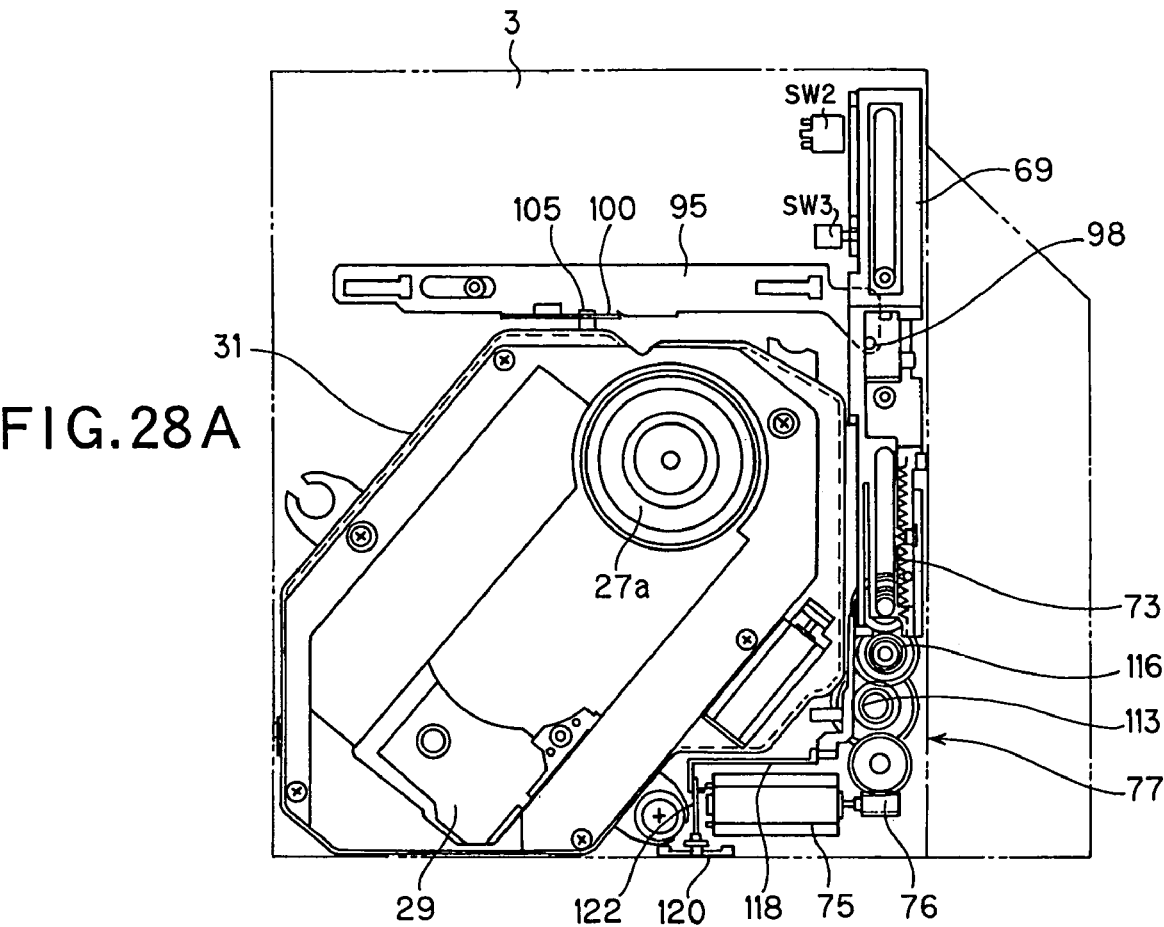
FIGS. 28A, 28B and 28C schematically illustrate the operation of the base hoisting/lowering mechanism, that of the guide hoisting/lowering mechanism and that of the shutter opening/closing mechanism of the disc drive apparatus of FIG. 2.
Figure 28B:
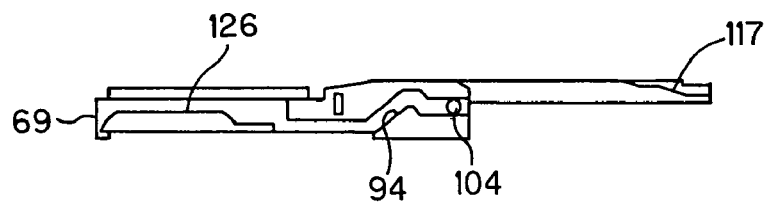
Figure 28C:
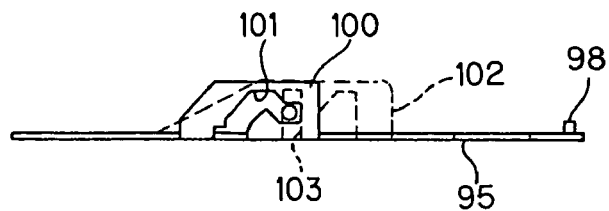
Figure 29:
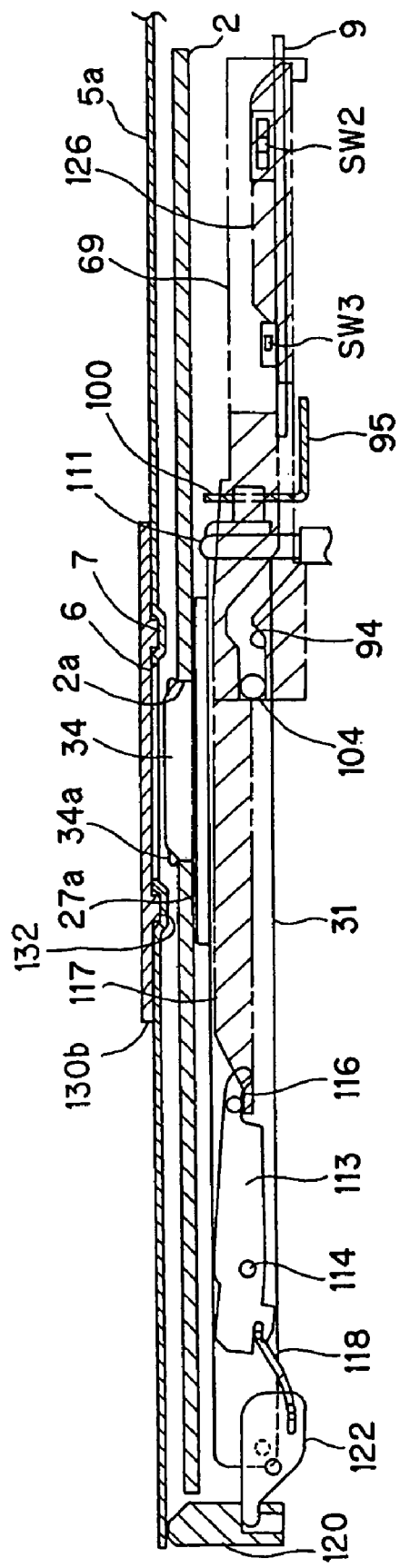
FIG. 29 is a schematic cross sectional view of the disc drive apparatus of FIG. 2 in a state where the base unit is in the recording/reproduction position, illustrating the operation of the base hoisting/lowering mechanism, that of the guide hoisting/lowering mechanism and that of the shutter opening/closing mechanism of the disc drive apparatus.

Additionally, as shown in FIGS. 24 and 25, the disc guide mechanism 112 restricts the insertion angle of the optical disc 2 being inserted through the disc insertion/release port 21 by means of the insertion guide lever 113 thereof as the guide pin 116 of the insertion guide lever 113 is placed on the first horizontal surface section 117a of the first cam section 117. As a result, the signal recording surface of the optical disc 2 is prevented from being damaged by contacting any of the components arranged on the base 31 when the optical disc 2 is inserted from the disc insertion/release port 21 to the inside of the cabinet 3.

The optical disc 2 inserted from the disc insertion/release port 21 is then brought into a state where the first abutment pin 41a of the first swing arm 41 and the second abutment pin 42a of the second swing arm 42 abut the outer periphery of the optical disc 2.

Figure 19:
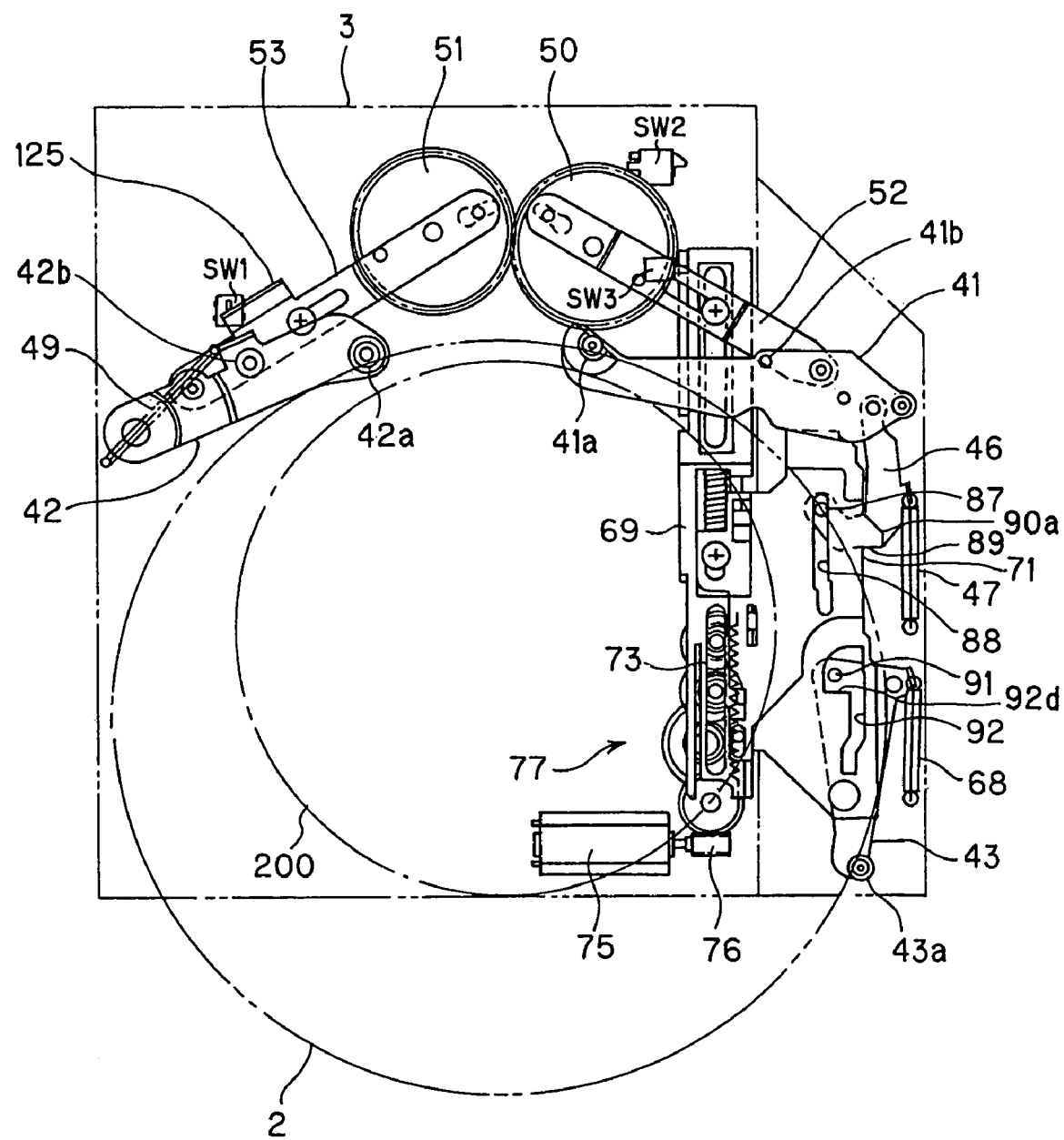
FIG. 19 is a schematic plan view of the disc drive apparatus of FIG. 2 in a state where a disc transfer operation is started, illustrating the operation of the disc insertion/release mechanism thereof.

Then, as the optical disc 2 is pushed further into the inside of the cabinet 3 from the disc insertion/release port 21, the first swing arm 41 and the second swing arm 42 are turned toward the rear side of the cabinet 3 in opposite directions respectively against the urging force of the first tensile coil spring 47 and that of the second tensile coil spring 49, while first abutment pin 41a and the second abutment pin 42a are being pressed by the outer periphery of the optical disc 2 as shown in FIG. 19. When the first swing arm 41 and the second swing arm 42 are turned toward the rear side of the cabinet 3 to a predetermined extent, the detector of the first detection switch SW1 is pressed by the pressure-applying piece 125 of the second link arm 53. As a result, the first detection switch SW1 is turned on and the displacement drive mechanism 70 drives the drive motor 75 to rotate forwardly according to the detection signal from the first detection switch SW1 so that the drive lever 69 starts sliding toward the rear side of the cabinet 3.

On the other hand, as shown in FIG. 18, the third abutment pin 43a comes to abut the periphery of the optical disc 2 from the rear side of the cabinet 3 as the optical disc 2 is inserted from the disc insertion/release port 21 into the inside of the cabinet 3. As the optical disc 2 is further pushed into the inside of the cabinet 3 from the disc insertion/release port 21 from this state, the optical disc 2 turns the third swing arm 43 outwardly against the urging force of the third tensile coil spring 68, while pressing the third abutment pin 43a. Then, the third abutment pin 43a turns toward the front side of the cabinet 3 along the outer periphery of the optical disc 2. As a result, the third abutment pin 43a comes to abut the outer periphery of the optical disc 2 from the front side of the cabinet 3 so that the third swing arm 43 is urged by the third tensile coil spring 68 so as to be turned toward the rear side of the cabinet 3.

Additionally, as the drive lever 69 is driven to slide toward the rear side of the cabinet 3, the movable plate 71 is forced to slide also toward the rear side of the cabinet 3 in an interlocked manner. Then, as a result, the second cam pin 91 that slides in the second cam slit 92 is pressed by the fourth slit section 92d so that the third swing arm 43 is turned toward the rear side of the cabinet 3.

Consequently, the optical disc 2 is drawn into the inside of the cabinet 3 by the rear side turn of the third swing arm 43 whose outer periphery is held in contact with the third abutment pin 43a at the front side thereof, while the outer periphery of the optical disc 2 is held in contact with the first abutment pin 41a of the first swing arm 41 and the second abutment pin 42a of the second swing arm 42 that are urged respectively by the first tensile coil spring 47 and the second tensile coil spring 49 at the rear side thereof.

Still additionally, as the second swing arm 42 is turned from the front side toward the rear side of the cabinet 3, the second tensile coil spring 49 switches its urging direction for turning the second swing arm 42 from the direction of turning it toward the front side of the cabinet 3 to the direction of turning it toward the rear side of the cabinet 3 so as to consequently assist the operation of drawing the optical disc 2 into the inside of the cabinet 3.

Figure 20:
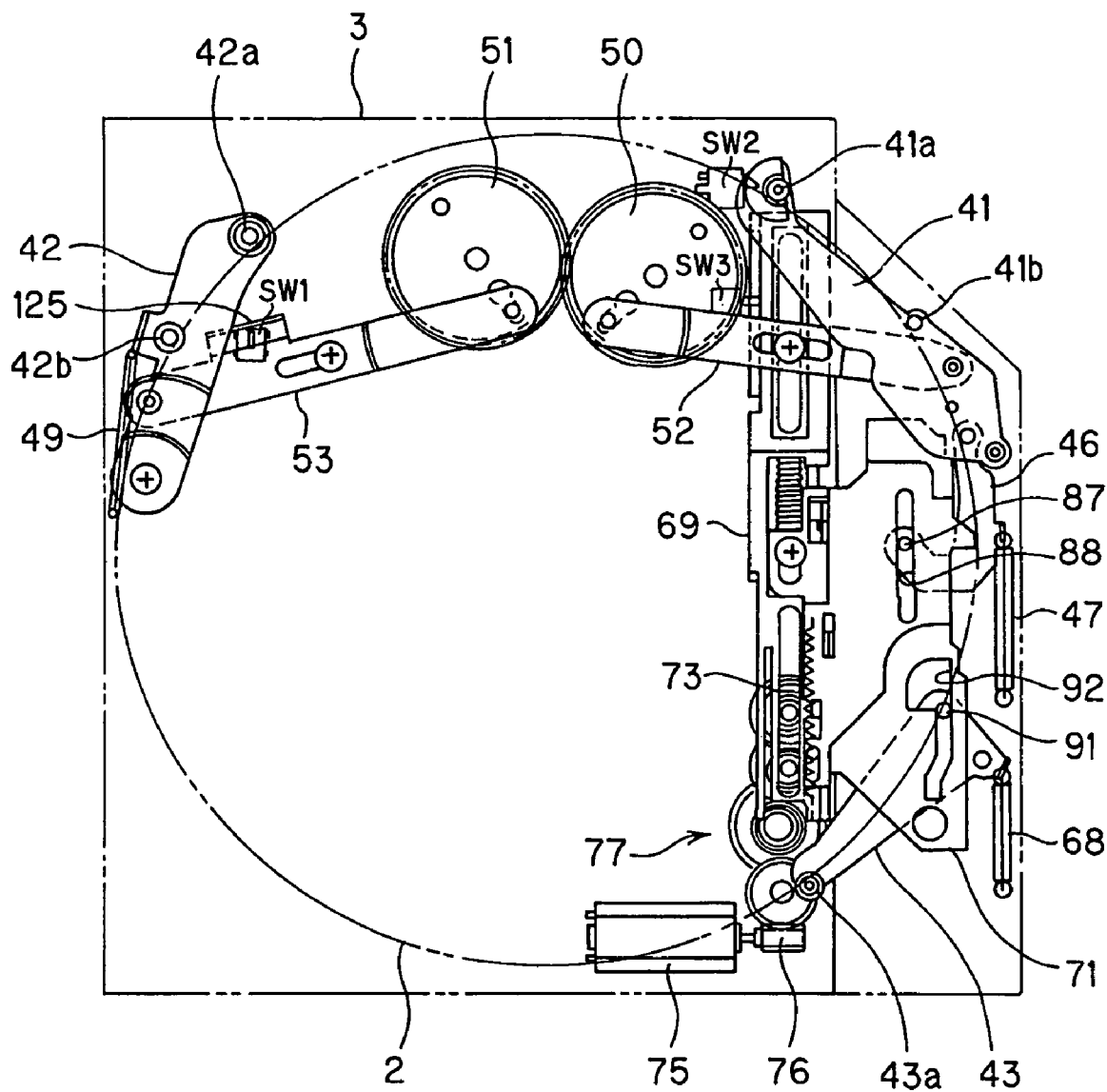
FIG. 20 is a schematic plan view of the disc drive apparatus of FIG. 2 in a state where a disc is transferred to the disc receiving position thereof, illustrating the operation of the disc insertion/release mechanism thereof.

Thus, the first swing arm 41, the second swing arm 42 and the third swing arm 43 cooperate with each other in the above described manner to transfer the optical disc 2 into the inside of the cabinet 3, drawing the optical disc 2 to the disc receiving position as shown in FIG. 20.

(3-3) Centering Operation

Thereafter, the disc drive apparatus 1 performs a centering operation of accurately placing the optical disc 2 on the disc receiving position as shown in FIG. 20 by pressing the outer periphery of the optical disc 2 that is transferred to the disc receiving position in a state where the third swing arm 43 that is turning toward rear side of the cabinet 3 keeps the third abutment pin 43a held in contact with the outer periphery of the optical disc 2 from the rear side against the first abutment pin 41a and the first positioning pin 41b of the first swing arm 41 and the second abutment pin 42a and the second positioning pin 42b of the second swing arm 42 that are placed at respective positions defined corresponding to the disc receiving position.

(3-4) Chucking Operation

Then, the disc drive apparatus 1 performs a chucking operation of clamping the optical disc 2 that is accurately placed on the disc receiving position of the turntable 27a of the disc receiving section 27 by raising the base 31 by means of the base hoisting/lowering mechanism 93 as shown in FIGS. 26A through 26C and 27.

More specifically, as the cam lever 95 is forced to slide leftward in a motion interlocked with the rearward sliding motion of the drive lever 69, the first spindle 104 of the base 31 slides in the first cam slit 94 of the drive lever 69 and, at the same time, the second spindle 105 of the base 31 slides in the second cam slit 101 of the cam piece 100 and the vertical slit 103 of the bent piece 102. Then, as the first spindle 104 slides in the first cam slit 94 from the first horizontal surface section 94a to the top surface section 94b and the second spindle 105 slides in the second cam slit 101 from the first horizontal surface section 101a to the top surface section 101b, the base 31 is raised to the chucking position.

Then, as the optical disc 2 is pressed against the abutment projection 7 of the top plate section 5a at a peripheral area of the center hole 2a thereof, the engaging projection 34a enters the center hole 2a of the optical disc 2 that is now accurately placed on the disc receiving position until it becomes fully engaged with the center hole 2a of the optical disc 2. Thus, the optical disc 2 is anchored to the turntable 27a as the plurality of anchoring sections 34b holds a part of the optical disc 2 surrounding the center hole 2a so that the optical disc 2 is securely held to the top surface of the turntable 27a. As a result, the first chucking operation of holding the optical disc 2 onto the disc loading section 27 is completed.

Figure 21:
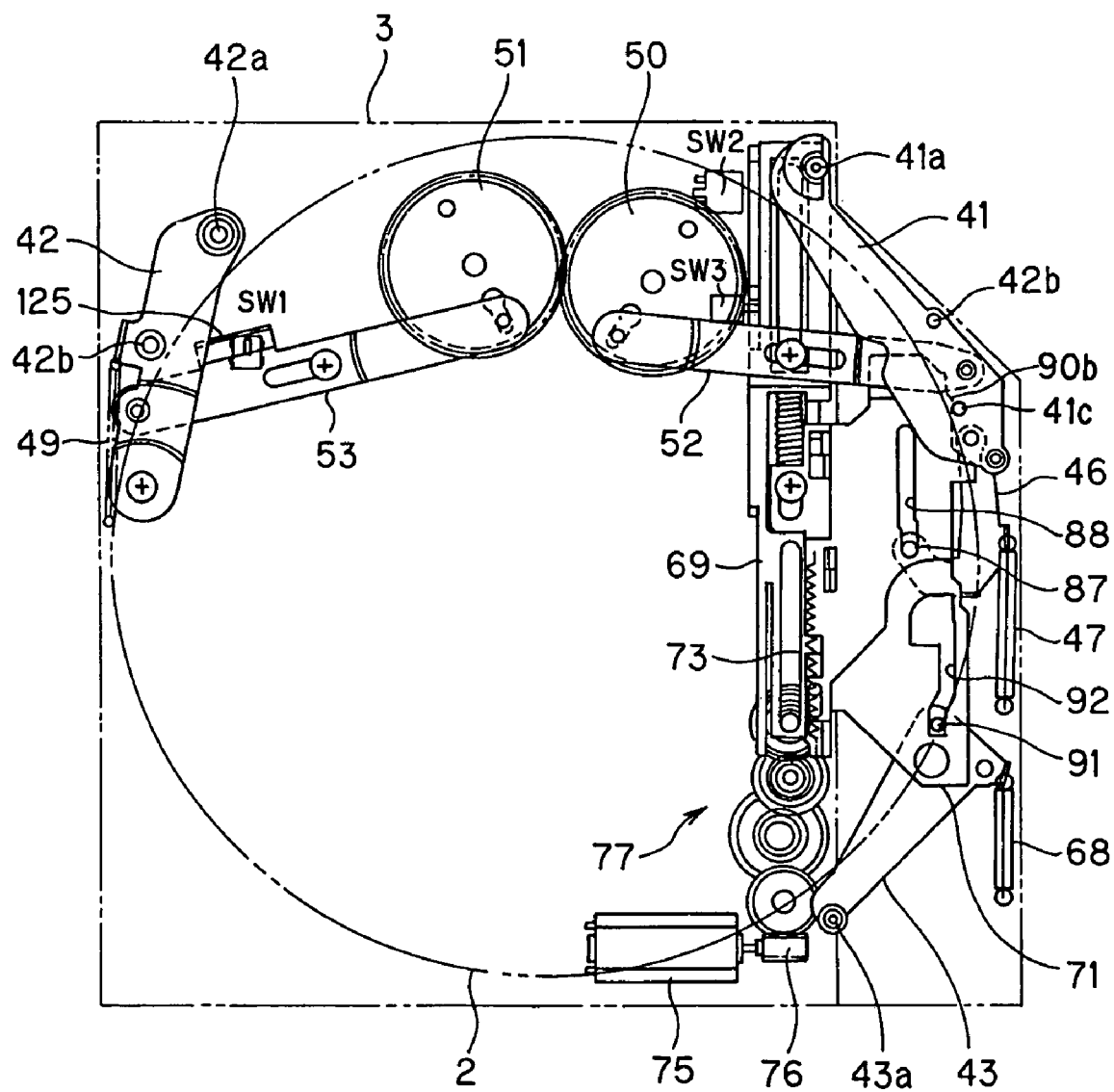
FIG. 21 is a schematic plan view of the disc drive apparatus of FIG. 2 in a state where a disc transfer operation is ended, illustrating the operation of the disc insertion/release mechanism thereof.

Then, the disc drive apparatus 1 operates to slide the movable plate 71 to the rear end of its movable range as a motion interlocked with the motion of the drive lever 69 sliding toward the rear end of the cabinet 3 as shown in FIG. 21.

At this time, the pressure-applying section 90b of the movable plate 71 presses the pressure-receiving projection 41c of the first swing arm 41 from the front side of the cabinet 3. As a result, the first swing arm 41 and the second swing arm 42 are turned to the respective positions where the first abutment pin 41*a* and the first positioning pin 41*b* are moved away from the outer periphery of the optical disc 2, which is now in the disc receiving position, toward the rear end of the cabinet 3 and where the second abutment pin 42*a* and the second positioning pin 42*b* moved away from the outer periphery of the optical disc 2 toward the rear end of the cabinet 3. At the same time, the first cam pin 87 of the intermediate arm 46 switches its position from the first slit section 88*a* to the second slit section 88*b* as it slides in the cam slit 88 of the movable plate 71.

On the other hand, the second cam pin 91 of the third swing arm 43 switches its position from the first slit section 92*a* to the second slit section 92*b* as it slides in the second cam slit 92 of the movable plate 71. As a result, the third swing arm 43 is turned from the position where the third abutment pin 43*a* is held in contact with the outer periphery of the optical disc 2, which is now in the disc receiving position, to a position where the third abutment pin 43*a* is moved away toward the front side of the cabinet 3. Thus, the first abutment pin 41*a* and the first positioning pin 41*b* of the first swing arm 41, the second abutment pin 42*a* and the second positioning pin 42*b* of the second swing arm 42 and the third abutment pin 43*a* of the third swing arm 43 are found to be away from the outer periphery of the optical disc 2, which is loaded in the disc receiving section 27.

Additionally, as shown in FIGS. 28A through 28C and 29, as the drive lever 69 is forced to slide to the rear end of its movable range, the cam lever 95 is forced to slide to the left end of its movable range as a motion interlocked with the sliding motion of the drive lever 69 in the disc drive apparatus 1. Then, the base 31 is lowered to the middle position as the first spindle 104 slides in the first cam slit 94 from the top surface section 94*b* to the second horizontal surface section 94*c* and the second spindle 105 slides in the second cam slit 101 from the top surface section 101*b* to the second horizontal surface section 101*c*.

Then, as shown in FIG. 32, as the detector of the second detection switch SW2 is pressed by the corresponding lateral side of the drive lever 69 to turn on the second detection switch SW2. At the same time, the detector of the third detection switch SW3 is forced to slide on the second horizontal surface section 126*b* of the second cam section 126 to switch the third detection switch SW3 from the ON state to the OFF state.

Then, the spindle motor 28*a* of the disc rotary drive mechanism 28 drives the optical disc 2 to rotate and shifts the phase of the optical disc 2. At the same time, the displacement drive mechanism 70 backwardly turns the drive motor 75 to force the drive lever 69 to slide toward the front side of the cabinet 3.

As the cam lever 95 is forced to slide rightward as a motion interlocked with the motion of the drive lever 69 of sliding toward the front side of the cabinet 3, the first spindle 104 slides in the first cam slit 94 from the second horizontal surface section 94*c* to the top surface section 94*b* and the second spindle 105 slides in the second cam slit 101 from the second horizontal surface section 101*c* to the top surface section 101*b*. As a result, the base 31 is raised again to the chucking position to perform the second chucking operation of holding the optical disc 2 to the disc receiving section 27 with the shifted phase of the optical disc 2.

In this way, since the disc drive apparatus 1 shifts the phase of the optical disc 2 and performs the second chucking operation after performing the first chucking operation, it can reliably hold the optical disc 2 in the disc receiving section 27.

In the above described disc drive apparatus 1, the disc receiving section 27 of the base 31 is raised and lowered by the base hoisting/lowering mechanism 93 as viewed from the front side of the cabinet 3. Therefore, it is possible to switch the position of the turntable 27*a* selected for the first chucking operation and the position of the turntable 27*a* selected for the second chucking operation by shifting the phase of the optical disc 2 by about 180° if more reliable chucking operations are realized stably.

While two chucking operations are performed by the disc drive apparatus 1 in the above description, it is possible to repeat the chucking operation for an arbitrarily selected number of times. If the above described optical pickup 29 does not move from the outer peripheral side to the inner peripheral side to effect the focus servo control and the tracking servo control after repeating the chucking operation, the optical disc 2 is forced out of the disc drive apparatus 1 by an eject operation to stabilize the overall operation of the above described disc drive apparatus 1.

The above described disc drive apparatus 1 is adapted to avoid the risk of collision of the optical pickup 29 and the signal recording surface of the optical disc 2 during the chucking operation because the optical disc 29 is placed at a position radially close to the outer periphery of the optical disc 2 until the operation of chucking the optical disc 2 is completed.

While the above described intermediate position where the spindle motor 28*a* of the disc rotary drive mechanism 28 drives the optical disc 2 to rotate and shifts the phase of the optical disc 2 and the recording/reproduction position for recording signals on or reproducing signals from the optical disc 2 agree with each other in the above described disc drive apparatus 1, it is not necessary to make the intermediate position and recording/reproduction position agree with each other. In other words, the intermediate position and the recording/reproduction position may be separated from each other because it is possible to shift the phase of the optical disc 2 by lowering the base 31 after a chucking operation and driving the optical disc 2 to rotate by means of the disc rotary drive mechanism 28 when the area of the optical disc 2 surrounding the center hole 2*a* is separated from the abutment projection 7 of the top plate section 5*a*.

After the above described second chucking operation is completed, the third detection switch SW3 that is in the OFF state is turned into the ON state and the second detection switch SW2 that is in the ON state is turned into the OFF state as shown in FIG. 32 when the drive lever 69 is forced to slide toward the front side of the cabinet 3 of the disc drive apparatus 1.

Thereafter, in the disc drive apparatus 1, the drive lever 69 is forced to slide toward the rear side of the cabinet 3 when the displacement drive mechanism drives the drive motor 75 to turn forwardly. Then, as the movable plate 71 is forced to slide to the rear end of its moving range as a motion interlocked with the motion of the drive lever 69 sliding toward the rear side as shown in FIG. 21, the first swing arm 41 and the second swing arm 42 are turned to respective positions where the first abutment pin 41*a* and the first positioning pin 41*b* of the first swing arm 41 and the second abutment pin 42*a* and the second positioning pin 42*b* of the second swing arm 42 are separated from the outer periphery of the optical disc 2 that is loaded in the disc receiving section 27 to move toward the rear end of the cabinet 3 and, at the same time, the third swing arm 43 is turned to a position where the third abutment pin 43*a* of the third swing arm 43 is separated from the outer periphery of the optical disc 2 to move toward the front side of the cabinet 3.

As the drive lever 69 of the disc drive apparatus 1 is forced to slide to the rear end of its moving range as shown in FIGS. 28A through 28C and 29, the cam lever 95 slides to the left end of its moving range to lower the base 31 back to the intermediate position.

Then, the displacement drive mechanism 70 stops driving the drive motor 75 when the second detection switch SW2 that is in the OFF state is turned into the ON state and the third detection switch SW3 that is in the ON state is turned into the OFF state as shown in FIG. 32.

When the drive lever 69 is placed to the rear end of its moving range as shown in FIGS. 28A through 28C and 29, the guide pin 116 of the insertion guide lever 113 of the disc guide mechanism 112 is located on the second horizontal surface section 117b of the first cam section 117 so that the insertion guide lever 113 is lowered to a position where it is separated from the optical disc 2 loaded on the turntable 27a of the disc receiving section 27. With this arrangement, the insertion guide lever 113 is prevented from contacting the signal recording surface of the optical disc 2 when the optical disc 2 loaded on the turntable 27a is driven to rotate.

The shutter opening/closing mechanism 119 raises the shutter member 120 to a position where it blocks the moving path of the optical disc 2 inserted from the disc insertion/release port 21 in synchronism with the operation of lowering the insertion guide lever 113. Thus, any other optical disc 2 is prevented from being inserted from the disc insertion/release port 21 into the inside of the cabinet 3 in a state where the optical disc 2 is loaded on the turntable 27a.

Thus, the loading operation of the disc drive apparatus 1 is completed.

(3-5) Recording/Reproduction Operation

The disc drive apparatus 1 records information signals on or reproduce information signals from the optical disc 2 loaded in the disc receiving section 27 in the state as illustrated in FIGS. 21, 28A through 28C and 29. More specifically, as the spindle motor 28a drives the turntable 27a to turn integrally with the optical disc 2 and the optical pickup 29 is driven to move from the outer peripheral side to the inner peripheral side of the optical disc 2 by the pickup feed mechanism 30 to effect the focus servo control and the tracking servo control, the optical pickup 29 reads the TOC data recorded in the lead-in region of the optical disc 2. Thereafter, when recording information signals, the optical pickup 29 moves to the predefined address in the program region of the optical disc 2 according to the read out TOC data. When, on the other hand, reproducing information signals, the optical pickup 29 moves to the address in the program region of the optical disc 2 where the specified data is recorded. Then, the optical pickup 29 writes information signals on or reads information signals from an appropriate recording track of the optical disc 2.

When the disc drive apparatus 1 is recording or reproducing information signals, the first detection switch SW1 and the second detection switch SW2 are in the ON state and the third detection switch SW3 is in the OFF state.

The disc drive apparatus 1 operates for recording or reproducing information signals in the above described manner.

(3-6) Eject Operation

Figure 33:
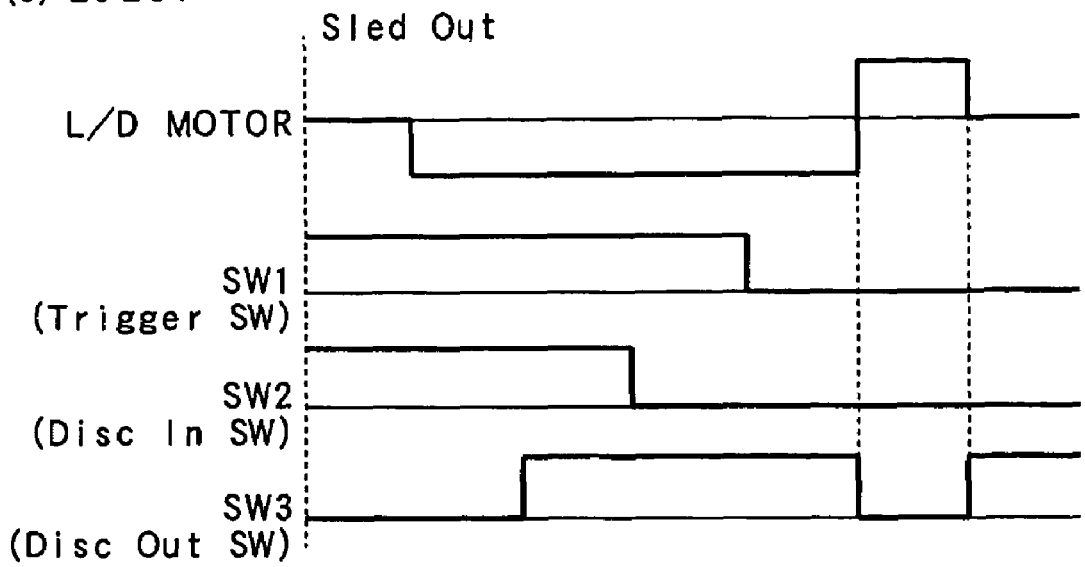
FIG. 33 is a timing chart of the eject operation of the disc drive apparatus of FIG. 2, illustrating how the first switch, the second switch and the third switch are turned on/off for the operation.

The disc drive apparatus 1 performs an eject operation of delivering the optical disc 2 loaded in the disc receiving section 27 to the outside of the cabinet 3 by way of the disc insertion/release port 21 according to the timing chart illustrated in FIG. 33.

More specifically, firstly, as the eject button 23 arranged on the front panel 20 is depressed or an eject command is transmitted to the disc drive apparatus 1 from the above described personal computer 1000, the displacement drive mechanism 70 drives the drive motor 75 to turn backwardly and slides the drive lever 69 toward the front end of the cabinet 3 according to the command.

Then, as the cam lever 95 is forced to slide rightward as a motion interlocked with the forwardly sliding motion of the drive lever 69, the first spindle 104 slides in the first cam slit 94 from the second horizontal surface section 94c to the first horizontal surface section 94a by way of the top surface section 94b and the second spindle 105 slides in the second cam slit 101 from the second horizontal surface section 101c to the first horizontal surface section 101a by way of the top surface section 101b. As a result, the base 31 is lowered to the unchucking position as shown in FIGS. 24A through 24C and 25.

(3-7) Unchucking Operation

Figure 30:
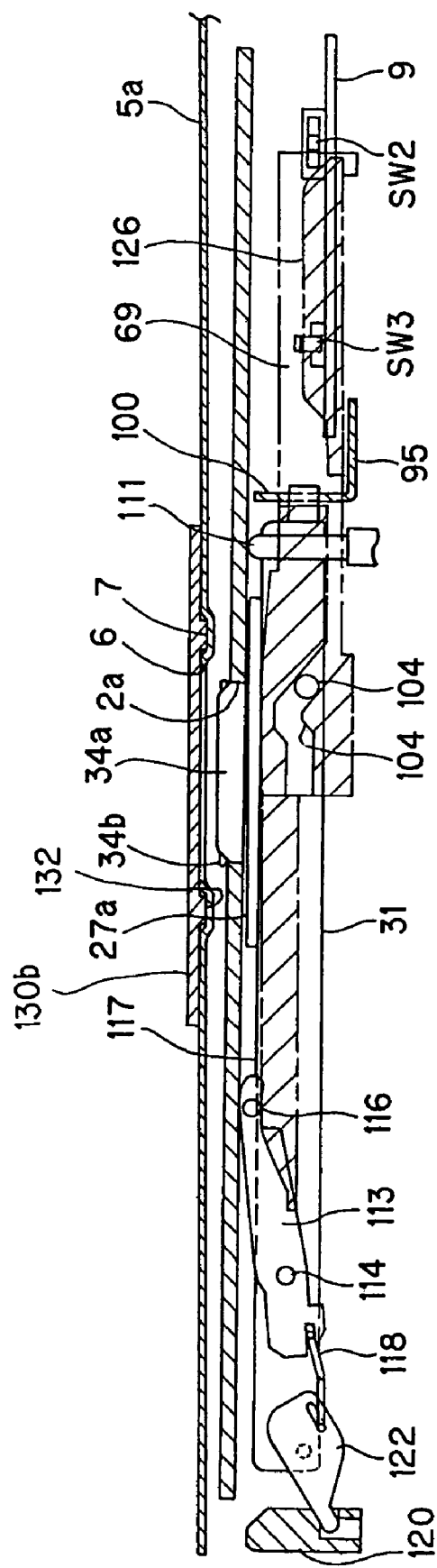
FIG. 30 is a schematic cross sectional view of the disc drive apparatus of FIG. 2 in a state where a disc is brought to abut the pushing up pin of the disc drive apparatus, illustrating the operation of the base hoisting/lowering mechanism, that of the guide hoisting/lowering mechanism and that of the shutter opening/closing mechanism of the disc drive apparatus.

Then, the disc drive apparatus 1 performs an unchucking operation of releasing the optical disc 2 from the turntable 27a of the disc receiving section 27 by lowering the base 31 to the unchucking position. More specifically, as shown in FIG. 30, as the base 31 is lowered to the unchucking position, the front end of the pushing up pin 111 abuts the non-signal-recording region which is located near the inner periphery of the optical disc 2 loaded on the turntable 27a of the disc receiving section 27 to push up the optical disc 2 and separate the optical disc 2 from the top surface of the turntable 27a.

On the other hand, as the drive lever 69 is forced to slide toward the front end of the cabinet 3, the guide pin 116 of the insertion guide lever 113 is moved onto the first horizontal surface section 117a of the first cam section 117 as shown in FIGS. 24A through 24C and 25. As a result, the insertion guide lever 113 is raised to the position where it restricts the insertion angle of the optical disc 2 that is inserted from the disc insertion/release port 21.

On the other hand, the shutter opening/closing mechanism 119 lowers the shutter member 120 to the position adapted to free the moving path of the optical disc 2 that is inserted from the disc insertion/release port 21 in synchronism with the operation of raising the insertion guide lever 113.

Then, the disc drive apparatus 1 forces the movable plate 71 to slide toward the front end of the cabinet 3, following the sequence of FIGS. 20, 19 and 18, as a motion interlocked with the forwardly sliding motion of the drive lever 69. At this time, the pressure-applying piece 90a of the movable plate 71 presses the pressure-receiving piece 89 of the intermediate arm 46 from behind. As a result, the first swing arm 41 and the second swing arm 42 are turned toward the front end of the cabinet 3 in respective directions that are opposite to each other, while the first abutment pin 41a and the second abutment pin 42a are held in contact with the outer periphery of the optical disc 2 that is placed in the disc receiving position of the disc receiving section 27.

At the same time, the first tensile coil spring 47 urges the first swing arm 41 to turn toward the forward end of the cabinet 3 and, as the second swing arm 42 is turned from rear side toward the front side of the cabinet 3, the second tensile coil spring 49 switches the direction of its urging force from the direction of urging the second swing arm 42 to turn toward the rear side of the cabinet 3 to that of urging the second swing arm 42 to turn toward the front side of the cabinet 3. In this way, the first and second tensile coil springs 47, 49 assist the operation of delivering the optical disc 2 to the outside of the cabinet 3.

Figure 22:
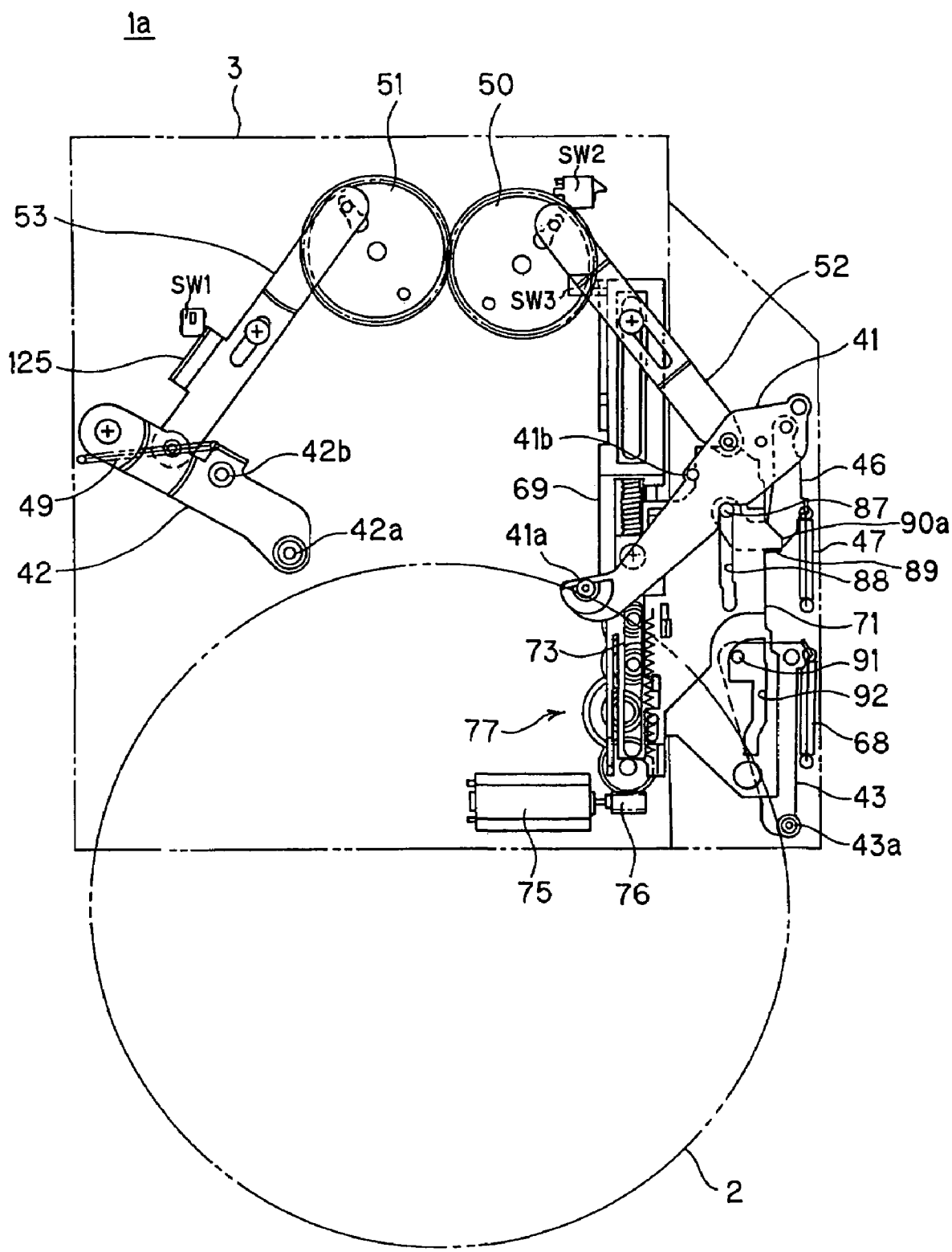
FIG. 22 is a schematic plan view of the disc drive apparatus of FIG. 2 in a state where a disc is delivered to the disc insertion/release position thereof, illustrating the operation of the disc insertion/release mechanism thereof.

On the other hand, as the movable plate 71 is forced to slide to the front end of its moving range, the second cam pin 91 slides in the second cam slit 92 of the movable plate 71 along the third slit section 92*c* and the third swing arm 43 is turned toward the front end of the cabinet 3 as shown in FIG. 22.

Thus, the first swing arm 41, the second swing arm 42 and the third swing arm 43 cooperate with each other in the above described manner to transfer the optical disc 2 to the disc insertion/release position as shown in FIG. 22 and delivers it to the outside of the cabinet 3 from the disc insertion/release port 21.

Then, as shown in FIG. 33, the second detection switch SW2 is turned off as a result of that it is freed from the pressure applied by the corresponding lateral side of the drive lever 69, while the first detection switch SW1 is also turned off as a result of that it is freed from the pressure applied by the pressure-applying piece 125 of the second link arm 53. Additionally, the third detection switch SW3 is turned from the ON state to the OFF state as a result of that its detector that slides on the first horizontal surface section 126*a* of the second cam section 126 eventually falls along the slope extending from the rear end of the first horizontal surface section 126.

At this time, as the drive lever 69 is forced to slide to the front end of its moving range, the pressure-applying piece 90*a* of the movable plate 71 presses the pressure-receiving piece 89 of the intermediate arm 46 from behind as shown in FIG. 22. As a result, the first swing arm 41 turns to the front limit to reliably deliver the optical disc 2 to a position where the center hole 2*a* of the optical disc 2 is exposed to the outside of the cabinet 3 from the disc insertion/release port 21.

When the OFF state of the third detection switch SW3 is detected, the disc drive apparatus 1 forces the drive lever 69 to slide toward the rear side of the cabinet 3, while the displacement drive mechanism 70 drives the drive motor 75 to turn forward. As the third detection switch SW3 that is in the OFF state is turned on once again, the displacement drive mechanism 70 stops driving the drive motor 75.

Thus, the eject operation of the disc drive apparatus 1 is completed.

If an optical disc 200 having a diameter (e.g., 8 cm) smaller than the normal diameter (e.g., 12 cm) is inserted into the inside of the cabinet 3 from the disc insertion/release port 21 of the disc drive apparatus 1 as shown in FIG. 19, the first swing arm 41 and the second swing arm 42 would not be turned toward the rear side of the cabinet 3 to the position where the detector of the first detection switch SW1 is pressed by the pressure-applying piece 125 of the second link arm 53. Therefore, the disc drive apparatus 1 is adapted to force out the optical disc 200 having the small diameter to the outside of the cabinet 3 from the disc insertion/release port 21 by means of the first swing arm 41 and the second swing arm 42 that are arranged to become more remote from each other at their base ends than at their front ends thereof before the first detection switch SW1 is turned on and the drive lever 69 is driven to start operating by the drive motor 75.

Figure 23:
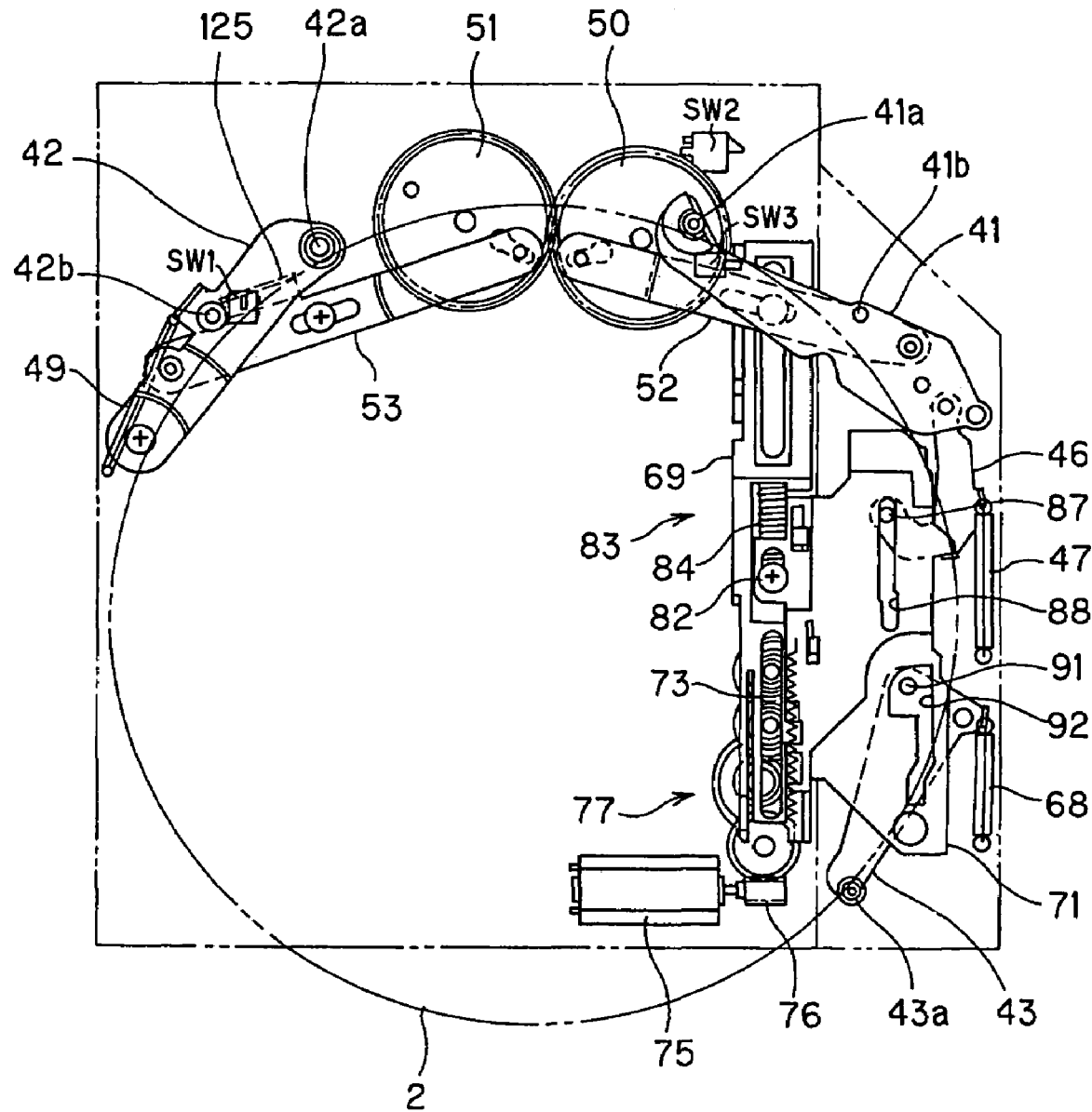
FIG. 23 is a schematic plan view of the disc drive apparatus of FIG. 2 in a state where a disc is forcibly pushed into the inside of the cabinet of the apparatus in an eject operation, illustrating the operation of the disc insertion/release mechanism thereof.

If, for example, the drive lever 69 is driven by the displacement drive mechanism 70 to deliver the optical disc 2 to the outside of the cabinet 3 of the disc drive apparatus 1 as shown in FIG. 23, the difference in the extent of displacement between the drive lever 69 and the movable plate 71 can be absorbed by the compression coil spring 84 that is given rise to as a result of the external force applied to the optical disc 2 being delivered to the outside of the cabinet 3 from the disc insertion/release port 21 in the direction opposite to the direction of delivering the optical disc 2. Thus, the risk of damaging the internal mechanisms of the disc drive apparatus 1 and the optical disc 2 that can arise when the optical disc 2 is ejected is reliably avoided.

Meanwhile, the main surface of the top cover 5 of the disc drive apparatus 1 opposite to the main surface thereof located vis-à-vis the turntable 27*a* is supported by the top surface supporting section 130*b* of the frame 130 as described above. As the base hoisting/lowering mechanism 93 raises the base to the chucking position, the optical disc 2 is pressed by the abutment projection 7 of the top cover 5 that is supported by protruding section 132 of the top surface supporting section 130*b* at a part of thereof surrounding the center hole 2*a* so that the optical disc 2 is held on the turntable 27*a* in a state where the engaging projection 34*a* of the turntable 27*a* is engaged with the center hole 2*a* of the optical disc 2 and, at the same time, the optical disc 2 is anchored by the plurality of anchoring sections 34*b* along the center hole 2*a*.

As a result, the optical disc 2 can be reliably loaded in the disc receiving section 27 without providing the top cover 5 of the cabinet 3 of the disc drive apparatus 1 with an enhanced level of rigidity.

In other words, the disc drive apparatus 1 can be made further thin and lightweight by using a thinned and lightweight top cover 5. It is also possible to prevent the top plate section 5*a* of the top cover 5 from being deformed and make the optical disc 2 to be reliably chucked to the disc receiving section 27 if the top cover 5 is made thin, lightweight and hence less rigid.

While the abutment projection 7 of the disc drive apparatus 1 is supported by the annular protruding section 132 of the top surface supporting section 130*b* of the frame 130 at the main surface thereof that is opposite to the main surface located vis-à-vis the turntable 27*a*. However, the present invention is by no means limited to such an arrangement.

Figure 35:
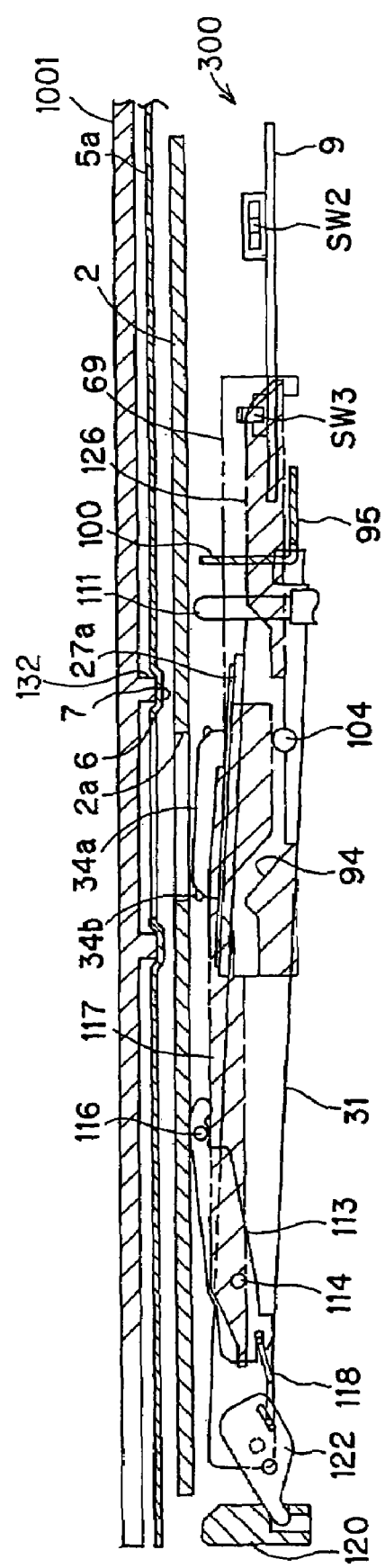
FIG. 35 is a schematic cross sectional view of the disc drive apparatus of FIG. 2 when a protruding section is arranged on the main body of the personal computer of FIG. 1.

For example, it may alternatively be so arranged that the abutment projection 7 of the disc drive apparatus 1 is supported by the protruding section 132 disposed on the main body 1001 of the personal computer 1000, in which the disc drive apparatus 1 is mounted, at the main surface thereof that is opposite to the main surface located vis-à-vis the turntable 27*a* as shown in FIG. 35.

With this arrangement again, when the base hoisting/lowering mechanism 93 raises the base 31 to the chucking position, the optical disc 2 is pressed by the abutment projection 7 of the top cover 5 that is supported by the protruding section 132 of main body 1001 at a peripheral area of the center hole 2*a* of the optical disc 2 so that the optical disc 2 is held on the turntable 27*a* in a state where the engaging projection 34*a* of the turntable 27*a* is engaged with the center hole 2*a* of the optical disc 2 and, at the same time, the optical disc 2 is anchored by the plurality of anchoring sections 34*b* along the center hole 2*a*.

Thus, it is also possible to prevent the top plate section 5*a* of the top cover 5 of the disc drive apparatus 1 from being deformed and make the optical disc 2 to be reliably chucked to the disc receiving section 27 if the top cover 5 is made thin, lightweight and hence less rigid.

A disc drive apparatus 1 according to the present invention is by no means limited to the above-described configuration. For example, a disc drive apparatus 300 according to the invention may alternative have a configuration as illustrated in FIG. 300. In the following description, the components same as or similar to those of the above described disc drive apparatus 1 are denoted respectively by the same reference symbols and will not be described any further.

Figure 36:
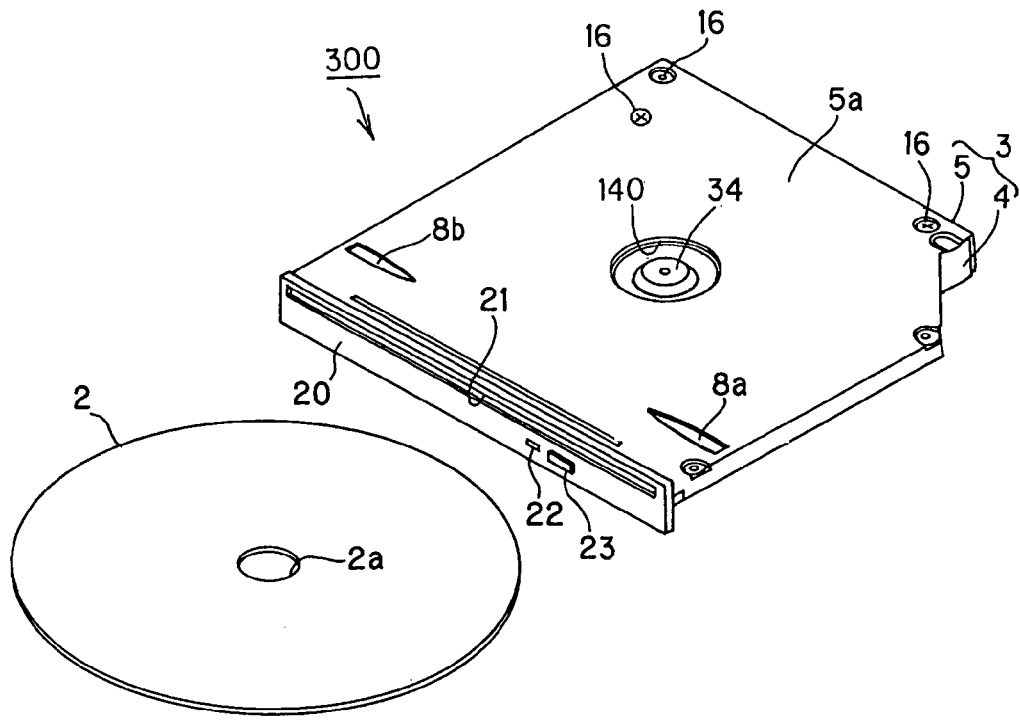
FIG. 36 is a schematic perspective view of a disc drive apparatus according to the invention and having a configuration different from that of FIG. 2.
Figure 37:
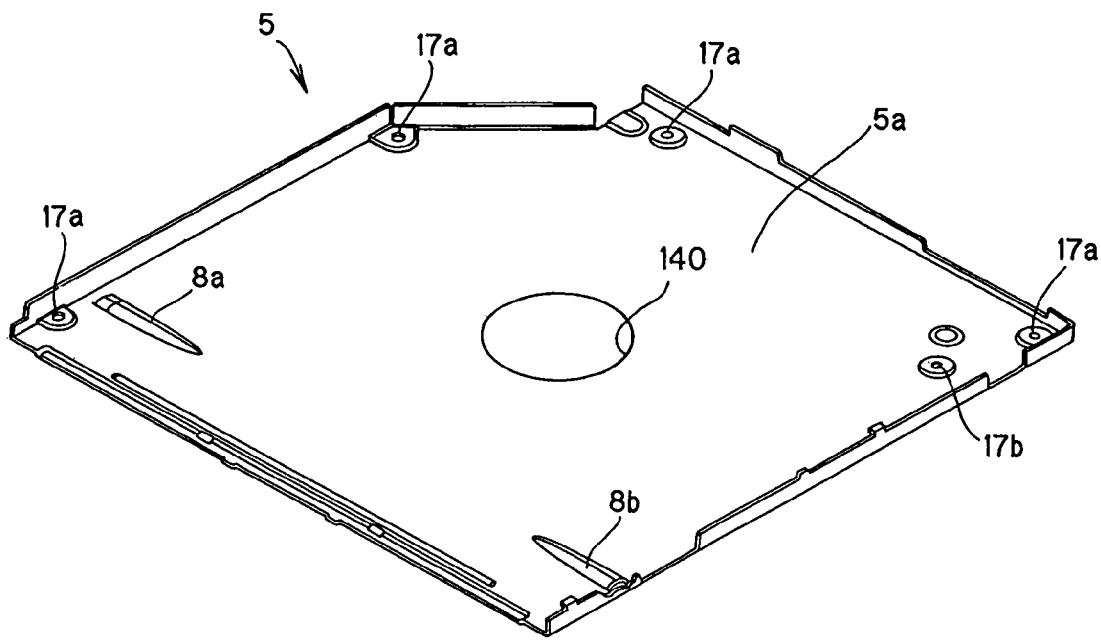
FIG. 37 is a schematic perspective view of the top cover of the disc drive apparatus of FIG. 36, showing the inner surface side thereof.
Figure 38:
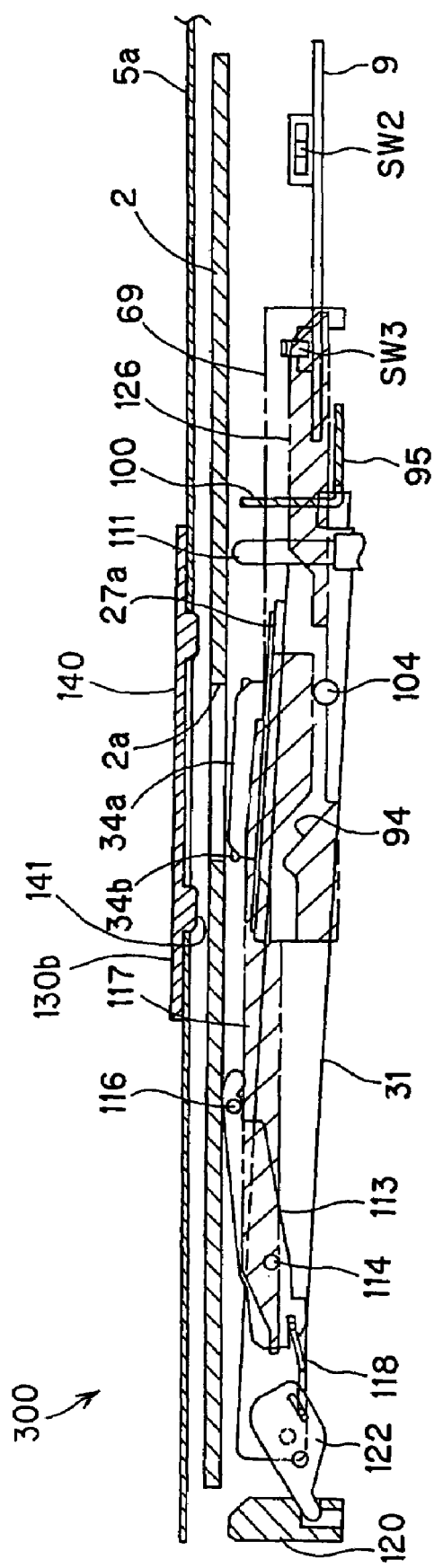
FIG. 38 is a schematic cross sectional view of the disc drive apparatus of FIG. 36 in a state where the base unit is in the unchucking position, illustrating the operation of the base hoisting/lowering mechanism thereof.

The top cover 5 of the disc drive apparatus 300 differs from the top cover 5 of the disc drive apparatus 1 in that, while the top cover 5 of the disc drive apparatus 1 is provided with the aperture 6 and the abutment projection 7 that are arranged on the above described top plate section 5a, the top cover 5 of the disc drive apparatus 300 is provided substantially at the center of the top plate section 5a thereof with a substantially circular aperture 140 as shown in FIGS. 36 and 37 and a substantially annular abutment projection 141 that is adapted to enter the aperture 140 is formed on the main surface of the top surface supporting section 130b located vis-à-vis the top cover 5 as shown in FIG. 38. The abutment projection 141 projects toward the turntable 27a from a position exposed to the aperture 140 of the top cover 5 so as to abut a part of the optical disc 2 surrounding the center hole 2a of the optical disc 2 that is held onto the turntable 27a at the time of a chucking operation, which will be described in greater detail hereinafter.

As the base hoisting/lowering mechanism 93 raises the base 31, the disc drive apparatus 300 having the above-described configuration performs a chucking operation of loading the optical disc 2 that is placed in the disc receiving position on the turntable 27a of the disc receiving section 27.

Figure 39:
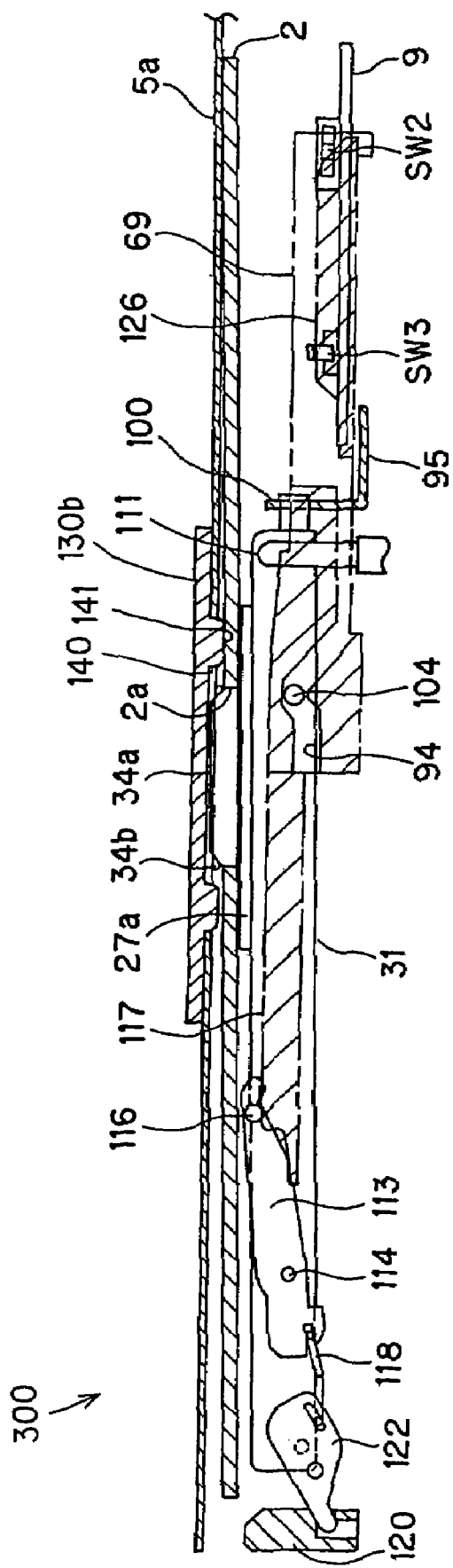
FIG. 39 is a schematic cross sectional view of the disc drive apparatus of FIG. 36 in a state where the base unit is in the chucking position, illustrating the operation of the base hoisting/lowering mechanism thereof.

More specifically, in the disc drive apparatus 300, as the base hoisting/lowering mechanism 93 raises the base 31 to the chucking position, the optical disc 2 is pressed by the abutment projection 141 of the top surface supporting section 130b at a part of thereof surrounding the center hole 2a so that the optical disc 2 is held on the turntable 27a in a state where the engaging projection 34a of the turntable 27a is engaged with the center hole 2a of the optical disc 2 and, at the same time, the optical disc 2 is anchored by the plurality of anchoring sections 34b along the center hole 2a as shown in FIG. 39.

As a result, the optical disc 2 can be reliably loaded in the disc receiving section 27 without providing the top cover 5 of the cabinet 3 of the disc drive apparatus 1 with an enhanced level of rigidity.

In other words, the disc drive apparatus 1 can be made further thin and lightweight by using a thinned and lightweight top cover 5. It is also possible to make the optical disc 2 to be reliably chucked to the disc receiving section 27 if the top cover 5 is made thin, lightweight and hence less rigid.

While the abutment projection 141 that is adapted to enter the aperture 140 of the top cover 5 is arranged on the frame 130 in the above described disc drive apparatus 300, the present invention is by no means limited to such an arrangement.

Figure 40:
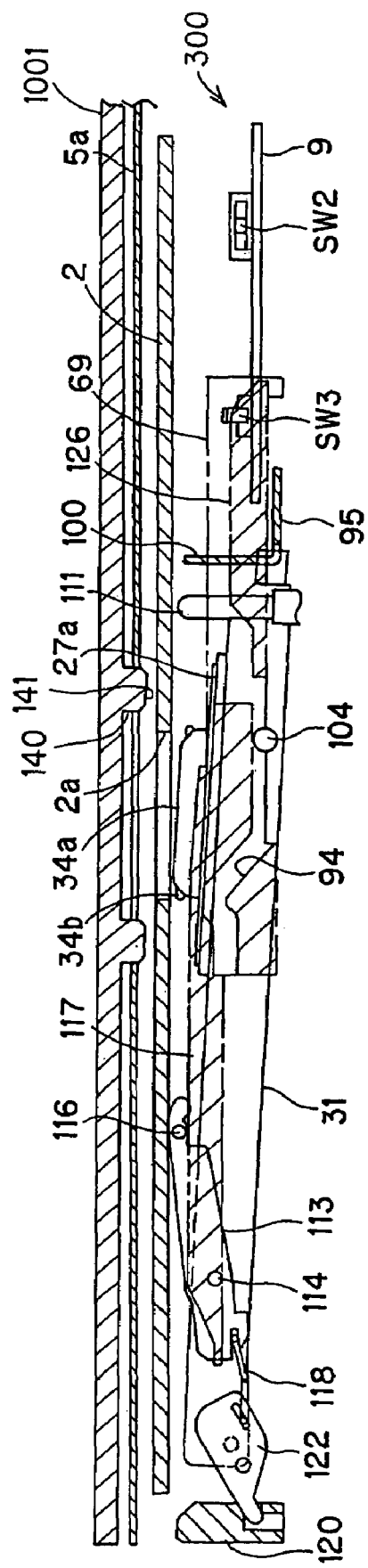
FIG. 40 is a schematic cross sectional view of the disc drive apparatus of FIG. 36 when an abutment projection is arranged on the main body of the personal computer of FIG. 1.

For example, the abutment projection 141 may alternatively be arranged on the main body 1001 of the personal computer 1000, in which the disc drive apparatus 300 is mounted as shown in FIG. 40.

With this arrangement, again, as the base hoisting/lowering mechanism 93 raises the base 31 to the chucking position, the optical disc 2 is pressed by the abutment projection 141 of the main body 1001 that enters from the aperture 140 of the top cover 5 at a part of thereof surrounding the center hole 2a so that the optical disc 2 is held on the turntable 27a in a state where the engaging projection 34a of the turntable 27a is engaged with the center hole 2a of the optical disc 2 and, at the same time, the optical disc 2 is anchored by the plurality of anchoring sections 34b along the center hole 2a.

Thus, the disc drive apparatus 300 reliably performs a chucking operation of holding the optical disc 2 to the disc receiving section 27 if the top cover 5 is made thin, lightweight and hence less rigid.

An electronic appliance according to the invention is not limited to a note type personal computer 1000 as described above and may alternatively be any other electronic appliance in which a disc drive apparatus 1 according to the invention can be mounted.

Additionally, a disc drive apparatus according to the invention is not limited to a slot-in type disc drive apparatus 1 as described above and may alternatively be any other disc drive apparatus adapted to perform a chucking operation of holding an optical disc to the disc receiving section by hoisting/lowering the disc receiving section.

What is claimed is:

1. A disc drive apparatus, comprising:
a base unit including a disc receiving section to receive an optical disc, a disc rotary drive mechanism to drive the optical disc loaded in the disc receiving section to rotate, an optical pickup to write signals on and/or read signals from the optical disc being driven to rotate by the disc rotary drive mechanism, and a pickup feed mechanism to feed the optical pickup in a radial direction of the optical disc, the disc receiving section, the disc rotary drive mechanism, the optical pickup, and the pickup feed mechanism being integrally arranged on a base in an inside of a cabinet; and
a base hoisting/lowering mechanism to raise and lower the base between a chucking position to load and fasten the optical disc in the disc receiving section by raising the base and an unchucking position to release the optical disc from the disc receiving section by lowering the base, wherein
the disc receiving section includes a turntable to be driven to rotate by the disc rotary drive mechanism, an engaging projection arranged at a central part of the turntable so as to be engaged with the center hole of the optical disc, and a plurality of anchoring sections to anchor the optical disc at a part thereof surrounding the center hole engaged with the engaging projection,
the cabinet includes a lower cabinet member having a substantially flat box-like profile and a ceiling board to close a top aperture of the lower cabinet member, and
an abutment projection is arranged on the ceiling board at a position located above the turntable in an axial direction so as to project toward the turntable and the abutment projection is configured to be supported by a supporting section arranged on an external member.

2. The disc drive apparatus according to claim 1, wherein the engaging projection is configured to be engaged with the center hole of the optical disc such that the optical disc is held on the turntable by the plurality of anchoring sections anchoring the optical disc at a part thereof surrounding the center hole as the engaging projection enters into the center hole of the optical disc and the abutment projection of the ceiling board supported by the supporting section of the external member is pressed against the optical disc at a part thereof surrounding the center hole when the base hoisting/lowering mechanism raises the base to the chucking position.

3. The disc drive apparatus according to claim 1, wherein the external member on which the supporting section is arranged is a frame that holds the disc drive apparatus.

4. The disc drive apparatus according to claim 1, wherein the external member on which the supporting section is arranged is a main body of an electronic appliance in which the disc drive apparatus is mounted.

5. The disc drive apparatus according to claim 4, wherein the external member on which the abutment projection is arranged is a frame that holds the disc drive apparatus.

6. The disc drive apparatus according to claim 4, wherein the external member on which the abutment projection is arranged is a main body of an electronic appliance in which the disc drive apparatus is mounted.

7. A disc drive apparatus, comprising:

a base unit including a disc receiving section to receive an optical disc, a disc rotary drive mechanism to drive the optical disc loaded in the disc receiving section to rotate, an optical pickup to write signals on and/or read signals from the optical disc being driven to rotate by the disc rotary drive mechanism, and a pickup feed mechanism to feed the optical pickup in a radial direction of the optical disc, the disc receiving section, the disc rotary drive mechanism, the optical pickup, and the pickup feed mechanism being integrally arranged on a base in an inside of a cabinet; and a base hoisting/lowering mechanism to raise and lower the base between a chucking position to load and fasten the optical disc in the disc receiving section by raising the base and an unchucking position to release the optical disc from the disc receiving section by lowering the base, wherein the disc receiving section includes a turntable to be driven to rotate by the disc rotary drive mechanism, an engaging projection arranged at a central part of the turntable so as to be engaged with the center hole of the optical disc, and a plurality of anchoring sections to anchor the optical disc at a part thereof surrounding the center hole engaged with the engaging projection, the cabinet includes a lower cabinet member having a substantially flat box-like profile and a ceiling board to close a top aperture of the lower cabinet member, and an aperture section is formed through the ceiling board at a position thereof located above the turntable in an axial direction so as to allow an abutment projection arranged on an external member to enter the aperture section.

8. The disc drive apparatus according to claim 7, wherein the engaging projection is configured to be engaged with the center hole of the optical disc such that the optical disc is held on the turntable by the plurality of anchoring sections anchoring the optical disc at a part thereof surrounding the center hole as the engaging projection enters into the center hole of the optical disc and the abutment projection of the external member that enters from the aperture section of the ceiling board is pressed against the optical disc at a part thereof surrounding the center hole when the base hoisting/lowering mechanism raises the base to the chucking position.

* * * * *